(12) United States Patent
Shibatani et al.

(10) Patent No.: US 6,332,684 B1
(45) Date of Patent: Dec. 25, 2001

(54) PROJECTION TYPE COLOR IMAGE DISPLAY APPARATUS

(75) Inventors: Takashi Shibatani, Nara-ken; Hiroshi Nakanishi, Kyoto; Ikuo Takahara, Nara-ken; Hiroshi Hamada, Tochigi-ken, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/398,020

(22) Filed: Sep. 17, 1999

(30) Foreign Application Priority Data

Sep. 17, 1998 (JP) .................................................. 10-263749

(51) Int. Cl.$^7$ ................................................... G03B 21/14
(52) U.S. Cl. ..................................... 353/31; 353/38; 349/8
(58) Field of Search .................................. 353/20, 31, 33, 353/34, 37, 38; 349/5, 8, 9; 359/487, 495, 496, 497

(56) References Cited

U.S. PATENT DOCUMENTS

| | | | | |
|---|---|---|---|---|
| 5,777,804 | * | 7/1998 | Nakamura et al. | 349/4 |
| 5,865,521 | * | 2/1999 | Hashizume et al. | 353/38 |
| 6,050,689 | * | 4/2000 | Nakamura et al. | 353/31 |
| 6,062,695 | * | 5/2000 | Kakuda et al. | 353/38 |
| 6,102,545 | * | 8/2000 | Ogino | 353/38 |
| 6,111,618 | * | 8/2000 | Booth et al. | 349/5 |
| 6,130,728 | * | 10/2000 | Tsujikawa et al. | 349/9 |
| 6,144,426 | * | 11/2000 | Yamazaki et al. | 349/5 |

FOREIGN PATENT DOCUMENTS

| | | |
|---|---|---|
| 4-60538 A | 2/1992 | (JP) . |
| 7-181392 A | 7/1995 | (JP) . |
| 8-304739 A | 11/1996 | (JP) . |
| 8-313847 A | 11/1996 | (JP) . |
| 9-114023 A | 5/1997 | (JP) . |

\* cited by examiner

Primary Examiner—William Dowling
(74) Attorney, Agent, or Firm—Nixon & Vanderhye P.C.

(57) ABSTRACT

A projection type color image display apparatus of the present invention includes: a light source section for generating white light beams; a first fly-eye lens array comprising a plurality of lenses for forming a plurality of secondary light source image spots of the light source section; a second fly-eye lens array comprising at least the same number of lenses as the first fly-eye lens array, provided near a position where the plurality of secondary light source image spots are formed by the first fly-eye lens array; a microlens array comprising a plurality of microlenses, wherein the light beams which have passed through the respective lenses of the second fly-eye lens array are superimposed on one another on the microlens array; a single image display device comprising a plurality of color pixels arranged in a predetermined arrangement for modulating the light beams from the microlenses; a color separator provided in a predetermined position in an optical path from the light source section to the microlens array for color-separating the white light beams into R, G and B beams; and a projection lens for projecting the light beams output from the image display device.

25 Claims, 34 Drawing Sheets

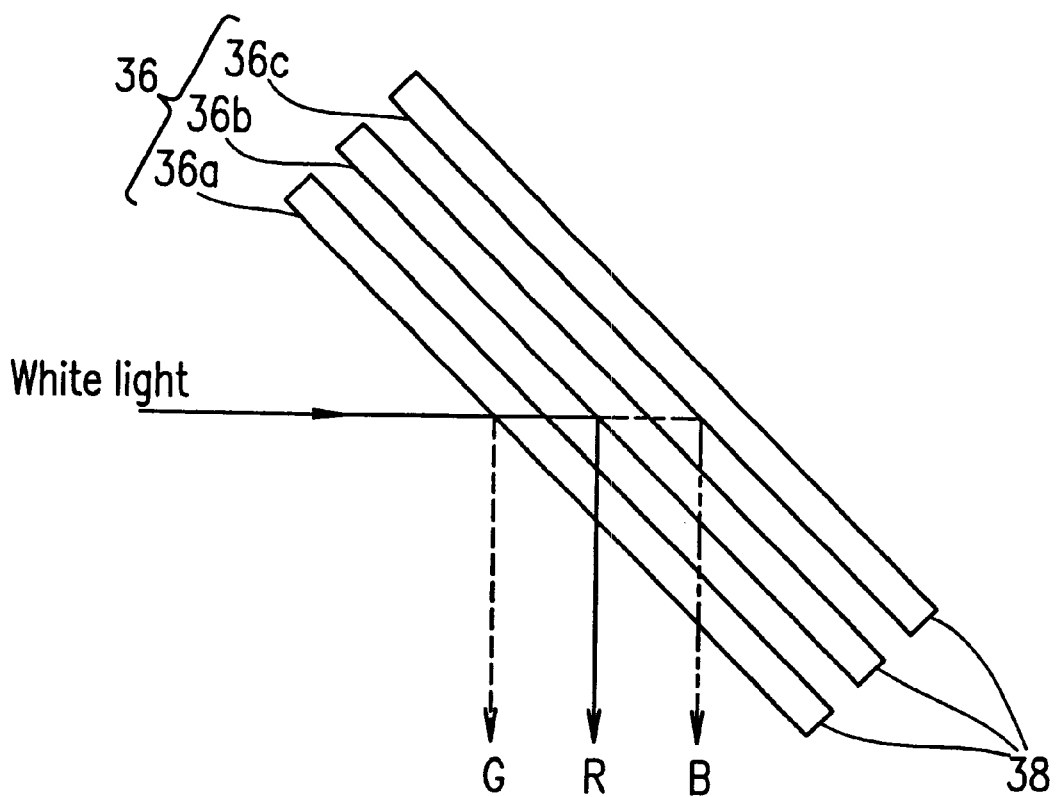

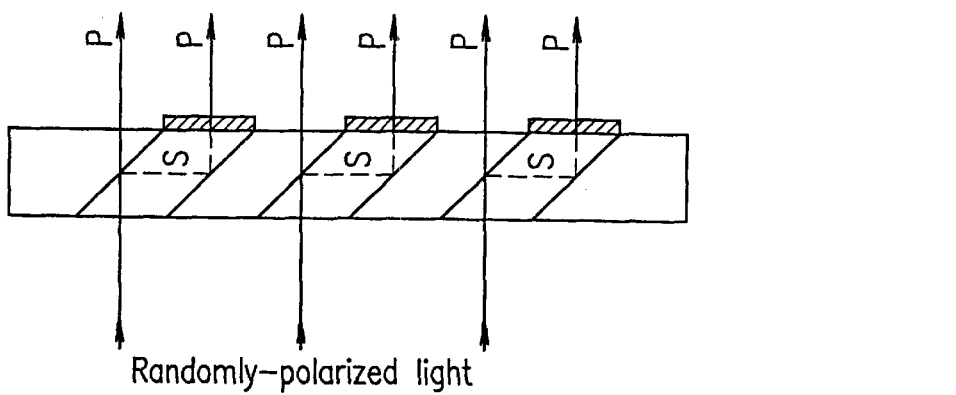
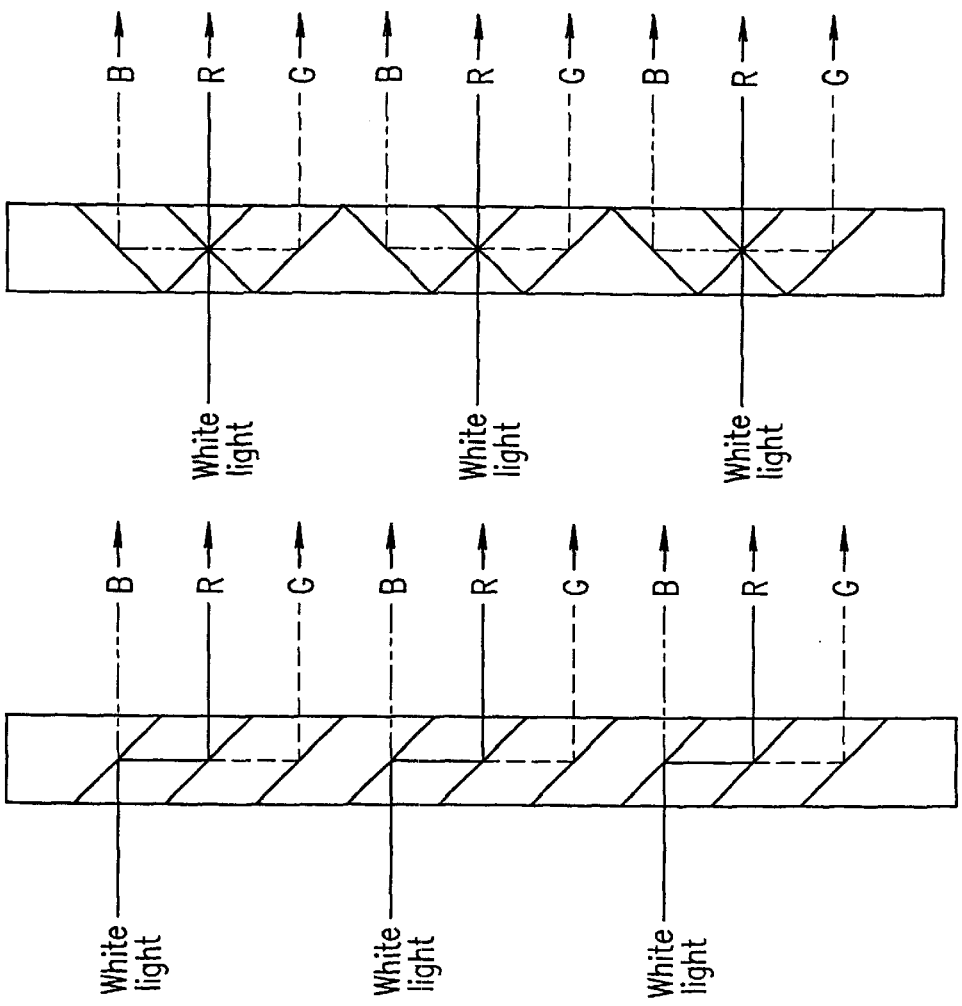

PROJECTION TYPE COLOR IMAGE DISPLAY APPARATUS

BACKGROUND OF THE INVENTION

1. Field of the Invention

The present invention relates to a projection-type color image display apparatus. More particularly, the present invention relates to a single-plate projection-type color image display apparatus for producing a color display with a single LCD ("liquid crystal display") device without using a color filter.

2. Description of the Related Art

A projection type color image display apparatus incorporating a conventional LCD device (hereinafter, referred to as a "projection type color LCD apparatus") will be described. A projection type color LCD apparatus is expected to be further developed in the industry, because it can provide various advantages over a projection type CRT (cathode ray tube) display apparatus, e.g., it has a wide color reproduction range; it is small in size and light in weight, and thus highly portable; and it is not influenced by geomagnetism, and thus does not require a convergence adjustment. However, an LCD device used in a projection type color LCD apparatus does not normally emit light, requiring a separate light source be provided.

Display systems for such a projection type color image display apparatus include a three-plate system where three LCD devices are used for the primary colors, R (red), G (green) and B (blue) and a single-plate system where only one LCD device is used. A projection type color image display apparatus of the three-plate system includes an optical system for separating white light into R, G and B beams and three LCD devices for respectively controlling the R, G and B beams so as to form R, G and B images. The R, G and B images are optically superimposed on one another so as to produce a full-color display. In the three-plate system, the light emitted from the white light source can be efficiently used, and a color with high purity can be displayed. However, the system requires the color separating system and the color synthesizing system as described above, and the overall optical system becomes complicated, requiring a large number of components to be provided. Thus, the system is generally disadvantageous over the single-plate system in terms of the cost and the size of the apparatus.

On the other hand, a projection type color LCD apparatus of the single-plate system uses only one LCD device. In the single-plate system, the LCD device including an RGB color filter of a mosaic or stripe arrangement is projected by a projection optical system. For example, such a projection type color LCD apparatus is disclosed in Japanese Laid-Open Publication No. 59-230383. The single-plate system is suitable for a low-cost and small-size projection system as it requires only one LCD device, and the optical system is simpler than that of the three-plate system.

In the single-plate system, however, light is absorbed or reflected by the color filter, whereby only about ⅓ of the incident light can be used. Accordingly, the brightness obtained by the single-plate system with a color filter is about ⅓ of that obtained by the three-plate system using a light source having the same brightness as that used in the single-plate system.

One possible solution to the reduced brightness is to increase the brightness of the light source used. However, an increase in the light source brightness is associated with an increase in the power consumption, which is undesirable, particularly when the apparatus is used at home. When a color filter of an absorption type is used, light absorbed by the color filter is converted to heat. Therefore, the increase in the light source brightness not only increases the temperature of the LCD device, but also accelerates the discoloring of the color filter. Thus, to enhance the utility value of a projection type color image display apparatus, it is important to more effectively use the given light without undesirably increasing the brightness of the light source.

In order to solve the above-described problem associated with the single-plate projection type color image display apparatus, Japanese Laid-Open Publication No. 4-60538, for example, discloses a projection type color image display apparatus in which a plurality of dichroic mirrors are arranged in a fan-arrangement so as to improve the light efficiency.

The conventional projection type color image display apparatus improves the light efficiency by providing a plurality of dichroic mirrors 104R, 104G and 104B in a fan-shaped pattern for separating the white light from a white light source 101 into R, G and B beams, as illustrated in FIG. 38. As used herein, "R, G and B" refer to red, green and blue, respectively, and "R, G and B beams" refer to a red, green and blue light beams, respectively.

In the conventional apparatus, the light beams separated by the dichroic mirrors 104R, 104G and 104B are incident upon the microlens array 105 at respectively different angles. The microlens array 105 is provided on a side of a LCD device 107 closer to the white light source 101. After passing through the microlens array 105, the color beams are distributed, depending on their incident angles, to different liquid crystal regions (pixel regions) of the LCD device 107, which are driven by different signal electrodes to which different color signals are independently applied. The distributed light beams are projected while being enlarged onto a screen 110 via a field lens 108 and a projection lens 109, which are provided on a light output side of the LCD device 107. The conventional projection type color image display apparatus does not use an absorption-type color filter, and thus achieves an enhanced light efficiency, thereby displaying bright images.

Referring to FIG. 39, the LCD device 107 used in the conventional projection type color LCD apparatus includes two transparent substrates 107a and 107b and a liquid crystal layer 107c interposed therebetween. Although not shown in the figure, other elements such as a driving circuit (including TFTs, signal lines, etc.) and alignment films are also provided between the transparent substrates 107a and 107b. On a side of the transparent substrate 107a facing the liquid crystal layer 107c, a black matrix 111 is provided for blocking light passing through the wiring region which does not contribute to the display. A light-transmitting area of each pixel is called a "pixel aperture". The ratio of the total area of all the pixel apertures with respect to the screen size is referred to as an aperture ratio.

The microlens array 105 is a group of microlenses 106 each having a size corresponding to three pixels of the LCD device 107. From the incident R, G and B beams (respectively collimated), the microlens array 105 forms focused spots of the three colors on respective pixels of the corresponding colors on a side (the lower side in FIG. 39) of the transparent substrate 107a on which the black matrix 111 is provided. Then, image signals are applied to control the respective pixels on which the focused spots are formed.

In a normal LCD device which is not provided with a microlens, light incident upon the black matrix 111 cannot contribute to the display, thereby lowering the light efficiency. On the other hand, in the above-described projection type color image display apparatus provided with the microlens array 105, light incident upon the microlenses 106 can be focused on the pixel apertures. Therefore, the amount of light which passes through the LCD device 107 is increased, thereby obtaining a brighter projection. If the size of a focused beam spot is smaller than the size of a pixel aperture, the light efficiency can be maximized. However, to realize such a condition, the following limitations exist.

The size of a focused beam spot after passing through a microlens is determined by the focal length f of the microlens and the degree of parallelization of the incident light (the spread angle of the light with respect to the principal ray). In the optical system illustrated in FIG. 39, the focal length f should be adjusted to be equal to the thickness of the transparent substrate 107a. However, in the LCD device production process currently employed in the art, a plurality of LCD devices are first produced on a large glass plate, and the large glass plate is then severed into pieces. Therefore, a very thin glass plate cannot be used as it may be warped during the production. The thickness d of a glass plate currently used in the LCD device production is about 0.7 to about 1.1 mm, and the refractive index n of the glass plate is about 1.52. Thus, the air-equivalent thickness (d/n) of the glass plate is about 460 μm to about 730 μm. Therefore, the focal length f of a microlens needs to be about 460 μm or more. When the degree of parallelization of the illumination light is about ±3°, the focused spot size Φ is about 48 μm ($\Phi=2 \cdot f \cdot \tan \theta$ ($\theta:\pm 3°$)). Therefore, when the width of a pixel aperture is less than about 48 μm, the focused beam spot spans beyond the aperture, thereby causing a focusing loss.

For example, in an LCD device employing a stripe arrangement and having a diagonal dimension of about 91 mm, an aspect ratio of about 3:4, and 480×[640×3(RGB)= 1920] (vertical×lateral) pixels (a so-called "VGA (video graphics array)" type display), the lateral pitch of pixels is only about 38 μm. Therefore, the focused beam spot is likely to span beyond a pixel aperture. It is even likely that an R beam spot overlaps the adjacent B and G pixels, thereby deteriorating the color reproducibility in the projected image. This undesirable phenomenon is called "color mixing". In recent years, LCD devices have been made smaller in size with higher resolutions, thereby reducing the size of a pixel. Without special measures, the light efficiency may further decrease, whereby the brightness of the projection cannot be ensured and the undesirable color mixing cannot be prevented.

As one possible solution to such a problem, commonly-assigned Japanese Laid-Open Publication No. 9-114023 discloses a method in which focused beam spots formed by a first microlens array are imaged while being enlarged onto pixel apertures of an LCD device by means of a second microlens array. In this method, the focused beam spots formed by the first microlens array exist outside of the LCD device. Therefore, the beam spots can be efficiently focused on the pixel apertures without reducing the thickness of the transparent substrate 107a.

In the above-described conventional single-plate projection type color image display apparatus employing dichroic mirrors and a microlens array, the light efficiency can be improved since an absorption-type color filter is not used, but there are problems associated therewith as follows.

First, the illumination distribution across the screen cannot be made sufficiently uniform. In order to obtain a high quality projection, it is desirable to make the illumination distribution across the screen uniform as well as to improve the brightness, the color reproducibility,the resolution, and the like. Generally, when a LCD device is illuminated directly by a focusing system which employs a parabolic mirror or an ellipsoidal mirror, the illumination peaks at the center of the screen and decreases toward the periphery of the screen.

The system disclosed in Japanese Laid-Open Publication No. 9-114023 has a first microlens array provided near the LCD device. Therefore, a group of focused beam spots formed by the first microlens array take over the non-uniform illumination distribution created by the preceding focusing optical system. Then, the group of focused beam spots are re-imaged so as to correspond only to the pixels of the LCD device in the vicinity of the respective beam spots. Thus, the non-uniformity in the illumination distribution remains in the projected image.

The non-uniformity in illumination distribution is a problem not only in the single-plate system but also in a three-plate projection type color image display apparatus. As a solution to the non-uniformity in illumination distribution occurring in a three-plate projection type color image display apparatus, it has been proposed in the art to employ an optical system obtained by combining two so-called "fly-eye" lens arrays together. Moreover, Japanese Laid-Open Publication No. 7-181392 discloses a system employing two fly-eye lens arrays and a microlens array so as to improve the illumination distribution while also improving the efficiency in focusing light onto a pixel aperture.

Japanese Laid-Open Publication No. 7-181392 describes that the illumination distribution can be improved by illuminating secondary white light source images formed by the first fly-eye lens array (a secondary light source image is generally the same as a focused spot formed by a microlens) across the screen of the LCD device by the second fly-eye lens array so that the light beams from the secondary white light source images are superimposed on one another. It also describes that the focusing efficiency can be improved by focusing the secondary light source images arranged in a pattern similar to the pixel arrangement onto the corresponding pixel apertures by means of microlenses. However, in the system described in Japanese Laid-Open Publication No. 7-181392, the secondary light source images are white, and therefore the system requires a color separating optical system and a color synthesizing optical system. Thus, the system has the above-described problems associated with the three-plate system. In order to apply the system to a single-plate system, a color filter is necessary, whereby there is some absorption loss due to the color filter.

Japanese Laid-Open Publication No. 8-313847 discloses a projection type color image display apparatus intended for use with the single-plate system, in which fly-eye lens arrays and a microlens array are used in combination. In the projection type color image display apparatus, white light is separated into R, G and B beams by a color separating optical system. The apparatus includes a pair of first and second fly-eye lens arrays for each of the R, G and B beams. The secondary light source images formed by the first fly-eye lens array are closely arranged together in a pattern corresponding to the shape of a pixel aperture, thereby forming a group of R, G and B light source images. The R, G and B light source images illuminate the image display device while being superimposed on one another by means of the second fly-eye lens arrays which are separately provided for the respective colors, thus improving the illumination distribution. Then, the microlens focuses a predetermined color onto a pixel aperture. While the system does not have absorption loss due to the color filter, it requires a fly-eye lens optical system for each color, thereby increasing the number of components to be provided and thus the size of the overall optical system.

The second problem is that efficiency of utilizing "polarized light", which is involved in the display principle of an LCD device, cannot be sufficiently enhanced. This problem is also common to the single-plate and three-plate systems. In an LCD device, only a portion of randomly-polarized illumination light (linearly-polarized light) is transmitted by a polarizing plate provided on the light input side of the LCD device, and the linearly-polarized light is modulated by the LCD device. Then, an unnecessary portion of the modulated light is further removed through another polarizing plate provided on the light output side of the LCD device, thereby displaying an image. More than half of the illumination light is removed and lost as the light passes through the first polarizing plate.

For improving the efficiency of utilizing the polarized light, a polarization conversion method has been proposed in the art in which a PBS (polarization beam splitter) is employed to align the polarization direction of the incident light before it is incident upon the LCD device. Japanese Laid-Open Publication No. 7-181392, supra, also discloses a polarization conversion method using a PBS. However, a light beam obtained as a result of the polarization direction alignment is parallel to a light beam before polarization separation, thereby doubling the cross-sectional area of a light beam, and thus increasing the size of the optical system. Moreover, when the display area of the LCD device is small, the effective amount of light focused on the display plane is reduced.

Moreover, Japanese Laid-Open Publication No. 8-304739 discloses a system where two fly-eye lens arrays and a PBS having a strip array pattern are used in combination so as to improve the illumination distribution uniformity and also improve the light efficiency by the polarization conversion in a small space. However, the secondary light source images formed by the system are white, and the system only contemplates the application to a three-plate projection type color image display apparatus.

SUMMARY OF THE INVENTION

According to one aspect of this invention, a projection type color image display apparatus of the present invention includes: a light source section for generating white light beams; a first fly-eye lens array including a plurality of lenses for forming a plurality of secondary light source image spots of the light source section; a second fly-eye lens array including at least the same number of lenses as the first fly-eye lens array, provided near a position where the plurality of secondary light source image spots are formed by the first fly-eye lens array; a microlens array including a plurality of microlenses, wherein the light beams which have passed through the respective lenses of the second fly-eye lens array are superimposed on one another on the microlens array; a single image display device including a plurality of color pixels arranged in a predetermined arrangement for modulating the light beams from the microlenses; a color separator provided in a predetermined position in an optical path from the light source section to the microlens array for color-separating the white light beams into R, G and B beams; and a projection lens for projecting the light beams output from the image display device. The plurality of secondary light source image spots are color-separated and arranged in a pattern which is similar to an arrangement of the plurality of color pixels of the image display device. Each of the plurality of microlenses forms focused spots, which correspond to the color-separated and arranged secondary light source image spots, on one of the color pixels having a corresponding color.

In one embodiment of the invention, the microlenses are arranged at a pitch which is an integer multiple of a pitch at which groups of the R, G and B color pixels of the image display device are arranged.

In one embodiment of the invention, the color separator is provided between the light source section and the first fly-eye lens array. The white light beams color-separated by the color separator are incident upon the first fly-eye lens array while being superimposed on one another. The first fly-eye lens array forms the color-separated and arranged secondary light source image spots in a pattern similar to an arrangement of the plurality of color pixels of the image display device.

In one embodiment of the invention, the color separator is provided on a light source side of the second fly-eye lens array. The second fly-eye lens array including a number of lenses, the number being at least three times as great as the number of lenses of the first fly-eye lens array, and forms the color-separated and arranged secondary light source image spots in a pattern similar to an arrangement of the plurality of color pixels of the image display device.

In one embodiment of the invention, the color separator is provided on a light output side of the second fly-eye lens array. The secondary light source image spots are virtually color-separated and arranged in a pattern similar to an arrangement of the plurality of color pixels of the image display device.

In one embodiment of the invention, the color separator is an array of strip-shaped color separating optical elements which are regularly arranged. The color separator is provided on either a light source side or a light output side of the second fly-eye lens array, and color-separates the secondary light source image spots into R, G and B beams which are arranged at a regular interval along a direction in which the R, G and B color pixels of the image display device are arranged.

In one embodiment of the invention, the color separator further includes a plurality of total reflection mirrors which are provided corresponding to the plurality of color separating optical elements.

In one embodiment of the invention, the color separator includes: a plurality of first dichroic prisms or dichroic mirrors each including a dielectric multilayer film which reflects two of colors R, G and B and transmits the other one of colors R, G and B; a plurality of second dichroic prisms or dichroic mirrors each of which reflects one of the two colors reflected by the first dichroic prisms or dichroic mirrors in a direction which generally coincides with a direction in which light is transmitted by the first dichroic prisms or dichroic mirrors; and a plurality of any of third dichroic prisms, dichroic mirrors, total reflection prisms or total reflection mirrors, each of which reflects light transmitted by the second dichroic prisms or dichroic mirrors in a direction which generally coincides with a direction in which light is transmitted by the first dichroic prisms or dichroic mirrors. The first dichroic prisms or dichroic mirrors, the second dichroic prisms or dichroic mirrors, and the third dichroic prisms, dichroic mirrors, total reflection prisms or total reflection mirrors, are regularly arranged.

In one embodiment of the invention, the color separator includes: a plurality of first cross-dichroic prisms or cross-dichroic mirrors each including a dielectric multilayer film which reflects two of colors R, G and B and transmits the other one of colors R, G and B; an d a plurality of any of second dichroic prisms, dichroic mirrors, total reflection prisms or total reflection mirrors, which respectively reflect the two colors reflected by the first cross-dichroic prisms or dichroic mirrors in a direction which generally coincides with a direction in which light is transmitted by the first cross-dichroic prisms or cross-dichroic mirrors. The first cross-dichroic prisms or dichroic mirrors, and the second dichroic prisms, dichroic mirrors, total reflection prisms or total reflection mirrors, are regularly arranged.

In one embodiment of the invention, the color separator includes a first color separating surface which reflects one of colors R, G and B while transmitting the other ones of colors R, G and B, a second color separating surface which reflects one of the two colors transmitted by the first color separating surface while transmitting the other one, and a reflective surface which reflects the light transmitted by the second color separating surface. The first color separating surface, the second color separating surface and the reflective surface are generally arranged in parallel to one another.

In one embodiment of the invention, the color separator includes two or three plates. A dielectric multilayer film is formed on at least three sides of the two or three plates.

In one embodiment of the invention, the color separator includes a triangular prism and one or two plates. A dielectric multilayer film is formed on at least three sides of the triangular prism and the one or two plates.

In one embodiment of the invention, the apparatus further includes a polarization converting optical element provided on a light source side or a light output side of the second fly-eye lens array. The polarization converting optical element includes: a polarization beam splitter for separating each of light beams forming the secondary light source image spots into a P-polarization component and an S-polarization component, by reflecting one of the polarization components while transmitting the other of the polarization components, in a direction perpendicular to a direction in which the color separator separates the light beams into three wavelength bands of R, G and B; and a plurality of total reflection prisms or total reflection mirrors, each of which reflects one of the P-polarization component and the S-polarization component which has been reflected by the polarization beam splitter in a direction which generally coincides with a direction in which the other one of the P-polarization component and the S-polarization component has been transmitted by the polarization beam splitter, wherein the polarization beam splitter and the total reflection prisms or total reflection mirrors are regularly and alternately arranged in a strip pattern. A polarization axis rotator is provided on a light output side of one of the polarization beam splitter and the total reflection prism or total reflection mirror.

In one embodiment of the invention, the polarization converting optical element further includes a spacer for defining an interval between the polarization beam splitter and the total reflection prism or total reflection mirror which are regularly and alternately arranged in a strip pattern.

In one embodiment of the invention, the projection type color image display apparatus further includes a polarization separator provided between the light source section and the first fly-eye lens array. The polarization separator includes: a polarization beam splitter for separating the white light beams from the light source section into a P-polarization component and an S-polarization component by reflecting one of the polarization components while transmitting the other of the polarization components; and a reflector for reflecting one of the polarization components which has been transmitted by the polarization beam splitter toward the polarization beam splitter. The P-polarization component and the S-polarization component separated by the polarization separator are incident upon the first fly-eye lens array at respectively different angles while being superimposed on one another. The secondary light source images of the P-polarization component and the S-polarization component formed by the first fly-eye lens array are arranged in a direction perpendicular to a direction in which the color separator color-separates the white light beams. The apparatus further includes a polarization axis rotator which is provided along an optical path of either the P-polarization component or the S-polarization component, near a position where the secondary light source image spots of the P-polarization component and the S-polarization component are formed.

In one embodiment of the invention, a ratio between a spot size of the secondary light source image spot and a pitch of the color-separated secondary light source image spots, along a direction of color separation performed by the color separator, is substantially equal to or less than a ratio between a size of an aperture of each of the color pixels of the image display device and a pitch of the color pixels along said direction of color separation.

In one embodiment of the invention, the projection type color image display apparatus further includes a light-blocking mask provided on a light source side or a light output side of the second fly-eye lens array, the light-blocking mask including a plurality of openings each having a shape similar to a shape of an aperture of the color pixel of the image display device.

A function of the present invention will be described below.

According to the present invention, the arrangement of the individual secondary light source images which are color-separated into R, G and B or the arrangement of groups of the secondary light source images (each group including a plurality of secondary light source images of the same color) is similar to the color pixel arrangement of the image display device (including the color arrangement thereof). The lenses of the microlens array image the arrangement of the secondary light source images so as to form focused beam spots forming the color-separated secondary light source images on the respective pixel apertures of the image display device. Thus, it is possible to efficiently color-separate the light from the white light source into color beams and to make the color beams be incident upon pixels of the respective colors. Therefore, it is possible to obtain a bright projection with no absorption loss due to the color filter. Moreover, the light beams from which the secondary light source images are formed by the first fly-eye lens array are spread by the second fly-eye lens array so that each of the light beams spans across the entire screen of the image display device, thereby making the illumination distribution in the projected image uniform. It is not necessary to provide a plurality of sets of fly-eye lens arrays for the respective colors, R, G and B. Therefore, it is possible to realize the apparatus with a compact optical system. Furthermore, the secondary light source images are first formed, which then form focused spots. Therefore, as compared to the case where focused spots are formed directly from collimated light beams as in the prior art, the apparatus can be designed with an increased focal length of the microlens without lowering the overall light efficiency of the optical system.

Thus, an LCD device employing a transparent substrate of a normal thickness can be used. As a result, the apparatus of the present invention is free of the disadvantage of a reduced production yield from excessively reducing the thickness of the transparent substrate.

The color separator may be provided between the light source section and the first fly-eye lens array, so that the light beams are separated by the color separator so as to have the R, G and B wavelength bands, respectively, and the light beams are illuminated on the first fly-eye lens array while being superimposed on one another. In this way, secondary light source images color-separated into R, G and B are formed at respective positions according to the incident angles of the light beams. Thus, the secondary light source images arranged in a desired arrangement can be obtained by appropriately setting the incident angles of the color beams and the first fly-eye lens array.

When the color separators are provided in a strip array pattern, white beams, which have been converged before forming the secondary light source images, are respectively color-separated by the color separator, thereby forming a color-separated arrangement of the secondary light source images, and thus reducing the space occupied by the color separating optical elements along the optical axis. Since each of the separating/reflecting surfaces for the respective colors can be provided only at a position where the surface is required, the area of the dielectric multilayer film can be reduced as compared to the color separator comprising three color separating surfaces.

Moreover, the optical path difference can be further reduced by employing a color separator, which comprises: a plurality of first dichroic prisms or dichroic mirrors each comprising a dielectric multilayer film which reflects two of R, G and B and transmits the other one of R, G and B; a plurality of second dichroic prisms or dichroic mirrors each of which reflects one of the two colors reflected by the first dichroic prisms or dichroic mirrors in a direction which generally coincides with a direction in which light is transmitted by the first dichroic prisms or dichroic mirrors; and a plurality of third dichroic prisms, dichroic mirrors, total reflection prisms or total reflection mirrors, each of which reflects light transmitted by the second dichroic prisms or dichroic mirrors in a direction which generally coincides with a direction in which light is transmitted by the first dichroic prisms or dichroic mirrors, wherein the first dichroic prisms or dichroic mirrors, the second dichroic prisms or dichroic mirrors, and the third dichroic prisms, dichroic mirrors, total reflection prisms or total reflection mirrors, are regularly arranged.

By using the color separator comprising three color separating surfaces, all of the light beams forming the secondary light source images are color-separated at once. Also with the color separator, it is possible to form a color-separated arrangement of secondary light source images by shifting the optical paths for the respective colors from one another. In such a case, the optical system structure is folded at the color separation section, so that each optical path overlaps another, thereby reducing the volume of the optical system. The process of producing the strip array pattern is not very complicated.

When a plurality of plates, or a triangular prism and a plate are attached together via an optical adhesive, or the like, all the optical elements can be secured with a single jig. Thus, it is possible to prevent any reflection at an interface other than those which are intended to reflect light, thereby preventing undesirable color mixing which may otherwise occur by a light component reflected by such an unintended reflective surface. Moreover, by integrating the optical elements together, the rigidity of the optical system increases, thereby preventing the bending of a reflective surface, or the like. In this way, the optical system also becomes more resistant against a change in the wavelength characteristics occurring due to exposure of the dielectric multilayer film to the air, aging such as a decrease in reflectivity over time, and a shock when it is dropped on the floor, etc. A gap which may exist due to such integration can easily be accommodated by inserting a transparent plate, or by adjusting the thickness of a plate being used. If necessary, the plate can be polished to a predetermined thickness.

The color separator may be provided on the light output side of the second fly-eye lens array for providing the array of secondary light source images which are color-separated into R, G and B. In such a case, the actual secondary light source images are still white, but color-separated secondary light source images are virtually provided by the function of the color separator, as viewed from the microlens array or the image display device (virtual color separation).

Moreover, it is possible to provide a polarization converting optical element on the light source side or the light output side of the second fly-eye lens array so as to enhance the illumination light efficiency, thereby further increasing the brightness of the projection. Since the number of light beams is increased only at the position where the light beams are converged, the cross-sectional area of the optical path after the polarization conversion is not increased, thereby keeping the optical system compact.

The polarization converting optical element can alternatively be provided by regularly arranging the polarization beam splitter, the total reflection prism or total reflection mirror, and the spacer in a strip array pattern. In this way, it is possible to adjust the arrangement of the secondary light source images the number of which is increased by the polarization conversion, whereby the secondary light source images can more easily be focused onto the respective pixel apertures of the image display device.

Furthermore, the apparatus may further comprise a polarization separator provided between the light source section and the first fly-eye lens array. The polarization separator comprises: a polarization beam splitter for separating the white light beams from the light source section into a P-polarization component and an S-polarization component by reflecting one of the polarization components while transmitting the other one; and a reflector for reflecting one of the polarization components which has been transmitted by the polarization beam splitter toward the polarization beam splitter. The P-polarization component and the S-polarization component separated by the polarization separator are incident upon the first fly-eye lens array at respectively different angles while being superimposed on one another. The secondary light source images of the P-polarization component and the S-polarization component formed by the first fly-eye lens array are arranged in a direction perpendicular to a direction in which the color separator color-separates the white light beams. The apparatus may further comprise a polarization axis rotator which is provided along an optical path of either the P-polarization component or the S-polarization component, near a position where the secondary light source image spots of the P-polarization component and the S-polarization component are formed. In such a structure, the polarization separation is performed on collimated light beams each having a relatively large cross-sectional area. However, the polarization separation is performed only by controlling the P-polarization component and the S-polarization component so as to be incident upon the first fly-eye lens array at respectively different angles, with the respective optical paths substantially overlapping each other. Therefore, the optical system can be kept compact. Moreover, since the secondary light source images can be closely arranged to one another, the secondary light source images can be relatively easily focused onto the pixel apertures.

The ratio between the spot size of the secondary light source image spot and the pitch of the color-separated secondary light source image spots may be adjusted to be substantially equal to or less than the ratio between the size of the aperture of each of the color pixels of the image display device and the pitch of the color pixels, in the direction along which the color separator performs the color separation. In this way, the focused spots formed by the microlens array are completely covered by the respective pixel apertures, thereby improving the focusing efficiency, and thus obtaining a bright projection. Moreover, in this way, light of an undesirable color is not introduced to the adjacent pixel, thereby preventing the display quality from lowering due to undesirable color mixing.

Furthermore, the apparatus may further comprise a light-blocking mask provided on the light source side or the light output side of the second fly-eye lens array. The light-blocking mask comprises a plurality of openings each having a shape similar to the shape of the aperture of the color pixel of the image display device. In this way, even when there is some light that cannot be focused onto a pixel aperture, such light can be blocked by the light-blocking mask in advance. Thus, undesirable color mixing is prevented from occurring, and the display quality is prevented from lowering.

Thus, the invention described herein makes possible the advantages of providing a compact single-plate projection type color image display apparatus: which employs an LCD device having a transparent substrate of a normal thickness, thereby avoiding a reduction in the production yield of the LCD device which may occur when employing a very thin transparent substrate; which has a high illumination light efficiency; which provides a uniform illumination distribution; and which realizes a high quality display with no undesirable color mixing.

These and other advantages of the present invention will become apparent to those skilled in the art upon reading and understanding the following detailed description with reference to the accompanying figures.

BRIEF DESCRIPTION OF THE DRAWINGS

FIG. 21 illustrates an alternative color separator according to Example 5 of the present invention;

FIGS. 37A and 37B each illustrate alternative color separating optical element having a stripe array pattern;

FIG. 37C illustrates alternative polarization converting optical element having a stripe array pattern;

DESCRIPTION OF THE PREFERRED EMBODIMENTS

EXAMPLE 1

Figure 1:
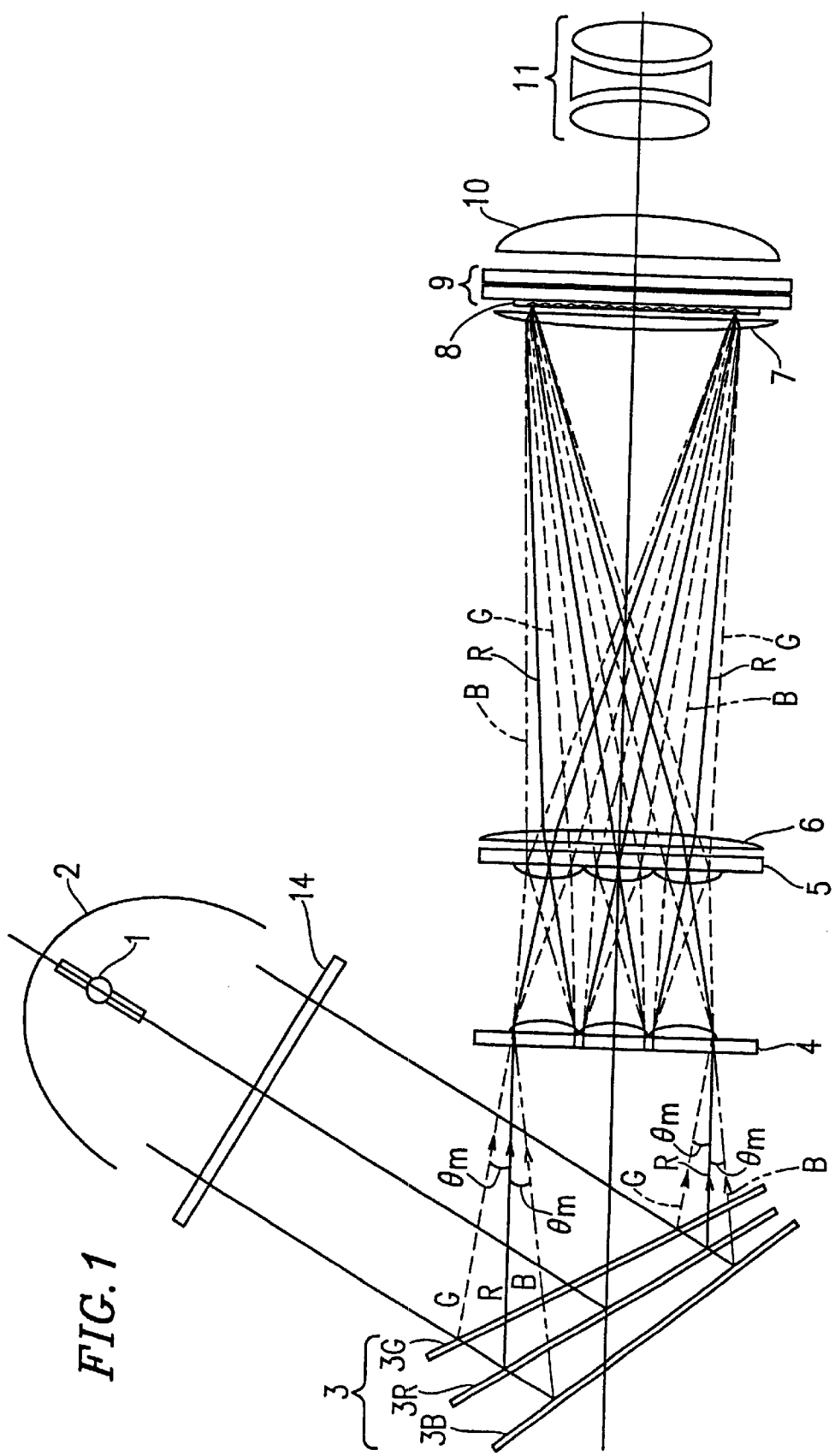
FIG. 1 illustrates a projection type color image display apparatus according to Example 1 of the present invention.

A projection type color image display apparatus according to Example 1 of the present invention will be described below with reference to FIGS. 1 to 5B. It is noted that like reference numerals denote like elements throughout the accompanying figures.

FIG. 1 illustrates the projection type color image display apparatus of Example 1, comprising a light source section including a white light source 1 and a parabolic mirror 2, a color separator 3 including dichroic mirrors 3R, 3G and 3B, a first fly-eye lens array 4, a second fly-eye lens array 5, field lenses (focusing lenses) 6 and 7, an LCD device 9 including a microlens array 8, and a projection optical system including an output-side field lens 10 and a projection lens 11.

FIG. 1 illustrates the projection type color image display apparatus as viewed from a direction along the vertical axis of the display screen of the LCD device 9. White light beam emitted from the light source 1 is color-separated into three primary color (R, G and B) beams by the color separator 3. The R, G and B beams illuminate the LCD device 9 at respectively different angles. R, G and B pixels provided in the LCD device 9 (see FIGS. 5A and 5B) modulate the R, G and B light beams, respectively. Then, the projection optical system projects the modulated light beams onto a screen (not shown).

The display screen of the LCD device 9 employed in Example 1 has a diagonal dimension of about 91 mm, an aspect ratio of about 3:4, and 480×1280 (vertical×lateral) R, G and B pixels. The R, G and B pixels are arranged in a delta arrangement at a vertical pitch of about 114 μm and a lateral pitch of about 57 μm. A delta arrangement is a type of pixel arrangement which is commonly employed in the art particularly in audio-visual applications. The LCD device 9 used in Example 1 can be produced by a method known in the art.

Figure 2:
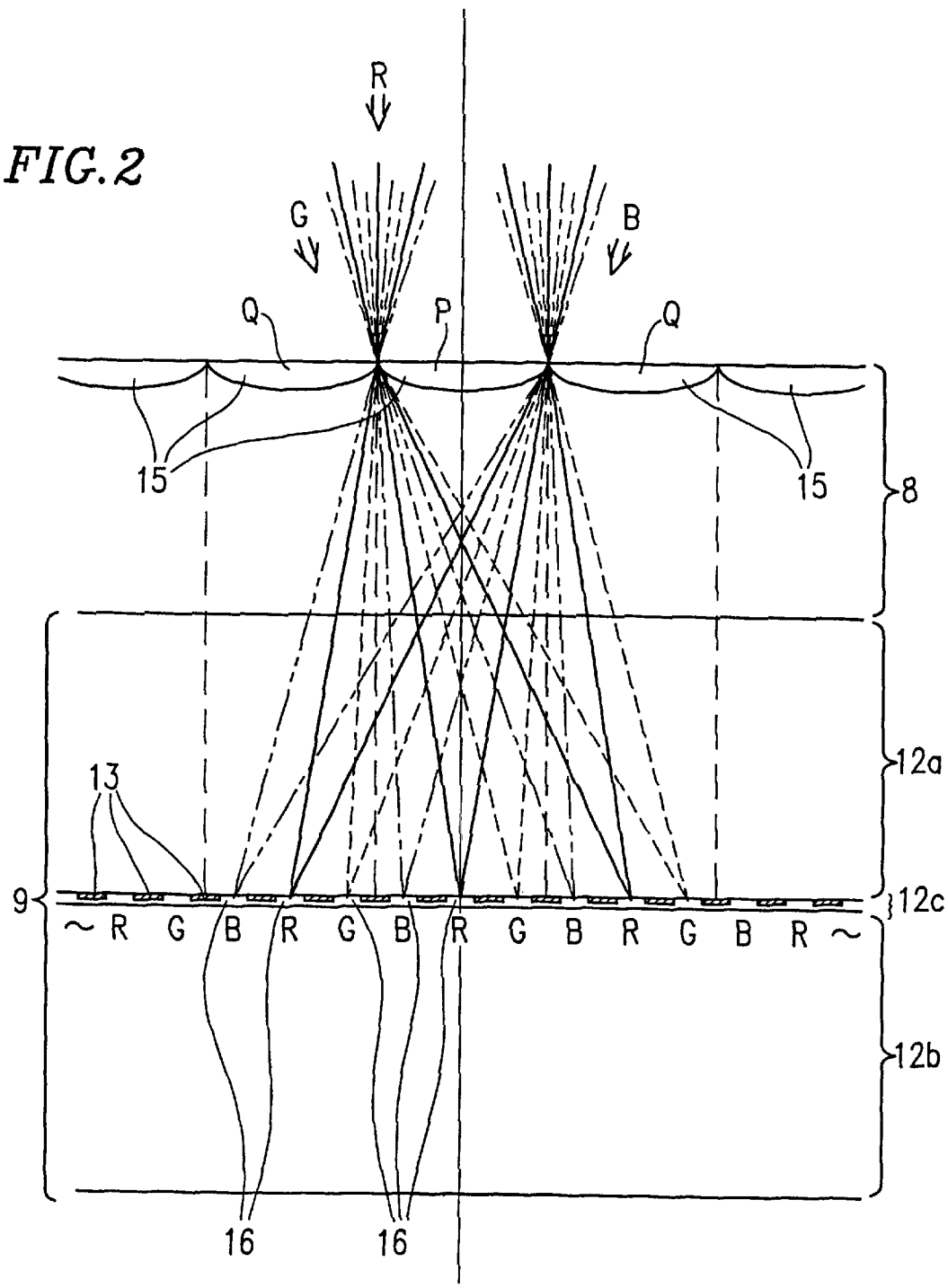
FIG. 2 is a cross-sectional view illustrating a microlens array and an LCD device provided in the projection type color image display apparatus of FIG. 1.

FIG. 2 is a cross-sectional view of the microlens array 8 and the LCD device 9 taken along the lateral axis of the display screen of the LCD device 9. The LCD device 9 includes a pair of transparent substrates 12a and 12b made of glass, or the like, a liquid crystal layer 12c provided by injecting a liquid crystal material into a gap between the transparent substrates 12a and 12b, and a black matrix 13 provided on a side of the transparent substrate 12a which faces the liquid crystal layer 12c. The black matrix 13 defines a light-blocking region for blocking incident light and an aperture 16 for transmitting incident light, for each of the R, G and B pixels.

Other components (not shown) are provided between the transparent substrates 12a and 12b for driving the liquid crystal layer, such as electrodes, TFT devices, wiring, and alignment films. A polarizing plate (not shown) is further provided in an optical path between the microlens array 8 and the LCD device 9. The thickness d of the transparent substrate 12a, 12b is about 0.7 mm (air-equivalent thickness (d/n [n=refractive index]): about 460 μm). The pixel aperture 16 is in a rectangular shape having a vertical dimension of about 85 μm and a lateral dimension of about 41 μm.

In order to improve the light efficiency and thus a bright projection, it may be necessary to provide an illumination optical system so as to localize the illumination light to the pixel aperture 16. An exemplary design of the optical system according to the above-described specification of the LCD device 9 will be described below.

As the white light source 1, a short-arc metal halide lamp is used whose power consumption is about 100 W. Alternatively, a halogen lamp or a xenon lamp may be used.

The parabolic mirror 2 has a focal length of about 14 mm. The lamp arc is arranged at the focal point of the parabolic mirror 2, so as to obtain substantially collimated white light beams each having a diameter of about 65 mm. The degree of parallelization (i.e., the angular distribution of the light beams with respect to the optical axis) is about ±3° or less. The light beams from the white light source 1 can alternatively be collimated by using a spherical mirror, with the lamp arc arranged at the spherical center, and further employing a condenser lens whose focal point is adjusted to generally coincide with the position of the lamp arc. Any other appropriate method may alternatively be used as long as a predetermined degree of parallelization is achieved.

A UV-IR cut filter 14 is provided on the output side of the parabolic mirror 2 so as to prevent undesirable ultraviolet and infrared rays from being incident upon the LCD device 9.

Each of the dichroic mirrors 3R, 3G and 3B includes a transparent plate which is coated with a dielectric multilayer film using a thin film coating technique known in the art. The dichroic mirrors 3R, 3G and 3B selectively reflect light having a wavelength band of red, green and blue, respectively, while transmitting light of any other wavelength band. The dichroic mirrors 3R, 3G and 3B are arranged at respectively different angles with respect to the path of white light from the light source section.

Red light (hereinafter, an "R beam") reflected by the dichroic mirror 3R is vertically incident upon the first fly-eye lens array 4. Green light (hereinafter, a "G beam") reflected by the dichroic mirror 3G and blue light (hereinafter, a "beam") reflected by the dichroic mirror 3B are incident upon the first fly-eye lens array 4 at an angle θm (in opposite directions, respectively) with respect to the incident angle of the R beam. When the R, G and B beams illuminate the first fly-eye lens array 4, the R, G and B beams are superimposed on one another. In various figures, including FIG. 1, the R, G and B light beams color-separated by the dichroic mirrors 3R, 3G and 3B are indicated by a solid line, a broken line, and a two-dot chain line, respectively.

Figure 3:
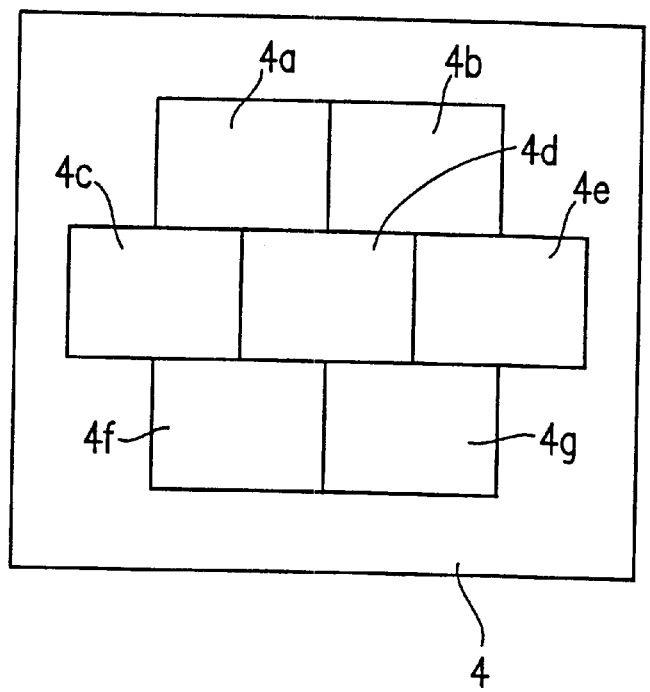
FIG. 3 is a plan view illustrating a first fly-eye lens array provided in the projection type color image display apparatus of FIG. 1.

FIG. 3 is a plan view illustrating a first fly-eye lens array 4. The first fly-eye lens array 4 includes seven rectangular lenses 4a to 4g arranged as shown in FIG. 3. Each of the lenses 4a to 4g has a vertical dimension of about 15.8 mm and a lateral dimension of about 21 mm. The aspect ratio and the arrangement of the lenses 4a to 4g respectively correspond to the aspect ratio (about 3:4) of the display screen of the LCD device 9 and the pixel arrangement thereof.

Figure 4:
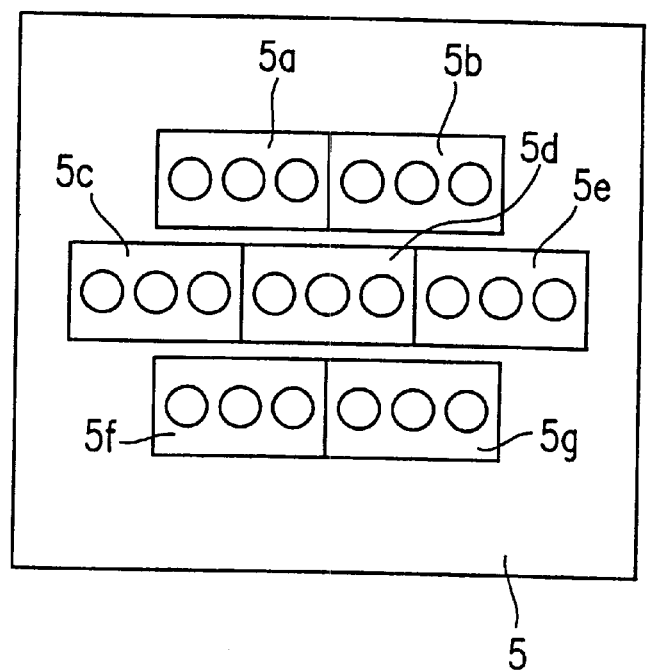
FIG. 4 is a plan view illustrating a second fly-eye lens array provided in the projection type color image display apparatus of FIG. 1.

FIG. 4 illustrates the second fly-eye lens array 5. The second fly-eye lens array 5 includes the same number (seven) of lenses 5a to 5g as that of the first fly-eye lens array 4. Each of the lenses 4a to 4g of the first fly-eye lens array 4 has a focal length f1 of about 48 mm, and the second fly-eye lens array 5 is arranged along or near the focal plane. Thus, the first fly-eye lens array 4 forms an array of spots of a secondary light source image on the second fly-eye lens array 5 as indicated by small circles in FIG. 4. The size of each spot is $2 \cdot f1 \cdot \tan 3° \approx 5$ mm, with the degree of parallelization of the incident light being about $\pm 3°$.

Because the R, G and B beams have different incident angles as described above, three spots (R, G and B spots) are formed on each of the seven lenses 5a to 5g. In total, 21 spots are formed on the second fly-eye lens array 5. Among the 21 spots, three spots (of three different colors) formed by the lens 4a are incident upon the lens 5a, and other three spots formed by the lens 4b are incident upon the lens 5b. Thus, the lenses 4a–4g of the first fly-eye lens array 4 correspond to the lenses 5a–5g of the second fly-eye lens array 5, respectively. Moreover, the spots formed by the lenses 4a–4g and the lenses 5a–5g are arranged in a pattern similar to the pixel arrangement of the LCD device 9 (see FIG. 5A). For example, the nine spots formed by the three lenses 4c, 4d and 4e, which are arranged horizontally in FIG. 3, are generally aligned along a horizontal line on the second fly-eye lens array 5 at a pitch of about 7 mm. Each of the spots has a spot size (about 5 mm) as generally shown by the circles in FIG. 4. Similarly, the six spots formed by the lenses 4f and 4g are generally aligned along a horizontal line on the second fly-eye lens array 5 at a pitch of about 7 mm.

The adjacent horizontal lines, along which the respective groups of spots are aligned, are apart from each other by a distance of about 14 mm. Therefore, the lenses 4a and 4b, and the lenses 4f and 4g, are slightly decentered downwardly and upwardly, respectively, in order to slightly deflect the incident light toward the respective lenses 5a, 5b, 5f and 5g, and the lenses 5a, 5b, 5f and 5g are also slightly decentered upwardly and downwardly in order to deflect the principal rays so that the principal rays which pass through the lenses 5a, 5b, 5f and 5g are parallel to the optical axis. The deflection angle θm applied to each of the incident R, G and B beams, which satisfies the horizontal arrangement condition, is about 8.3° based on f1·tan θm=about 7 mm.

As described above, the secondary light source image spots are arranged in a pattern similar to the pixel arrangement of the LCD device 9 (the color arrangement of the secondary light source image spots is also similar to the color arrangement of the pixels of the LCD device 9). Moreover, the ratio α between the spot size and the spot pitch on the second fly-eye lens array 5 generally coincides with the ratio β between the aperture width and the lateral pixel pitch of the LCD device 9. Thus, the lens surfaces of the lenses 4a to 4g are superimposed on one another on the display screen of the LCD device 9 by virtue of the lens effect provided by the lenses 5a to 5g together with the lens effect provided by the first focusing lens 6.

The second focusing lens 7 is provided for collimating light beams from the beam spots on the second fly-eye lens array 5 before the light beams are incident upon the microlens array 8. Thus, the focal point of the first focusing lens 6 is adjusted to generally coincide with the display plane of the LCD device 9, while the focal point of the second focusing lens 7 is adjusted to generally coincide with the second fly-eye lens array 5. In this way, the illumination distribution on the display plane of the LCD device 9 is averaged. This means that the illumination distribution in the image projected onto the projection screen (not shown) is also averaged.

The lenses 5a to 5g do not have to be adjacent to one another as long as each of the lenses 5a to 5g covers the three secondary light source spots. While the lenses are adjacent to one another horizontally and spaced apart from one another vertically in Example 1, the present invention is not limited to such an arrangement.

Next, the microlens array 8 used in Example 1 will be described below with reference to FIG. 5A. The microlens array 8 according to Example 1 of the present invention comprises a transparent substrate (not shown) made of glass, or the like, and a number of hexagonal microlenses 15 which are closely adjacent to one another. The microlens array 8 is attached to the transparent substrate 12a of the LCD device 9 via an optical adhesive.

Figure 5A:
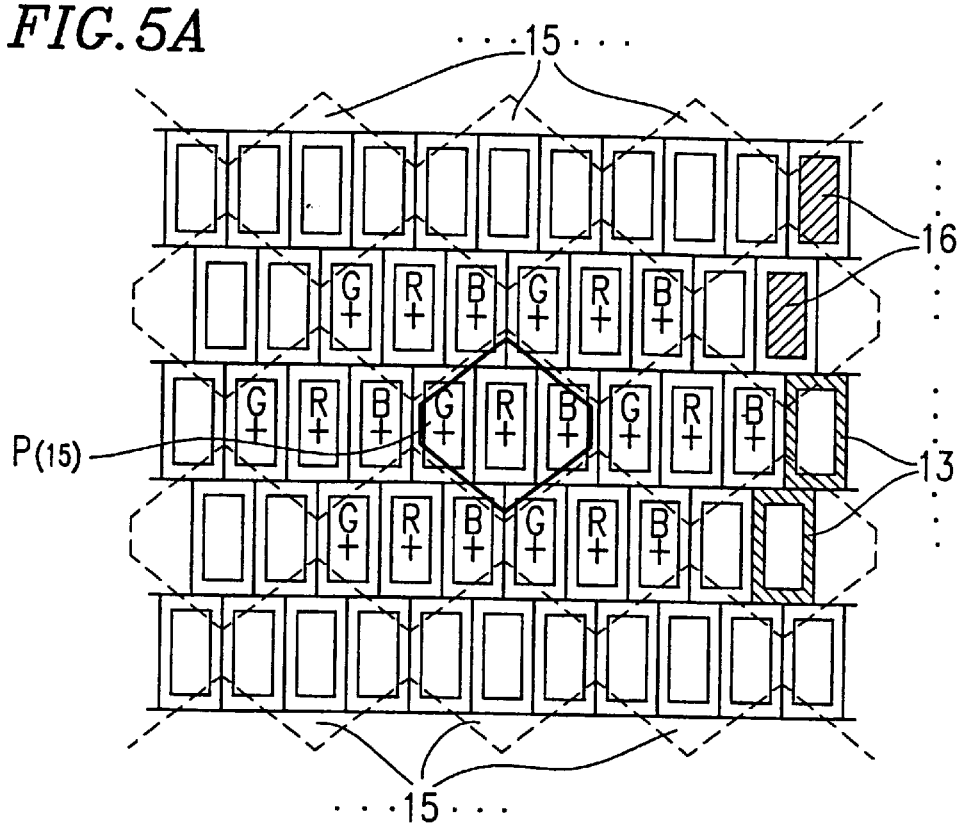
FIGS. 5A and 5B illustrate the shape of each microlens of the microlens array provided in the projection type color image display apparatus of FIG. 1 and the arrangement thereof with respect to the pixel arrangement of the LCD device provided therein.

FIG. 5A illustrates the shape of the microlenses 15 and the arrangement thereof with respect to the pixel arrangement of the LCD device 9, wherein a solid line is used to denote the boundary of each pixel, and a broken line is used to denote the boundary of each microlens 15.

Each microlens 15 corresponds (in size) to three pixels (R, G and B pixels) of the LCD device 9. The lateral pitch of the microlens 15 is generally equal to the lateral pixel pitch of the LCD device 9 times three (about 171 μm). The vertical pitch of the microlens 15 is generally equal to the vertical pixel pitch of the LCD device 9 (about 114 μm). Moreover, the microlenses 15 are arranged in a delta arrangement conforming to that of the pixel arrangement of the LCD device 9. The center of each microlens 15 is generally aligned with the center of the aperture 16 of an R pixel.

An operation of the microlens 15 will be described below with reference to a particular microlens designated "P(15)" in FIG. 5A. First, 21 secondary light source image spots are formed by the dichroic mirrors 3R, 3G and 3B and the first fly-eye lens array 4, and the light beams from the respective beam spots are incident upon the microlens P(15). Then, the microlens P(15) focuses the light beams respectively onto the aperture centers (generally indicated by the symbol "+" in FIG. 15A) of the 21 pixels illustrated in FIG. 5A centered about the R pixel corresponding to the microlens P(15). This can be achieved for the following reasons. The secondary light source image spots are arranged in a pattern similar to the pixel arrangement of the LCD device 9, while the relationship α≦β is satisfied (α: the ratio between the spot size and the spot pitch on the second fly-eye lens array 5, and β: the ratio between the aperture width and the lateral pixel pitch of the LCD device 9), whereby the plane on which the secondary light source image spots are formed is shrunk and imaged by the microlens P(15) onto the pixel positions. The beam spot focused on a pixel of the LCD device 9 is not blocked by the black matrix 13 because the size of the beam spot is less than or equal to that of the aperture of the pixel. Thus, it is possible to improve the effective focusing efficiency, and to obtain a bright projection.

FIG. 2 is another view of the microlens 15 performing the focusing function as viewed from another direction. FIG. 2 only shows light beams, which pass through the microlens P(15) and which are focused on the plane of the figure, i.e., the nine light beams from the lenses 4c, 4d, 4e and the lenses 5c, 5d, 5e.

In the plane of the figure, three light beams (R, G and B beams) from each of three different directions, i.e., nine light beams, are incident upon the microlens P(15). Each of the nine light beams is focused onto the aperture 16 of one of nine adjacent pixels which is of the corresponding color. Thus, each R beam indicated by a solid line is focused onto an R pixel, each G beam indicated by a broken line is focused onto a G pixel, and each B beam indicated by a two-dot chain line is focused onto a B pixel. Meanwhile, a microlens Q laterally shifted from the microlens P(15) is similarly performing the focusing function for a set of pixels which are laterally shifted by three pixels. Moreover, other microlenses 15 (not shown in FIG. 2) vertically shifted from the microlens P(15) are also performing the focusing function for a different set of pixels. As a result, focused light beams of one color are incident upon a pixel of the same color from seven different microlenses 15. Each microlens 15 focuses light beams onto 21 pixels in total (seven pixels for each color).

As described above, R beams are guided to R pixels, G beams to G pixels, and B beams to B pixels. As a result, it is possible to obtain a bright projection because there is substantially no absorption loss according to the present invention which may otherwise occur particularly when a color filter is used to selectively transmit a certain color component of white light.

The focal length of each microlens 15 and the distance between the microlens 15 and the corresponding pixel may be determined based on the distance from the plane, on which the secondary light source image spots are formed, to the microlens 15 and the rate of shrinkage to be provided by the microlens 15. In Example 1, the focal length of the microlens 15 is about 1360 μm, and the air-equivalent distance between the microlens 15 and the corresponding pixel is about 1370 μm, which is longer than the typical thickness of the glass substrate currently employed in an LCD device (about 1.1 mm) or that of Example 1 (about 0.7 mm). A sufficient thickness may not be obtained only by the transparent substrate 12a. However, this can easily be addressed by the thickness of the microlens array 8, or by additionally providing a thickness-adjusting transparent substrate.

It is possible to provide the second fly-eye lens array 5 with the refraction function of the first focusing lens 6 by varying the curvature of each of the lenses 5a to 5g and by decentering the lenses 5a to 5g in the vertical and/or lateral direction. In such a case, the first focusing lens 6 may be omitted, so that the respective lenses 5a to 5g of the second fly-eye lens array 5 image the lens surfaces of the lenses 4a to 4g so that the lenses 4a to 4g are superimposed on the display screen of the LCD device 9, thereby making the illumination distribution on the display plane uniform.

Figure 5B:
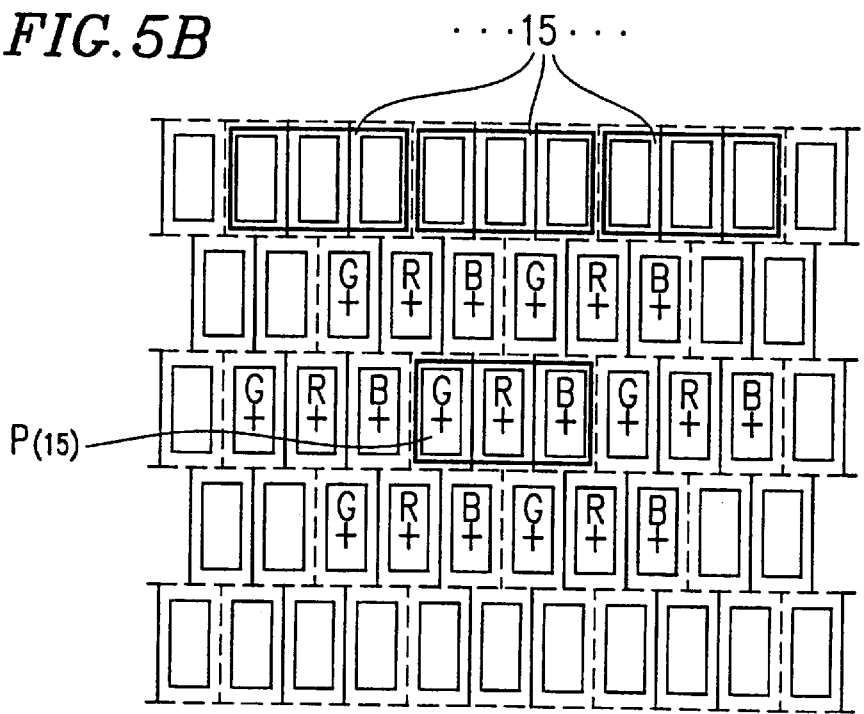

With the above-described structure, it is possible to realize a compact single-plate projection type color image display apparatus with no color filter which is still capable of making the illumination distribution uniform and providing a bright display. Moreover, the microlens array may be positioned farther away from the LCD device than in the prior art, whereby the thickness of the transparent substrate of the LCD device does not have to be reduced excessively. Moreover, while a hexagonal shape as illustrated in FIG. 5A is employed for the microlens 15 in Example 1, a rectangular shape as illustrated in FIG. 5B encompassing a set of R, G and B pixels may alternatively be employed.

EXAMPLE 2

A projection type color image display apparatus according to Example 2 of the present invention will be described below with reference to FIGS. 6 to 10.

Figure 6:
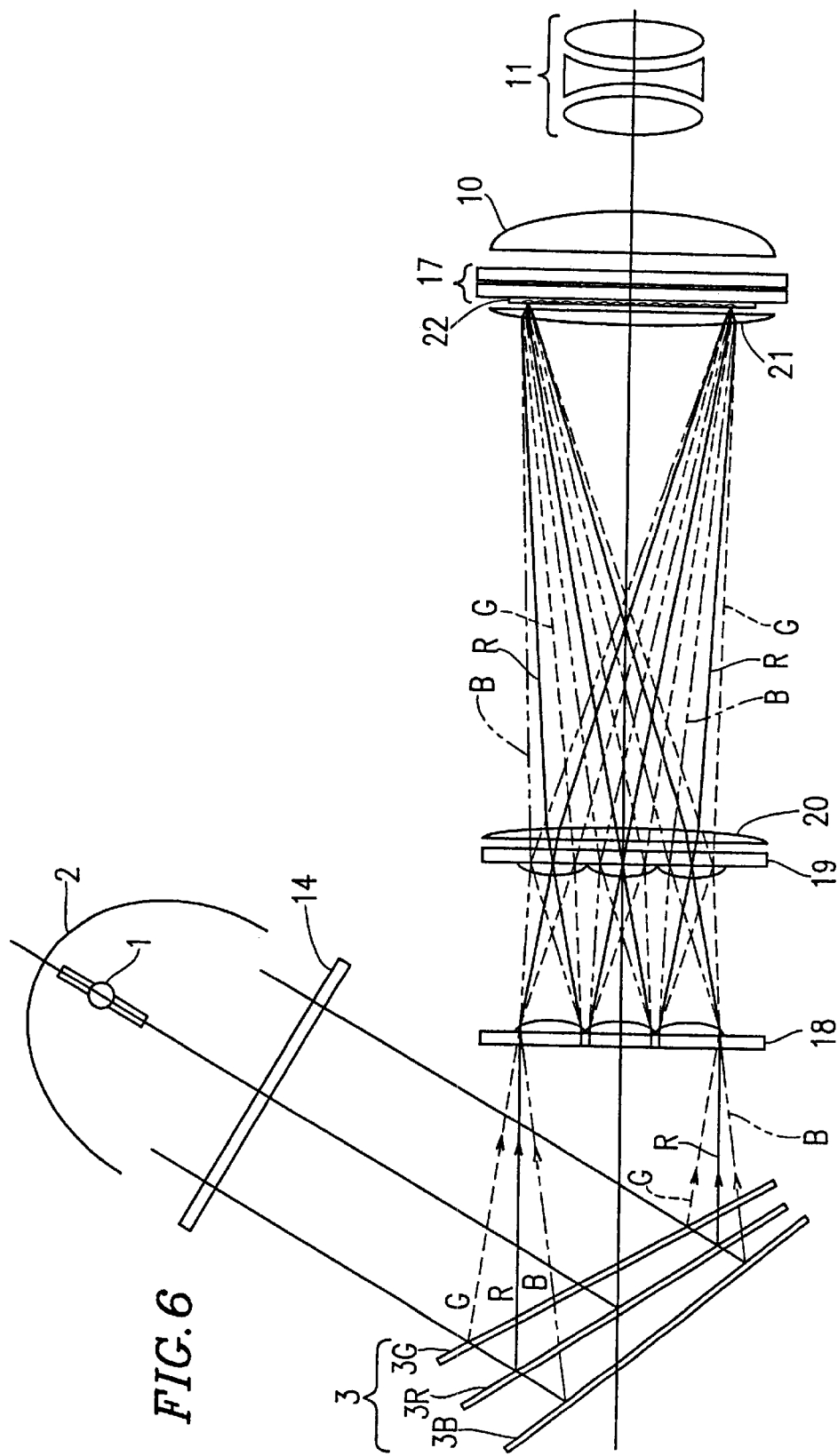
FIG. 6 illustrates a projection type color image display apparatus according to Example 2 of the present invention.

FIG. 6 illustrates a projection type color image display apparatus according to Example 2 of the present invention. A primary difference from that illustrated in FIG. 1 is in the LCD device 17, which will be described in detail below, while some modifications associated with the specification of the LCD device 17 are made to the optical system.

The display screen of the LCD device 17 employed in Example 2 has a diagonal dimension of about 91 mm, an aspect ratio of about 3:4, and 480×[640×3(RGB)=1920] (vertical×lateral) pixels. The R, G and B pixels are arranged in a stripe arrangement at a vertical pitch of about 114 μm and a lateral pitch of about 38 μm. This is a so-called "VGA (video graphics array)" type display. A stripe arrangement is also commonly employed in office-automation (information display) applications.

The lateral dimension of the pixel aperture is about 22 μm and the vertical dimension thereof is about 85 μm. As compared to those of the LCD device 9 employed in Example 1, the screen size is the same, but the pixel pitch and the aperture width are reduced as the number of pixels provided in the lateral direction is increased.

Figure 7:
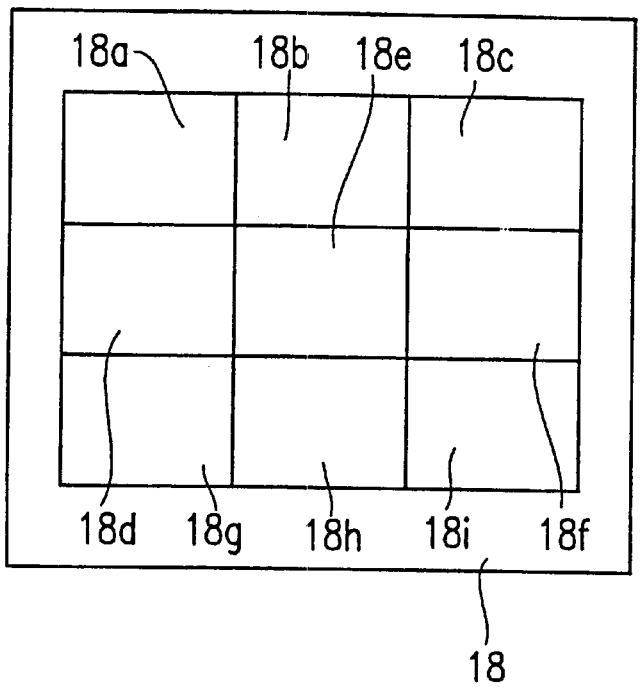
FIG. 7 is a plan view illustrating a first fly-eye lens array provided in the projection type color image display apparatus of FIG. 6.
Figure 8:
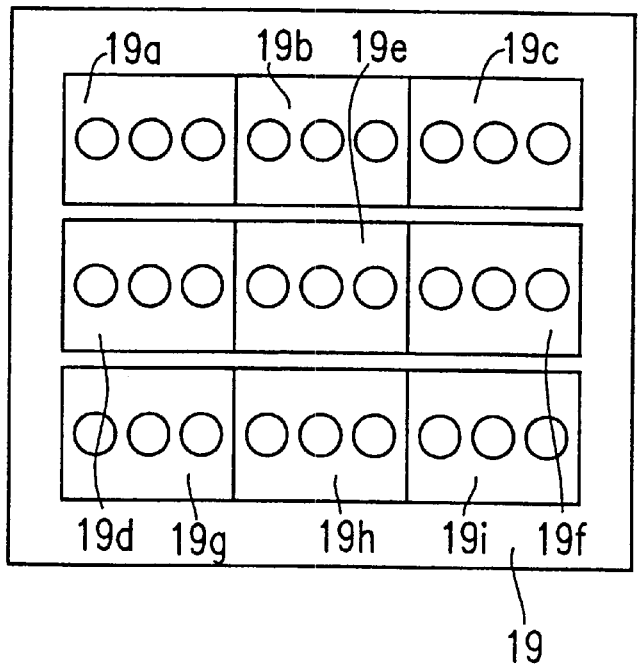
FIG. 8 is a plan view illustrating a second fly-eye lens array provided in the projection type color image display apparatus of FIG. 6.

Secondary light source image spots arranged according to the stripe arrangement of the LCD device 17 are obtained as follows. FIGS. 7 and 8 respectively illustrate a first fly-eye lens array 18 and a second fly-eye lens array 19 employed in Example 2.

Referring to FIG. 7, the first fly-eye lens array 18 includes nine (3 rows×3 columns) rectangular lenses 18a to 18i. The vertical and lateral dimensions of each lens are about 12.8 mm and about 17 mm, respectively, so as to accommodate illumination light having an effective diameter of about 65 mm while setting the aspect ratio of the lens to about 3:4.

The first fly-eye lens array 18 forms 27 secondary light source image spots (9 lenses×3 colors). As illustrated in FIG. 8, the 27 spots are aligned in three horizontal lines each containing nine spots. The adjacent horizontal lines are apart from each other by a distance of about 17 mm. The lateral pitch of the spot is set so that three spots (R, G and B spots) are aligned within a length of about 17 mm. Accordingly, the focal length f1 of the lenses 18a to 18i is set to about 31.3 mm, and the deflection angle θm applied to each of the incident R, G and B beams is set to about 10.3°.

Then, the secondary light source image spot has a diameter of about 3.3 mm, and the lateral pitch of the spot is about 5.7 mm. The ratio between the spot diameter and the lateral spot pitch generally coincides with the ratio between the lateral dimension of the pixel aperture and the pixel pitch of the LCD device 17. The obtained spots are arranged in a pattern similar to the stripe pixel arrangement of the LCD device 17.

For vertically adjusting the spot position, the lenses 18a, 18b, 18a and the lenses 18g, 18h, 18i are slightly decentered upwardly and downwardly, respectively, in order to slightly deflect the incident light toward the respective lenses 19a, 19b, 19c, 19g, 19h and 19i, and the lenses 19a, 19b, 19c, 19g, 19h and 19i are also slightly decentered upwardly and downwardly in order to deflect the principal rays so that the principal rays which pass through the lenses 19a, 19b, 19c, 19g, 19h and 19i are parallel to the optical axis.

Referring to FIG. 8, the second fly-eye lens array 19 includes nine (3 rows×3 columns) lenses 19a to 19i. The lateral pitch and the vertical pitch of the lenses 19a to 19i are both about 17 mm. As in Example 1, the images of the lenses 18a to 18i are superimposed on the display screen of the LCD device 17 by means of the lenses 19a to 19i, along with the optical refraction provided by a first focusing lens 20 (FIG. 6).

Figure 9:
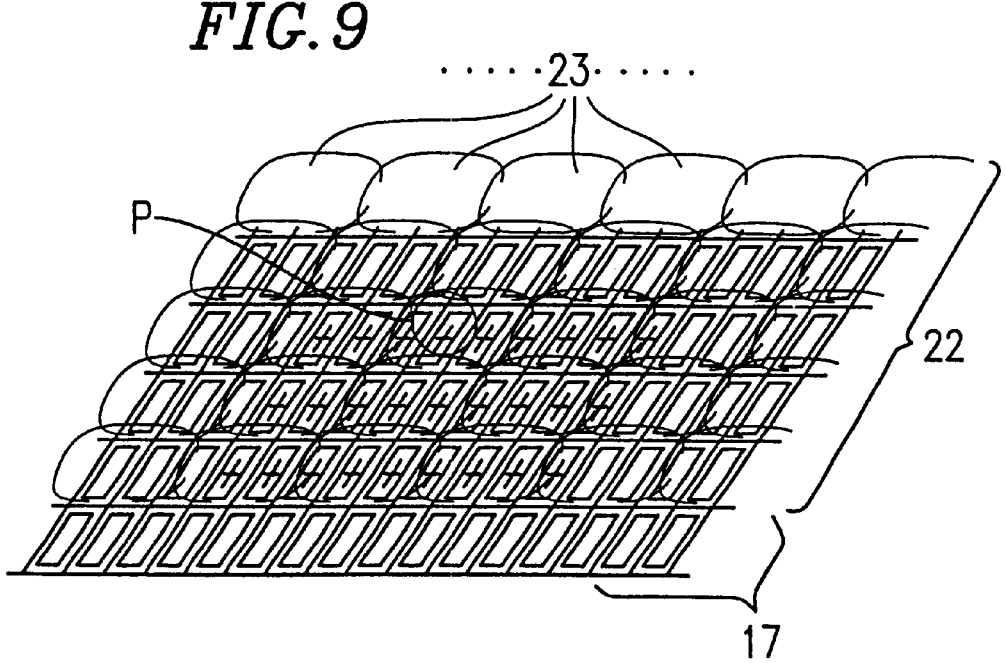
FIG. 9 illustrates the shape of each microlens of the microlens array provided in the projection type color image display apparatus of FIG. 6 and the arrangement thereof with respect to the pixel arrangement of the LCD device provided therein.

Referring to FIG. 9, a microlens array 22 includes a number of rectangular microlenses 23 which are arranged in a matrix pattern corresponding to the pixel arrangement of the LCD device 17. One microlens 23 is provided for three pixels (R, G and B pixels). Accordingly, the lateral dimension of each microlens 23 is three times as much as the pixel pitch, while the vertical dimension thereof is generally equal to the pixel pitch.

An operation of the microlens 23 will be described below with reference to a particular microlens designated "P" in FIG. 9. First, the microlens P receives light beams from 27 different directions and focuses the light beams respectively onto the aperture centers (generally indicated by the symbol "+" in FIG. 9) of the 27 pixels. Onto each pixel aperture, light beams of one color are focused by nine microlenses 23.

Figure 10:
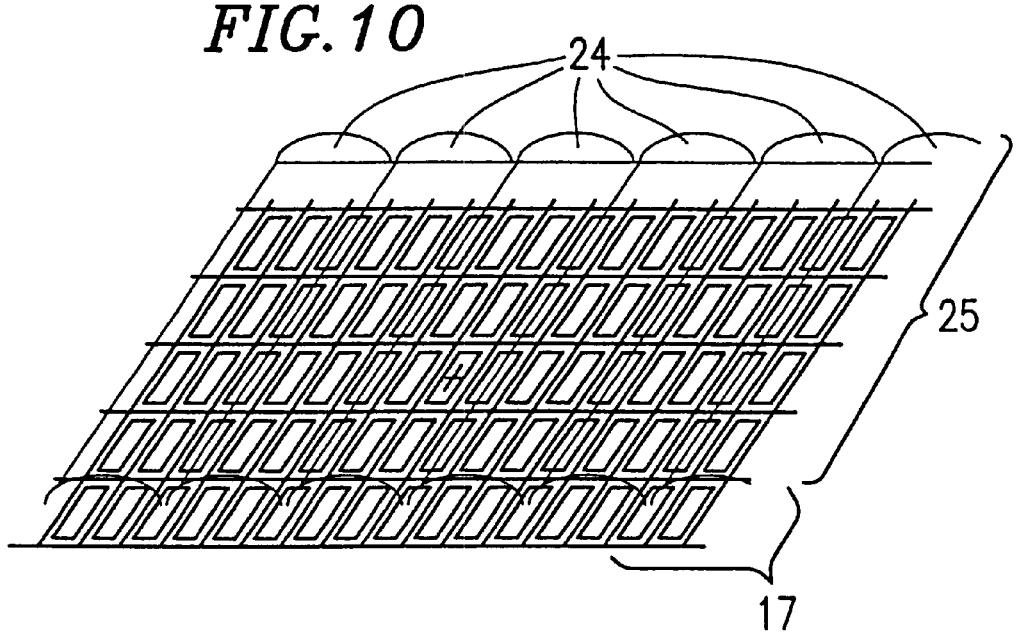
FIG. 10 illustrates the shape of each microlens of another microlens array provided in the projection type color image display apparatus of FIG. 6 and the arrangement thereof with respect to the pixel arrangement of the LCD device provided therein.

Example 2 also provides the effect of making the illumination distribution uniform and the effect of improving the effective focusing efficiency as those of Example 1.

Where the LCD device employs a stripe arrangement as in Example 2, an array of lenticular lenses may alternatively be used as the microlens array. FIG. 10 illustrates such a lenticular lens array 25 and the arrangement thereof with respect to the pixel arrangement of the LCD device 17.

The lenticular lens array 25 as illustrated in FIG. 10 includes a number of lenticular lenses 24 each having a width three times as much as the lateral pixel pitch of the LCD device 17. The lenticular lens 24 has a lens function only in the lateral direction. Thus, each lenticular lens 24 focuses an array of secondary light source image spots onto pixel apertures in the form of nine R, G and B strips.

If other components of the optical system and the configuration thereof are unchanged, the focal length of the lenticular lens 24 is the same as that of the microlens 23, so that each strip of focused light has a lateral dimension that is accommodated by the lateral aperture dimension of the corresponding pixel. Since the lenticular lens 24 does not focus light in the vertical direction, some light may be incident upon the black matrix, thereby reducing the effective focusing efficiency. As a result, the projected image may be slightly darker than that obtained with the microlens array 22. However, when the pixel is elongated in the vertical direction and the vertical dimension of the aperture is large, as in a stripe arrangement, the optical loss may be reduced. Moreover, it is easier to produce an array of lenticular lenses than an array of rectangular microlenses.

The microlens array or the lenticular lens array can be produced by any of the various techniques known in the art, including: an ion exchange method as disclosed in Appl. Opt. Vol. 21, p. 1052 (1984) or Electron. Lett. Vol 17, P. 452 (1981); a swelling method as disclosed in New Method For Producing Plastic Microlens, Suzuki, et al., the 24th meeting of the Micro-Optics Society; a heat treatment method as disclosed in Zoran D. Popovic et al., "Technique monolothic of microlens arrays", Appl. Opt. vol. 27, p. 1281 (1988); a vapor deposition method as disclosed in Japanese Laid-Open Publication No. 55-135808; a heat transfer method as disclosed in Japanese Laid-Open Publication No. 61-64158; a mechanical processing method: and a method as disclosed in Japanese Laid-Open Publication No. 3-248125.

EXAMPLE 3

A projection type color image display apparatus according to Example 3 of the present invention will be described below with reference to FIGS. 11 to 13. In Examples 1 and 2, each microlens focuses a single secondary light source image spot onto a single pixel aperture. Moreover, in Examples 1 and 2, the pixel aperture is not in a square shape but in a vertically elongated rectangular shape, and therefore the design of the optical system is limited by the smaller (lateral) dimension of the pixel aperture. Thus, each beam spot formed on the pixel aperture has a diameter which is generally equal to the lateral dimension of the aperture. Therefore, the upper and lower portions of the pixel aperture outside the beam spot may not be efficiently used. In Example 3, the arrangement of the secondary light source image spots formed by the first fly-eye lens array is modified so that light passes through such portions of the pixel aperture which may not effectively be used in Examples 1 and 2. Example 3 which will be described below is a modified version of Example 2 above.

Figure 11:
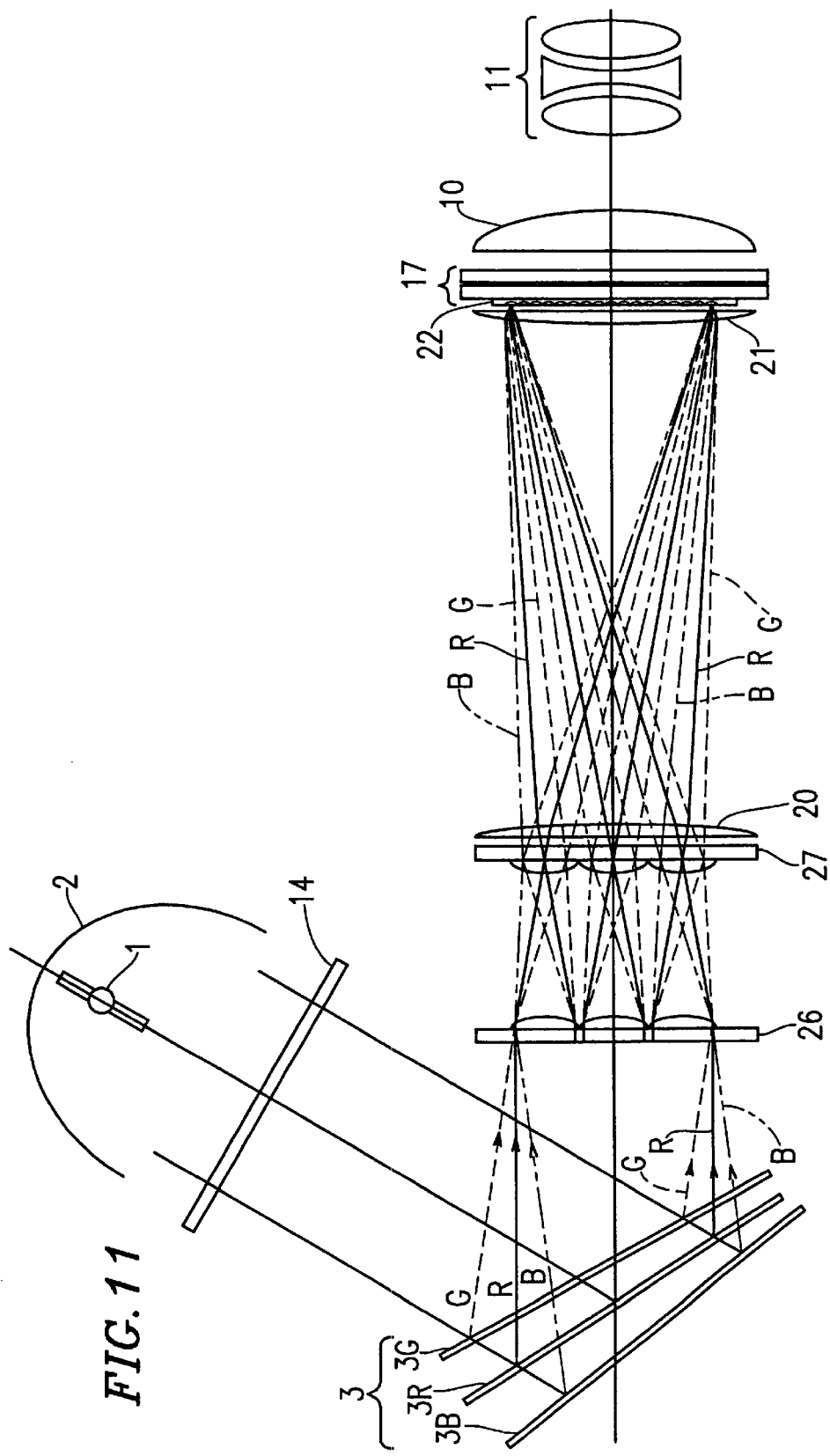
FIG. 11 illustrates a projection type color image display apparatus according to Example 3 of the present invention.

FIG. 11 illustrates a projection type color image display apparatus according to Example 3 of the present invention. A primary difference from that of Example 2 illustrated in FIG. 6 is in a first fly-eye lens array 26 and a second fly-eye lens array 27.

Figure 12:
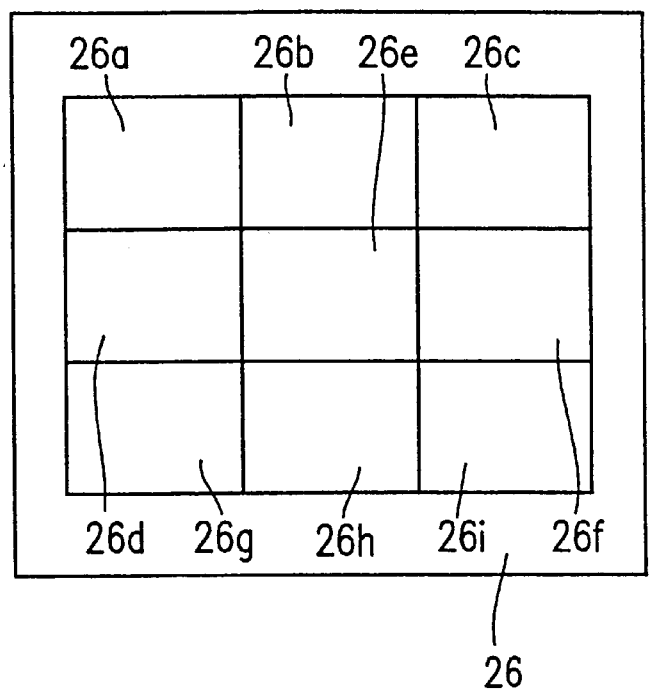
FIG. 12 is a plan view illustrating a first fly-eye lens array provided in the projection type color image display apparatus of FIG. 11.
Figure 13:
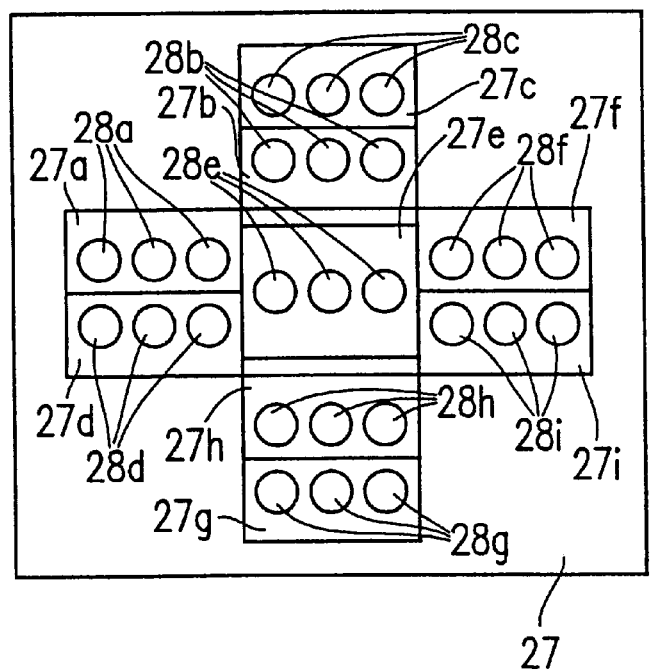
FIG. 13 is a plan view illustrating a second fly-eye lens array provided in the projection type color image display apparatus of FIG. 11, and also illustrating the arrangement of secondary light source image spots formed thereon.

FIG. 12 illustrates a plan view of the first fly-eye lens array 26 according to Example 3, comprising nine lenses 26a to 26i. The lenses 26a to 26i and the focal length thereof are the same as those of Example 2. However, the lenses 26a to 26i are decentered both in the vertical direction and in the lateral direction, while secondary light source image spots 28a to 28i and lenses 27a to 27i of the second fly-eye lens array 27 are arranged as illustrated in FIG. 13. The spot 28a formed by the lens 26a is shifted toward the spot 28d formed by the lens 26d, the spot 28g formed by the lens 26g toward the spot 28h formed by the lens 26h, the spot 28i formed by the lens 26i toward the spot 28f formed by the lens 26f, and the spot 28c formed by the lens 26c toward the spot 28b formed by the lens 26b. The shifting is done in a manner such that each pair of spots of the same color are aligned vertically, and the pairs of vertically aligned spots are arranged in a pattern similar to the pixel arrangement of the LCD device.

When the pair of spots are excessively spaced apart from each other, an image formed by the microlens array may extend beyond the upper/lower edge of the pixel aperture. Therefore, it is preferred to keep the pair of spots adjacent to each other.

The arrangement of the second fly-eye lens array 27 corresponds to the arrangement of the secondary light source image spots. As illustrated in FIG. 13, the second fly-eye lens array 27 includes four pairs of lenses (27a and 27d, 27b and 27c, 27f and 27i, 27g and 27h) centered about the lens 27e. Each pair is spaced apart from the lens 27e by a distance of about 17 mm. Three (R, G and B) secondary light source image spots are incident upon each of the lenses 27a to 27i. The size of each lens may be determined so that it can cover the three (R, G and B) spots incident thereupon. The spot or light beam does not have to be incident along the horizontal center line of the lens. Moreover, the lenses 27a to 27i are decentered in the vertical and lateral direction so that the principal ray of the R beam, which is the center color of R, G and B, exits the lens parallel to the optical axis.

The microlens array employed in Example 3 is the same as the microlens array 22 employed in Example 2. Since the secondary light source image spots are arranged in a cross ("+") shape in Example 3, the beam spots are focused onto the aperture of the pixel corresponding to the center of the microlens 23 (FIG. 9) ("center pixel") and the apertures of other four pixels which are adjacent to the center pixel in the vertical or lateral direction.

In Example 3, the light which is focused onto a pixel diagonally adjacent to the center pixel in Example 2 is focused onto another pixel which is adjacent to the diagonally-adjacent pixel in the vertical or lateral direction. As a result, the total amount of light focused onto each pixel is unchanged from that of Example 2. However, in Example 3, there is no light which is incident upon a pixel from a microlens 23 located diagonally with respect to the pixel. Therefore, the angle between the light beam passing through the LCD device 17 and the optical axis is smaller than in Example 2. As a result, regarding the projection optical system, it is possible to employ a lens with a smaller lens aperture, in other words, a lens with a larger F number. Generally, a lens having a larger lens aperture, and thus a smaller F number, is more expensive. Therefore, Example 3 of the present invention can reduce the cost of the display apparatus.

In the LCD device 17 employed in Example 3, there still exists some space near the upper or lower edge of a pixel aperture, which may accommodate another secondary light source image spot. Therefore, it may be possible to provide three or more secondary light source image spots vertically aligned together for each pixel by increasing the number of lenses of the first fly-eye lens array 26 and that of the second fly-eye lens array 27 while bringing the vertically aligned spots closer together.

EXAMPLE 4

A projection type color image display apparatus according to Example 4 of the present invention will be described below with reference to FIGS. 14 to 19. It is noted that while a delta arrangement as in Example 1 is employed in Example 4, a stripe arrangement may also be employed with necessary modifications as those which are made in Example 2 with respect to Example 1.

Figure 14:
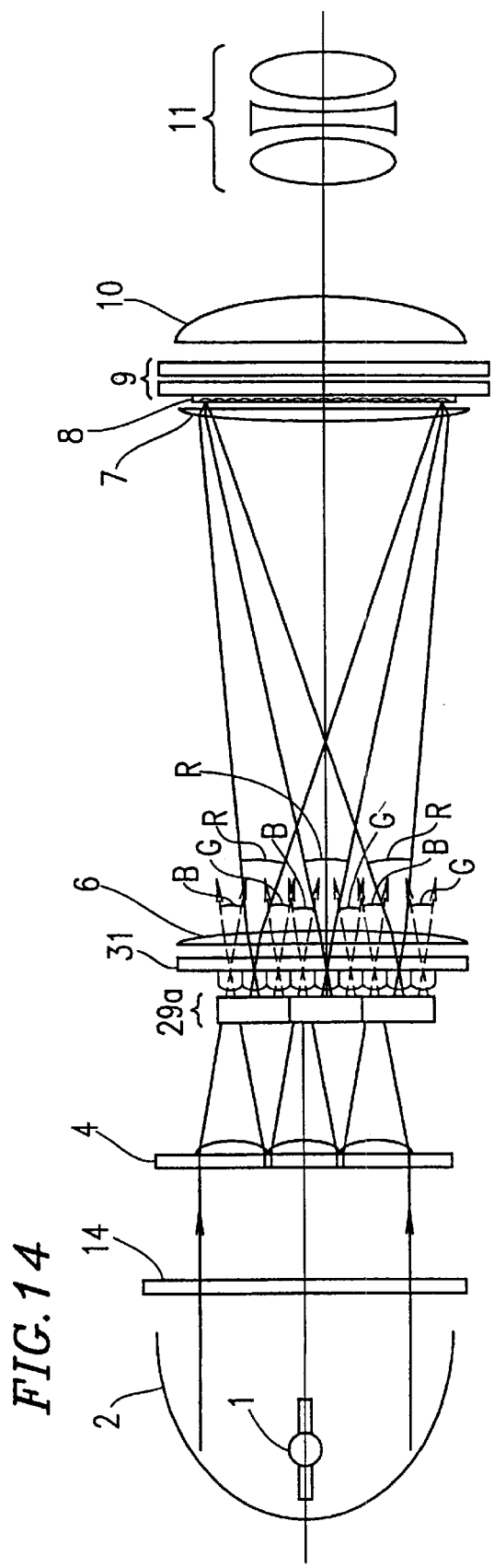
FIG. 14 illustrates a projection type color image display apparatus according to Example 4 of the present invention.

FIG. 14 illustrates a projection type color image display apparatus according to Example 4 of the present invention. In Example 4, the substantially collimated white light beams from the light source section are incident upon the first fly-eye lens array 4 before they are color-separated by a color separator. The first fly-eye lens array 4 is the same as that of Example 1. A color separating optical element 29a is provided at a position where the light beams are sufficiently narrowed or focused. The color separating optical element 29a separates the white light into light beams of three colors.

Figure 15:
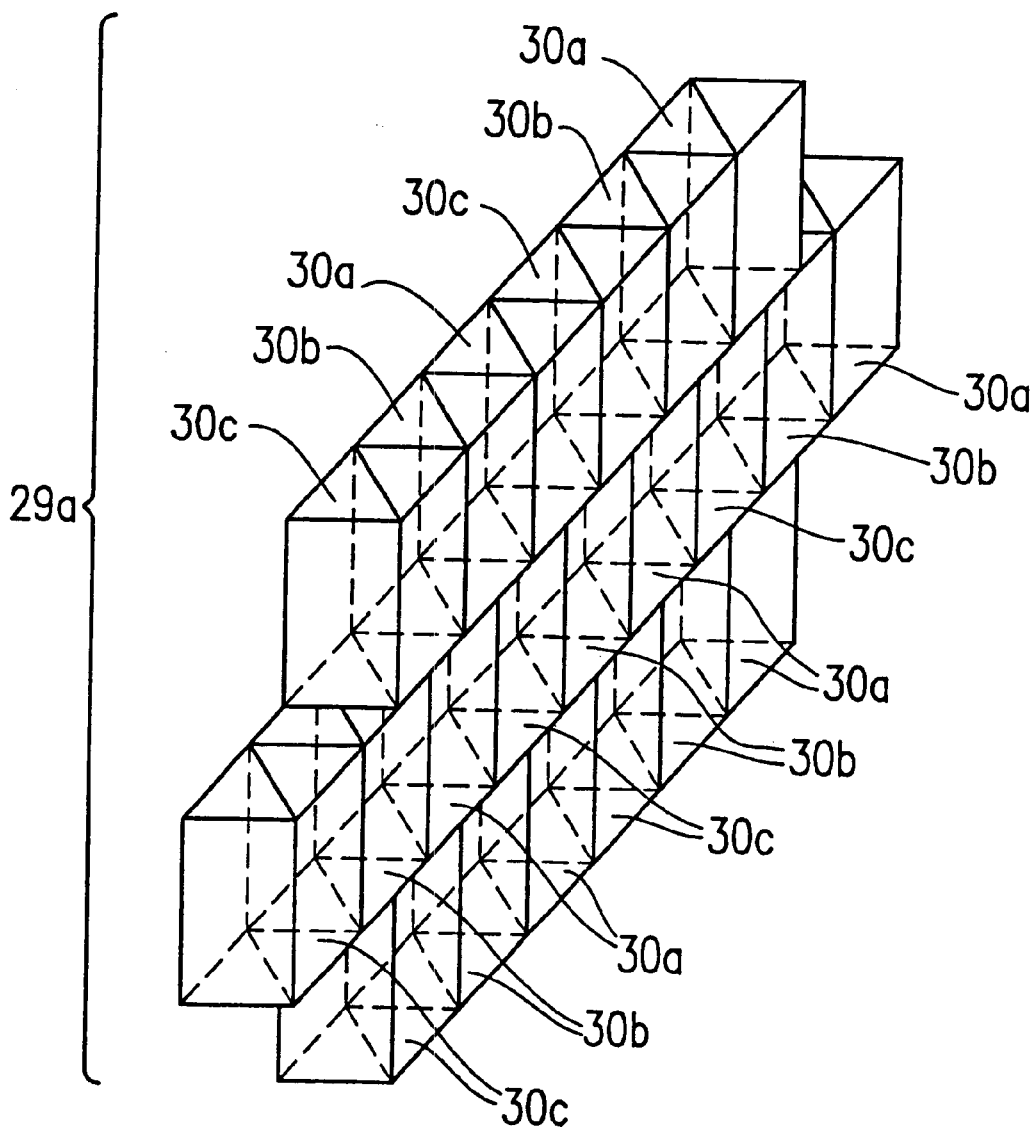
FIG. 15 illustrates a color separating optical element shown in FIG. 14.

FIG. 15 illustrates the color separating optical element 29a. The color separating optical element 29a comprises three types of prisms 30 (30a, 30b and 30c). The rectangular prism 30 is obtained in the form of a quadratic prism by combining two triangular prisms together, wherein a dichroic mirror of a dielectric multilayer film is provided along the interface between the triangular prisms. The prism 30a reflects green and red (as a result, yellow), the prism 30b reflects red, and the prism 30c reflects green. Regarding the prism 30c, since the other colors are already reflected and removed by the prisms 30a and 30b, the prism 30a may be a total reflection mirror (e.g., with an aluminum film being deposited thereon), rather than a selective reflection mirror. A plurality of prism sets, each comprising three prisms 30a, 30b and 30c, are laterally arranged in a pattern according to the pixel arrangement of the LCD device 9. Seven such prism sets are arranged according to the number and the arrangement of lenses of the first fly-eye lens array 4.

Figure 16:
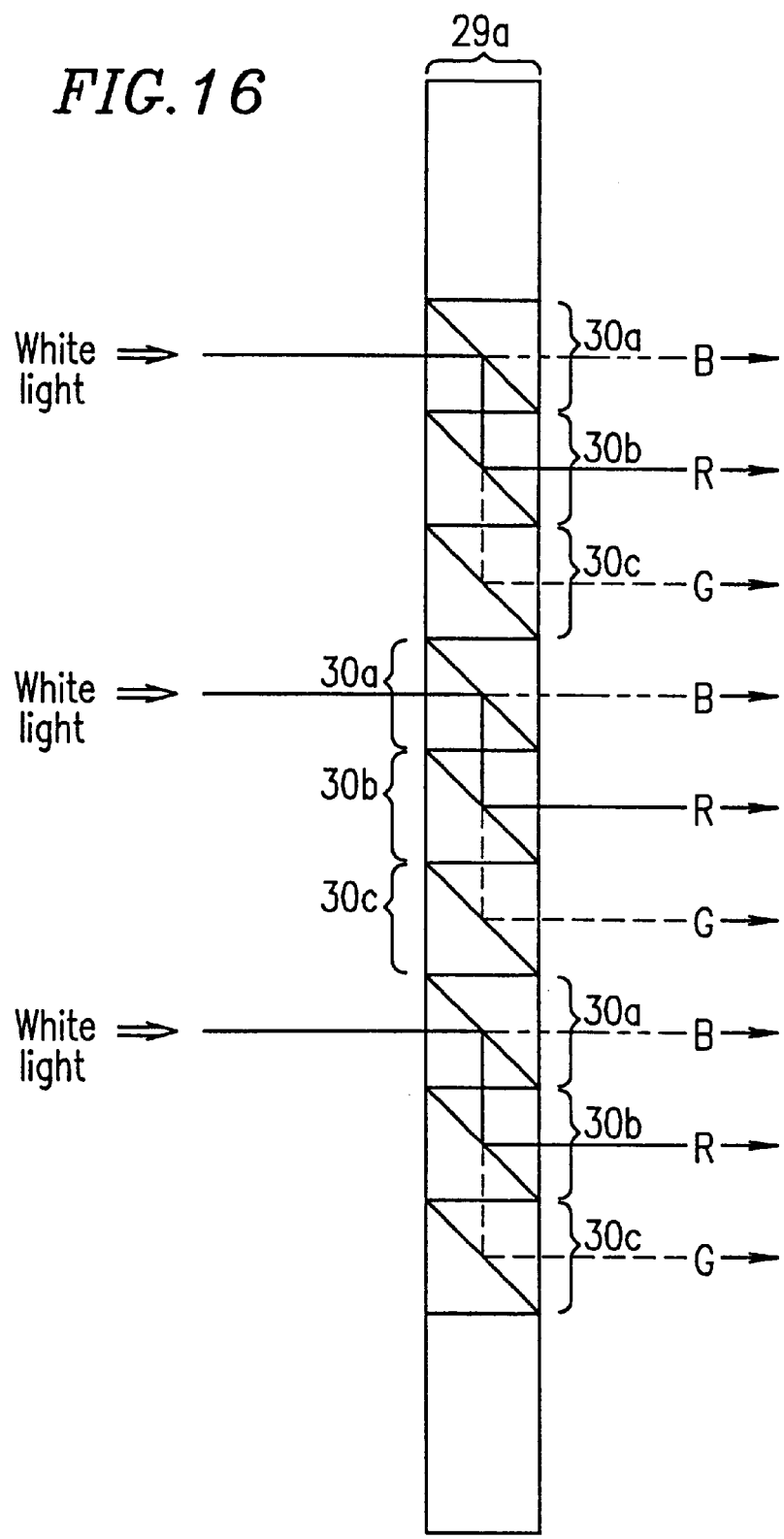
FIG. 16 illustrates a color separation operation performed by the color separating optical element shown in FIG. 14.

FIG. 16 illustrates the color separation performed by the color separating optical element 29a. The lateral cross section of each of the prisms 30a, 30b and 30c has the same area and is in the shape of a square. The length of a side of the cross section is about ⅓ the lateral pitch of the secondary white light source image spot.

Initially, all the white light from the light source 1 is incident upon the prism 30a. The R and G components of the white light are reflected by the reflecting surface of the prism 30a toward the adjacent prism 30b, while the B component of the white light is not reflected by the prism 30a but passes therethrough. Then, the R component is reflected by the prism 30b toward the same direction as the B component, while the G component passes through the prism 30b. Finally, the G component is reflected by the prism 30c toward the same direction as the B and R components. As described above, the combination of the prisms 30a, 30b and 30c separates the white light from the light source 1 into R, G and B light beams.

Figure 17:
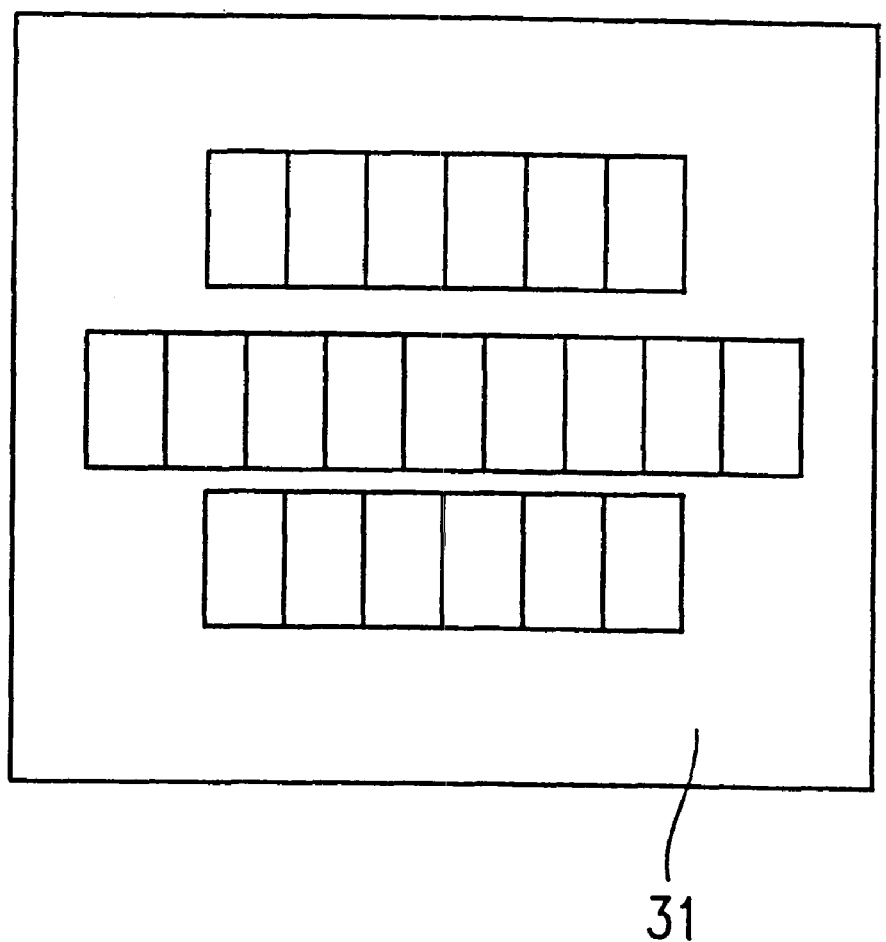
FIG. 17 is a plan view illustrating a second fly-eye lens array shown in FIG. 14.

The color-separated color beams from the color separating optical element 29a are respectively incident upon each lens of the second fly-eye lens array 31. FIG. 17 is a plan view illustrating the second fly-eye lens array 31. The second fly-eye lens array 31 comprises 21 lenses, obtained by dividing each of the lenses 5a to 5g of the second fly-eye lens array 5 described in Example 1 and illustrated in FIG. 4 into three lenses. The lenses of the second fly-eye lens array 31 are decentered in the lateral direction in order to compensate for the difference in the incident angle of light beams from that of Example 1. Therefore, the focal length of each lens of the second fly-eye lens array 31 is the same as that of the second fly-eye lens array 5.

After passing through the second fly-eye lens array 31, the light beams pass through the first focusing lens 6, the second focusing lens 7 and the microlens array 8 so as to be incident upon the LCD device 9 under conditions that are substantially the same as those of Example 1. As in Example 1, 21 secondary light source image spots (seven spots for each of R, G and B) are arranged in a pattern similar to the pixel arrangement of the LCD device 9, and are focused onto the apertures of the corresponding color pixels by the microlenses 15 of the microlens array 8. As in Example 1, each pixel of the LCD device 9 modulates the corresponding color component, and the modulated light is projected onto the screen (not shown) by the projection optical system.

In Example 4, the secondary light source image spots are arranged in a delta arrangement according to the pixel arrangement of the LCD device 9. Accordingly, the color separating optical element 29a comprises three arrays of prisms 30 vertically stacked on one another while being shifted from one another, as illustrated in FIG. 15. When Example 4 is used with the LCD device 17 having a stripe arrangement, a single array of vertically elongated prisms may be used since pixels arranged in the same column have the same color.

Figure 18:
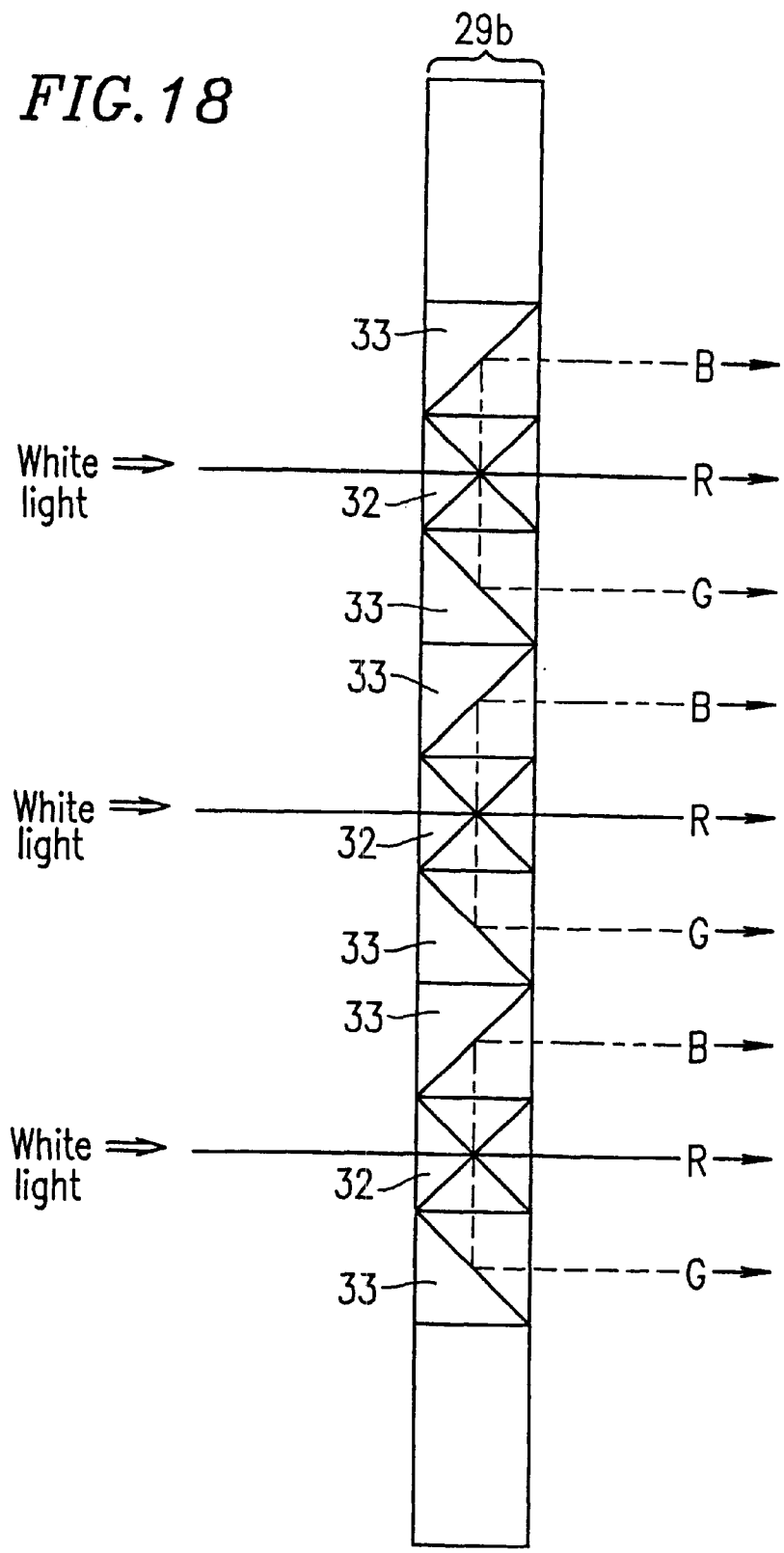
FIG. 18 illustrates a color separation operation performed by another color separating optical element provided in the projection type color image display apparatus according to Example 4 of the present invention.

Moreover, regarding the color separating optical element 29a, so-called "cross-dichroic prisms" may be used in place of the prisms 30. FIG. 18 illustrates the color separation performed by a color separating optical element 29b which comprises cross-dichroic prisms 32 in place of prisms 30. Each cross-dichroic prism 32 is obtained in the form of a quadratic prism by combining four triangular prisms together, wherein a dielectric reflective film, which reflects a predetermined color, is provided along each interface between the triangular prisms. The white light from the light source 1 is incident upon the cross-dichroic prism 32. The cross-dichroic prism 32 separates the incident light into three light beams (R, G and B beams), wherein the R beam passes through the cross-dichroic prism 32, the B and G beams are reflected by the cross-dichroic prism 32 in opposite directions, respectively. A reflective prism 33 is provided on both sides of the cross-dichroic prism 32. The reflective prism 33 is provided with a thin film total reflection mirror for reflecting the B and G beams toward the same direction as the R beam.

In FIG. 14, the optical axes of the optical elements after the color separating optical element 29a are shifted from that of the optical elements before the color separating optical element 29a because the optical axis of the R beam output from the color separating optical element 29a is shifted from that of the incident white light. However, the optical axes of these optical elements do not have to be shifted when the color separating optical element 29b is used because the optical axis of the output R beam is not shifted from the white light incident upon the color separating optical element 29b.

Figure 19:
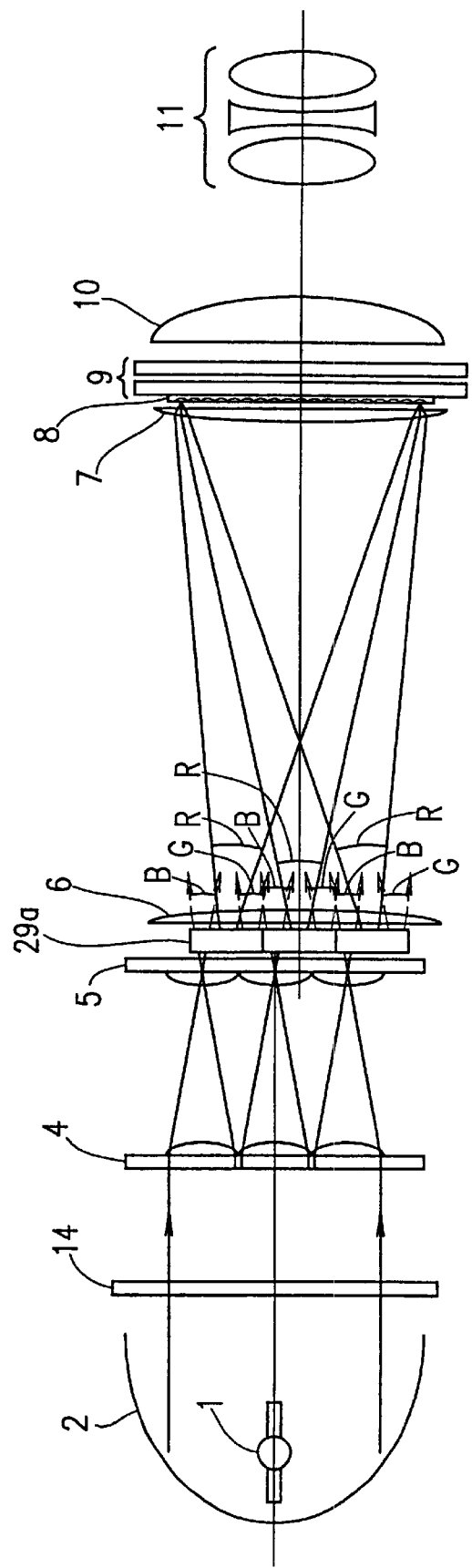
FIG. 19 illustrates another arrangement for the projection type color image display apparatus according to Example 4 of the present invention.

Moreover, as illustrated in FIG. 19, the color separating optical element 29a (or 29b) may alternatively be provided after the second fly-eye lens array. In this case, the second fly-eye lens array may be the second fly-eye lens array 5 as described in Example 1. Instead of using a plurality of prisms, the color separating optical element 29a or 29b may alternatively be obtained by arranging a plurality of planar dichroic mirrors or total reflection mirrors so as to allow for the color separation (selective reflection) as described above, and by supporting the arrangement using a supporting member.

As other examples described above, Example 4 also provides the effect of making the illumination distribution uniform and the effect of improving the effective focusing efficiency, and Example 4 can also be implemented with a compact optical system.

EXAMPLE 5

A projection type color image display apparatus according to Example 5 of the present invention will be described below with reference to FIGS. 20 to 23. It is noted that while a delta arrangement as in Example 1 is employed in Example 5, a stripe arrangement may also be employed with necessary modifications as those which are made in Example 2 with respect to Example 1.

Figure 20:
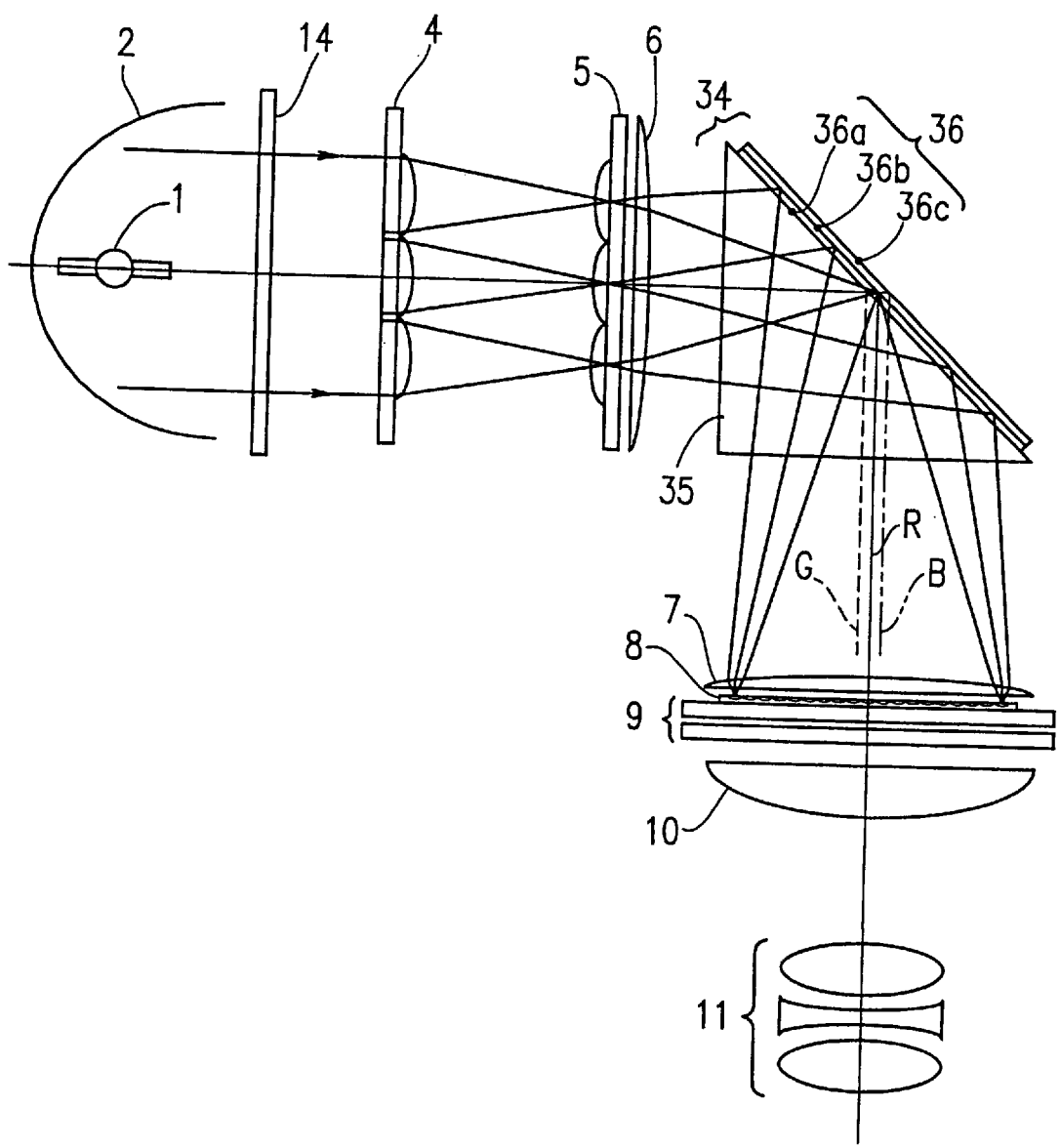
FIG. 20 illustrates a projection type color image display apparatus according to Example 5 of the present invention.

FIG. 20 illustrates a projection type color image display apparatus according to Example 5 of the present invention. In Example 5, the substantially collimated white light beams from the light source section are incident upon the first fly-eye lens array 4, rather than dichroic mirrors, before they are color-separated by a color separator. The first fly-eye lens array 4 is the same as that of Example 1. The first fly-eye lens array 4 forms white secondary light source image spots, which are then incident upon the second fly-eye lens array 5. Color separation of light into R, G and B beams is performed by a color separator 34 provided between the first focusing lens 6 and the second focusing lens 7.

The color separator 34 includes a triangular prism 35 and dichroic mirrors which are provided on reflective surfaces 36 (36a, 36b, 36c) of the triangular prism 35. The reflective surfaces 36a, 36b and 36c reflect a G beam, an R beam and a B beam, respectively. Regarding the reflective surface 36c, since the other colors are already reflected and removed by the reflective surfaces 36a and 36b, the reflective surface 36c may be a total reflection mirror (e.g., with an aluminum film being deposited thereon), rather than a selective reflection mirror.

The reflective surfaces 36a, 36b and 36c are spaced apart from one another via a transparent substrate 37 (see FIG. 22B) so as to provide separate reflective surfaces for the respective colors. Therefore, as viewed from the microlens array 8 or the LCD device 9, the R, G and B secondary light source image spots are viewed as being aligned along a horizontal direction with respect to the display screen. In this specification, this is called "virtual color separation". As the microlens array 8 focuses light of a predetermined color onto the aperture of each pixel of the LCD device 9, a bright projection can be obtained as in Example 1.

Figure 22A:
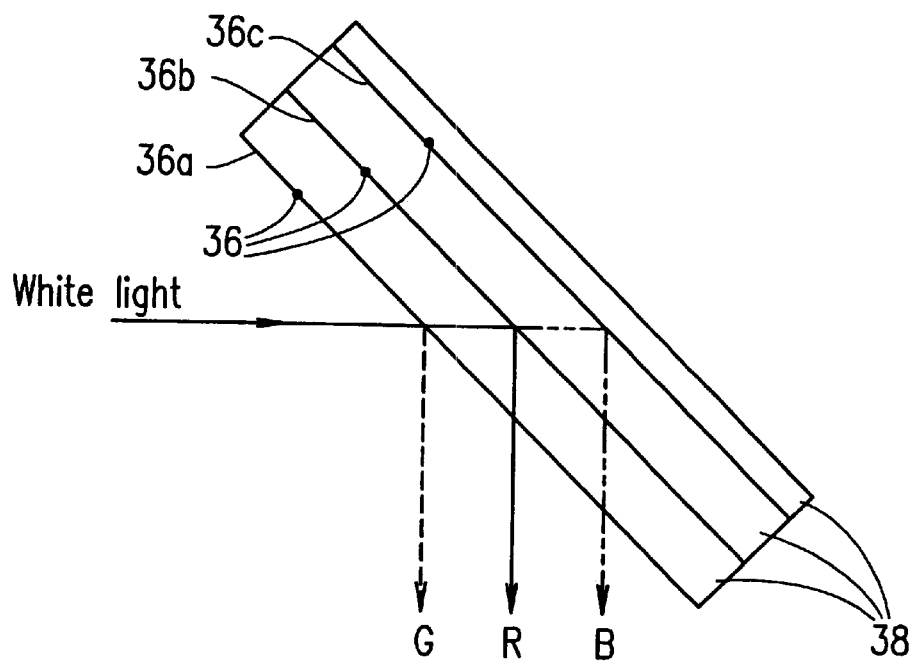
FIGS. 22A and 22B illustrate further color separators according to Example 5 of the present invention.
Figure 22B:
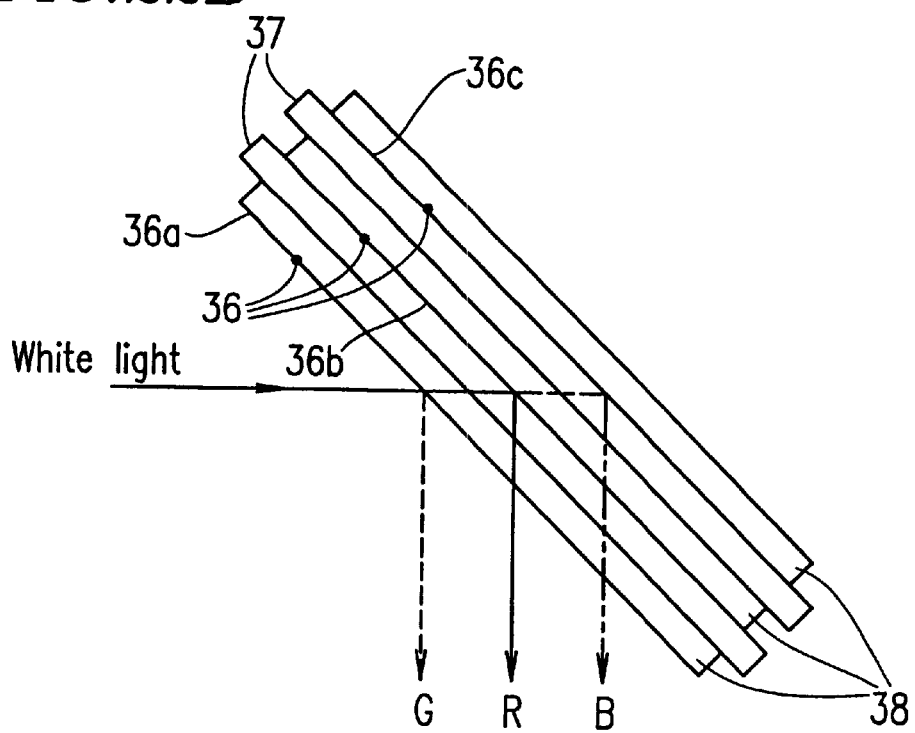

The color separator of Example 5 may be obtained by independently providing planar dichroic mirrors 38, as illustrated in FIG. 21. Alternatively, the color separator may be obtained by providing thickness-adjusted planar dichroic mirrors 38 attached together, as illustrated in FIG. 22A, or by providing planar dichroic mirrors 38 attached together with transparent substrates 37 therebetween for spacing the dichroic mirrors 38 from one another, as illustrated in FIG. 22B.

Figure 23:
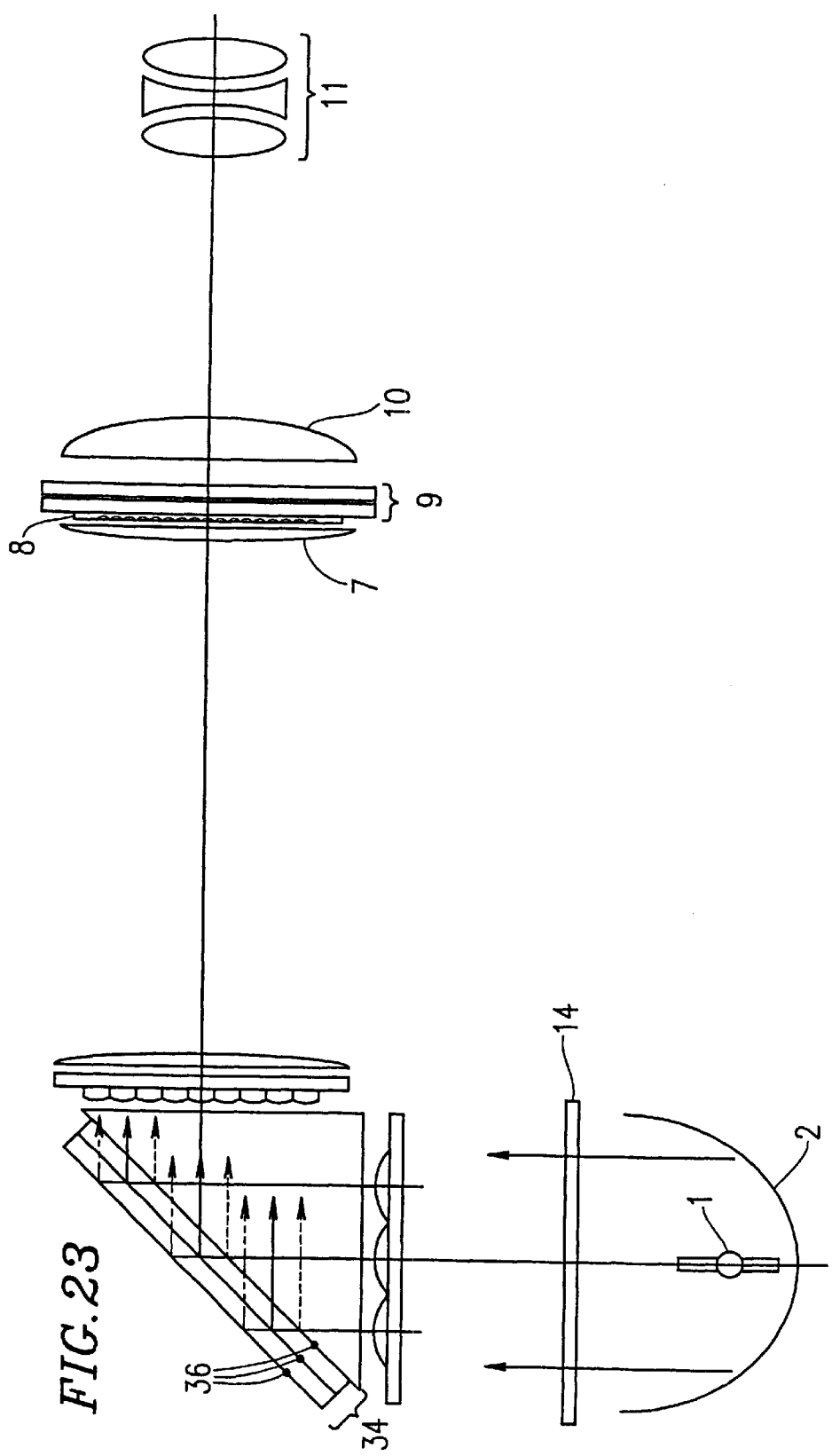
FIG. 23 illustrates another arrangement for the projection type color image display apparatus according to Example 5 of the present invention.

Moreover, the color separator of Example 5 may be obtained as a color separator 34 as illustrated in FIG. 23, provided in a predetermined position in the optical path between the first fly-eye lens array and the second fly-eye lens array. In any case, the interval between the reflective surfaces 36 is preferably adjusted so that the secondary light source image spots of different colors are arranged at a predetermined interval, and the second fly-eye lens array preferably includes a number of lenses three times as many as those of the first fly-eye lens array.

EXAMPLE 6

A projection type color image display apparatus according to Example 6 of the present invention will be described below with reference to FIGS. 24 to 29. In Example 6, a polarization converting optical element is added to the optical system of the projection type color image display apparatus as described in Examples 1–5 above, so as to obtain an even brighter projection.

Figure 24:
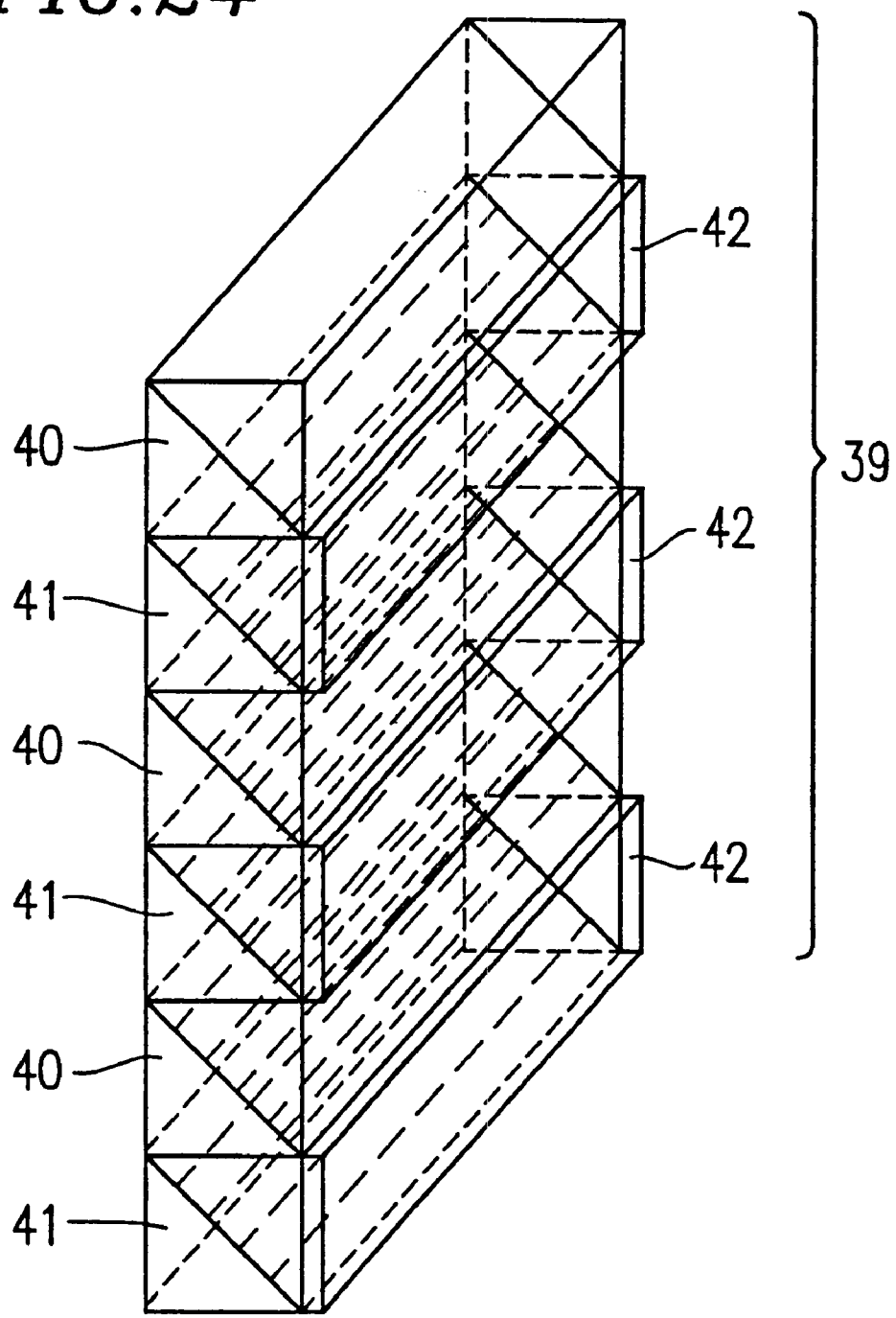
FIG. 24 illustrates a polarization converting optical element used in the present invention.
Figure 25:
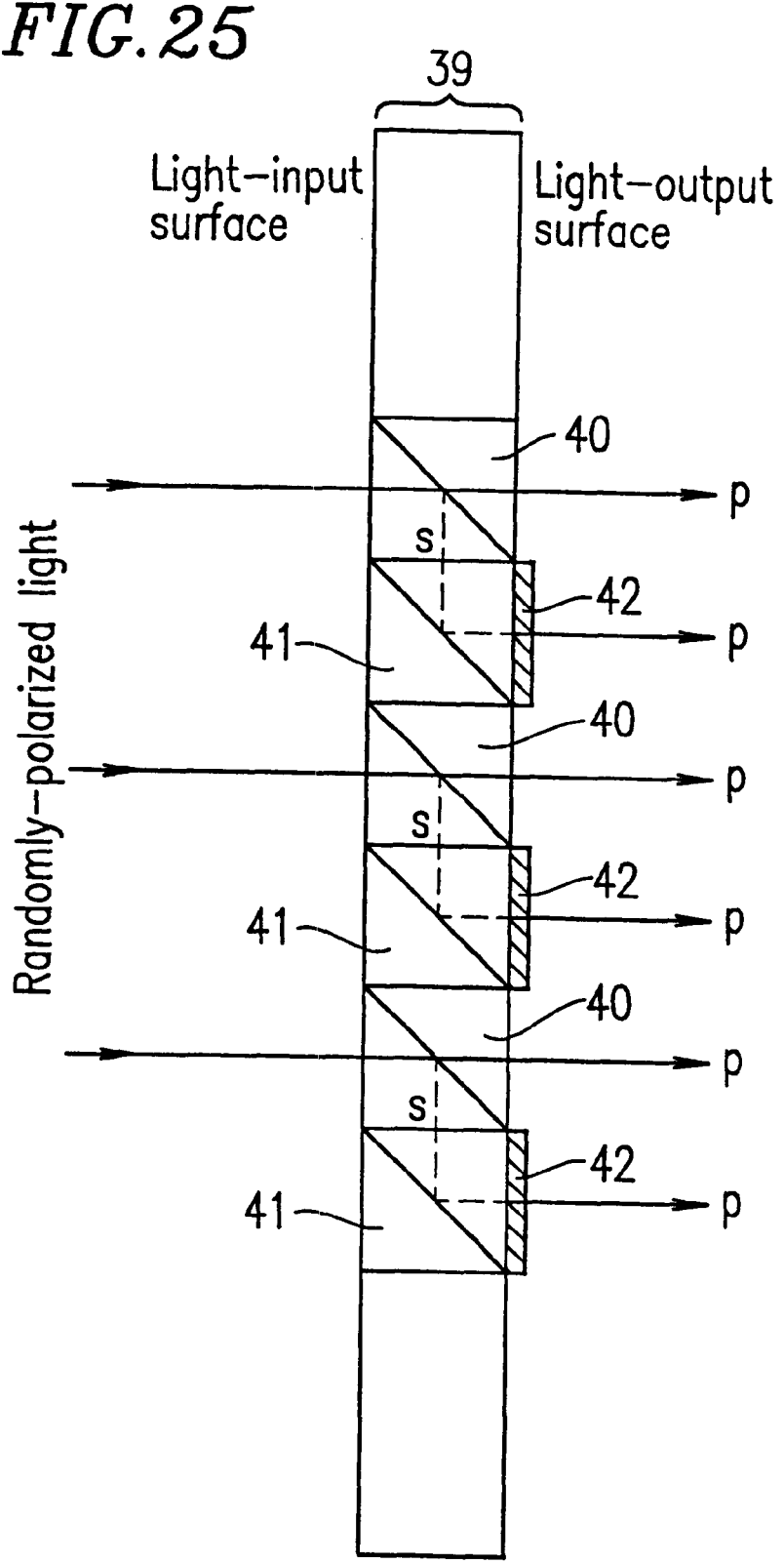
FIG. 25 illustrates a polarization separation operation performed by the polarization converting optical element of FIG. 24.

FIG. 24 illustrates a polarization converting optical element 39, and FIG. 25 illustrates the optical path of light whose polarization is being converted by the polarization converting optical element 39. Referring to FIG. 24, the polarization converting optical element 39 includes quadratic PBS prisms 40 and reflective prisms 41 which are alternately arranged in the vertical direction, with a half-wave plate 42 being provided on a side of each reflective prism 41.

Referring to FIG. 25, randomly-polarized light is incident upon the PBS prism 40, and an S-wave component thereof is reflected by the PBS prism 40 by 90° toward the adjacent reflective prism 41, while a P-wave component thereof passes through the PBS prism 40. The S-wave component is reflected by the reflective prism 41 toward the same direction as the P-wave component passing through the PBS prism 40. Then, the polarization axis of the S-wave component is rotated by 90° by the half-wave plate 42 attached to the output side of the reflective prism 41, so that the S-wave component has the same polarization axis as that of the P-wave component passing through the PBS prism 40. The dimension and the number of PBS prisms 40 and those of reflective prisms 41 may be determined based on the arrangement of the original secondary light source image spots. The number of secondary light source image spots is doubled by the polarization converting optical element 39, wherein the arrangement of the secondary light source image spots is adjusted to be similar to the pixel arrangement of the LCD device being used (including the color arrangement).

Figure 26:
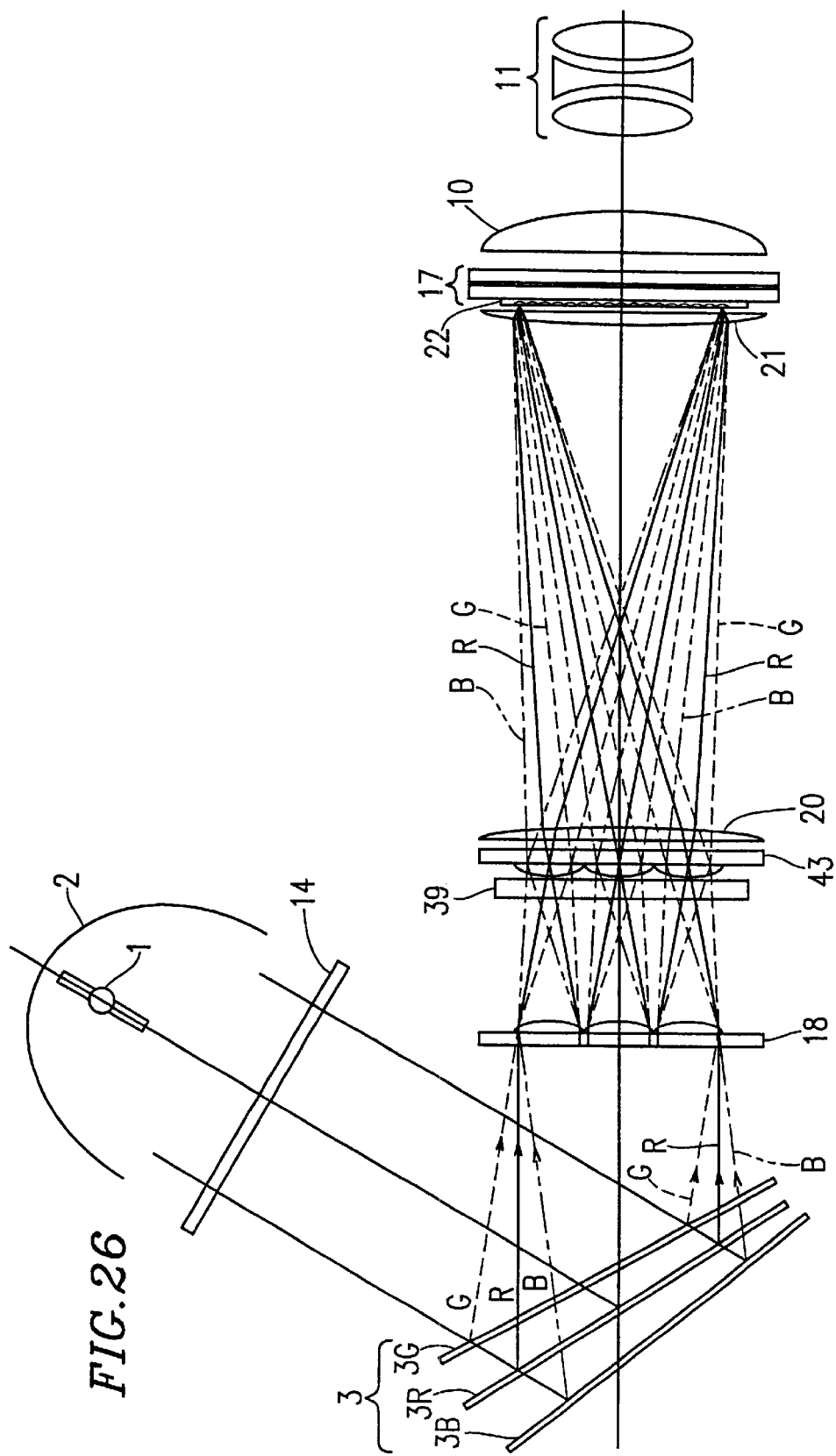
FIG. 26 illustrates a projection type color image display apparatus according to Example 6 of the present invention.

FIG. 26 illustrates the projection type color image display apparatus of Example 2 with the polarization converting optical element 39 of Example 6 being added thereto. As illustrated in FIG. 24, the polarization converting optical element 39 includes three pairs of the PBS prism 40 and the reflective prism 41. Each side of the prism 40 or 41 is about 8.5 mm in view of the vertical pitch (about 17 mm) of the secondary light source image spots formed by the first fly-eye lens array 18 of Example 2. The polarization converting optical element 39 is provided on the input side of the second fly-eye lens array 43.

Figure 27:
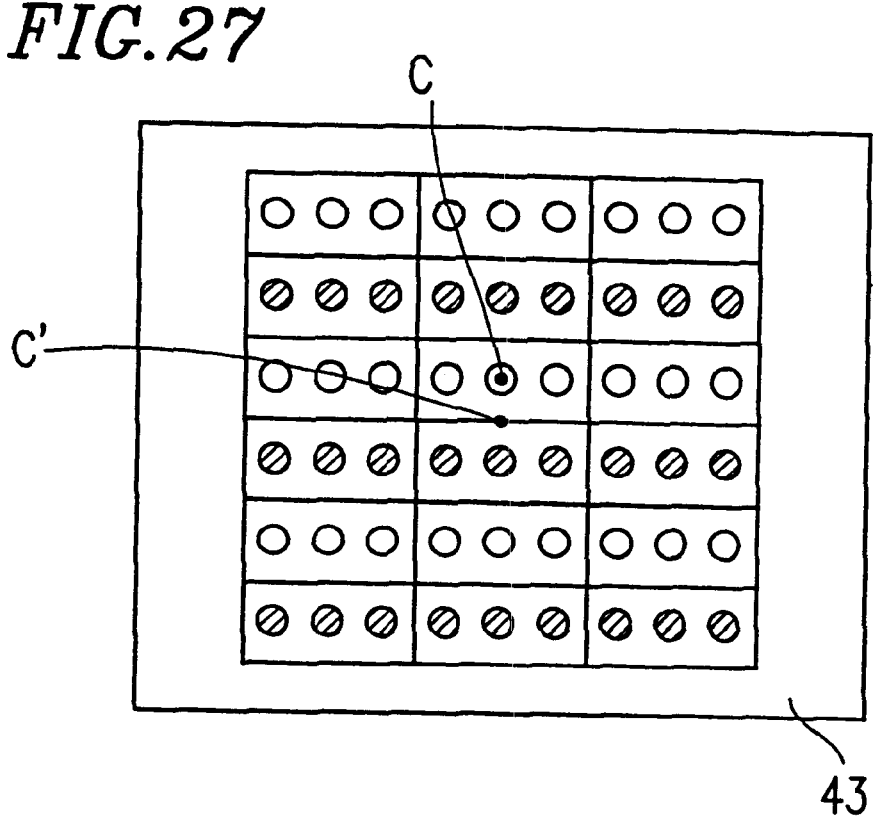
FIG. 27 is a plan view illustrating a second fly-eye lens array provided in the projection type color image display apparatus of FIG. 26, and also illustrating the arrangement of secondary light source image spots formed thereon.

FIG. 27 is a plan view illustrating the lens arrangement of the second fly-eye lens array 43 with respect to the arrangement of the secondary light source image spots after passing through the polarization converting optical element 39. The first fly-eye lens array 18 include nine lenses, while three (R, G and B) light beams are incident upon each of the nine lenses at respectively different angles and then pass through the polarization converting optical element 39. Thus, 54 secondary light source image spots of three colors are formed on the second fly-eye lens array 43.

In FIG. 27, each open circle represents a secondary light source image spot formed by a light component which was not reflected by the PBS prism 40 as it passes through the polarization converting optical element 39. Each hatched circle represents a secondary light source image spot formed by a light component which was reflected by the PBS prism 40 and exited the polarization converting optical element 39 via the reflective prism 41 and the half-wave plate 42. The vertical pitch of the secondary light source image spots is about 8.5 mm. Accordingly, the vertical pitch of those secondary light source image spots represented either by the open or hatched circles is about 17 mm (8.5 mm×2).

Referring to FIG. 27, the second fly-eye lens array 43 includes 18 lenses. Three secondary light source image spots of three colors, formed by the first fly-eye lens array 18 and the polarization converting optical element 39, are incident upon each of the 18 lenses, and then superimposed on the LCD device 17. In Example 6, the secondary light source image is formed on each pixel aperture of the LCD device 17 by the microlens array, as in Example 2. However, unlike Example 2, each microlens forms two secondary light source image spots (represented by an open circle and a hatched circle, respectively, in FIG. 27) on each vertically elongated pixel aperture. Accordingly, the second fly-eye lens array 43 and the subsequent optical elements are parallelly moved in the vertical direction. In particular, while the optical elements before the second fly-eye lens array 43 have their optical axis corresponding to point C in FIG. 27, the optical axis of the second fly-eye lens array 43 and the subsequent optical elements is shifted to correspond to point C' in FIG. 27, i.e., to a midpoint between a pair of vertically adjacent open circle spot and a hatched circle spot (or a duplicate spot produced by the polarization converting optical element 39).

In Example 6, the vertical dimension of a pixel aperture of the LCD device 17 is about 85 $\mu$m. Therefore, even if the open circle spot and the adjacent hatched circle spot are spaced apart by about 8.5 mm, the spots can be accommodated by a single pixel aperture as a result of the shrinking imaging performed by the microlens.

Figure 28A:
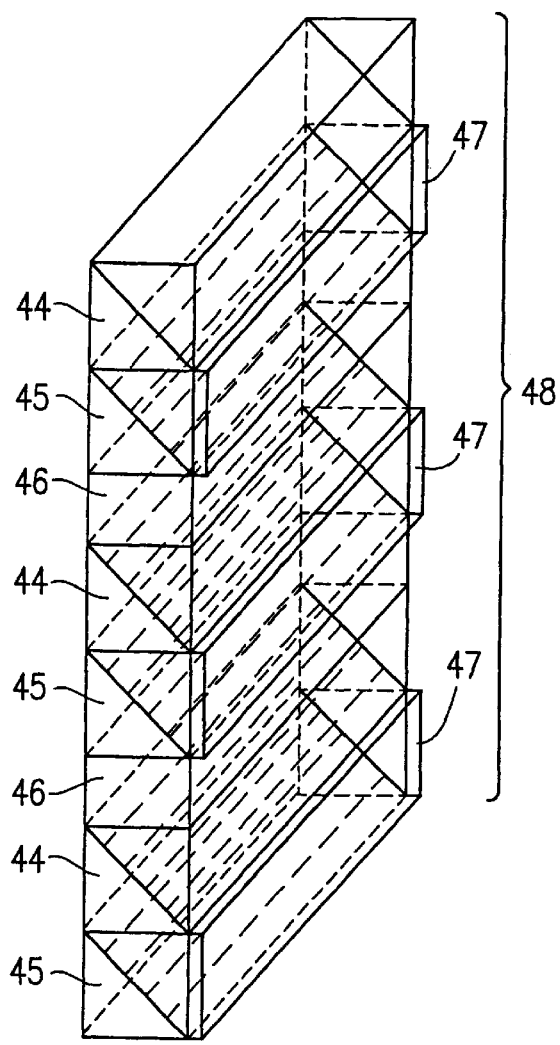
FIG. 28A illustrates another polarization converting optical element.

However, in some cases where the spots formed by the polarization converting optical element 39 are equidistantly spaced in the vertical direction, a pair of spots may be too spaced apart from each other to pass through a single pixel aperture. In order to avoid this, it may be necessary to reduce the interval between the pair of spots. This can be achieved by employing a polarization converting optical element 48, as illustrated in FIG. 28A, which includes a PBS prism 44 and a reflective prism 45 as well as a quadratic spacer 46.

Figure 28B:
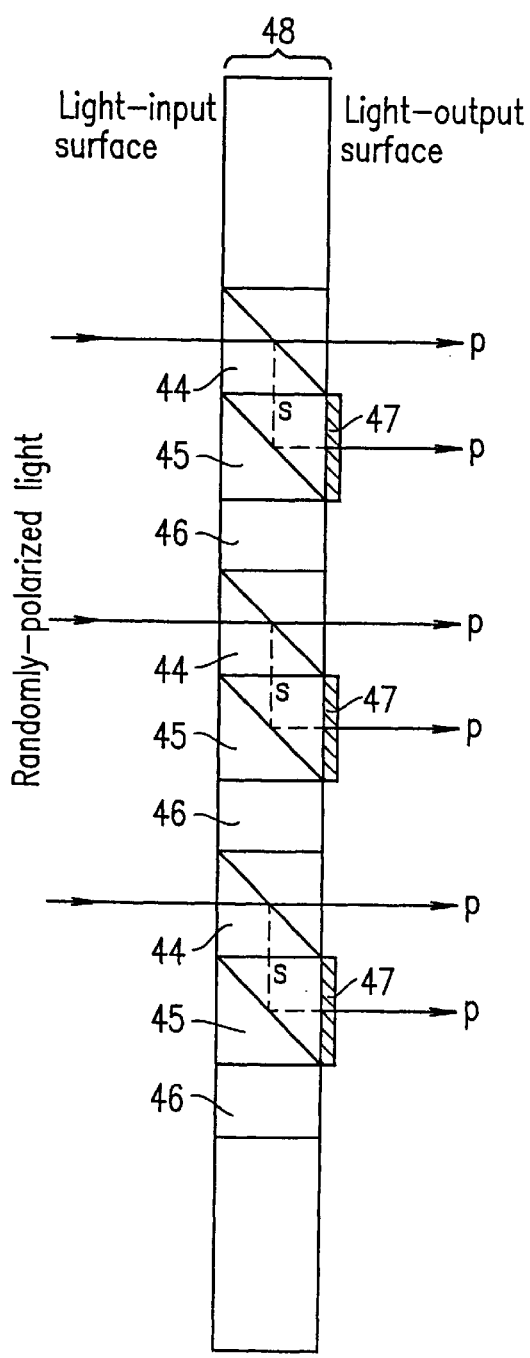
FIG. 28B illustrates a polarization conversion operation performed by the polarization converting optical element of FIG. 28A.

The functions of the PBS prism 44 and the reflective prism 45 are substantially the same as those of the PBS prism 40 and the reflective prism 41, respectively. However, the length of each side is reduced so that the total dimension together with the quadratic spacer 46 corresponds to the pitch of the secondary light source image spots. FIG. 28B illustrates the optical path of light passing through the polarization converting optical element 48.

Figure 29:
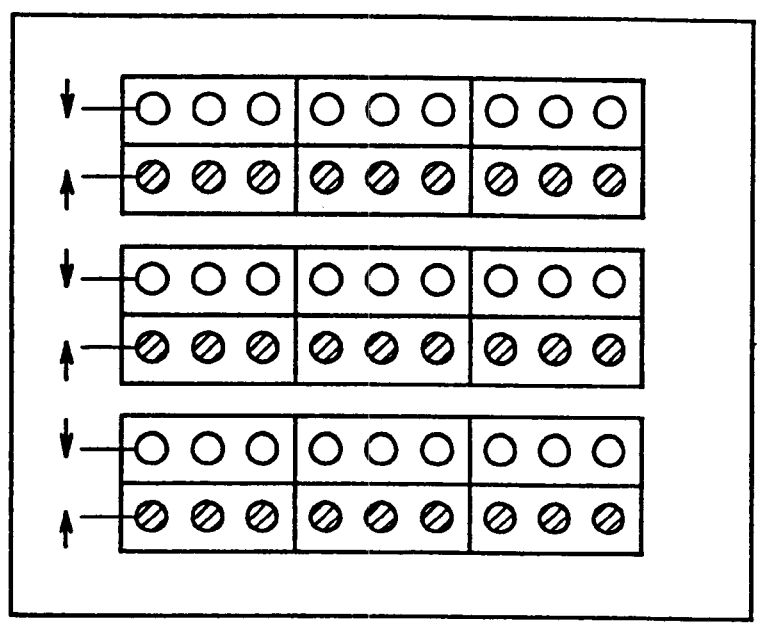
FIG. 29 illustrates a change in the arrangement of secondary light source image spots made by the polarization converting optical element of FIG. 28.

FIG. 29 illustrates the arrangement of secondary light source image spots formed by the polarization converting optical element 48. As compared to the polarization converting optical element 39, the distance between each pair of an open circle spot and a hatched circle spot is reduced (as indicated by an arrow in FIG. 29) because the PBS prism 44 and the reflective prism 45 are smaller than the PBS prism 40 and the reflective prism 41, respectively. However, the arrangement of midpoints between the pair of an open circle spot and a hatched circle spot is not changed. As a result, with the polarization converting optical element 48, light can be more localized onto each pixel aperture than with the polarization converting optical element 39 with no quadratic spacer 46. The lens shape of the second fly-eye lens array is preferably adjusted according to the change in the arrangement of secondary light source image spots.

The size of the PBS prism 44 and/or the reflective prism 45 may be reduced as much as desired as long as the size of a secondary light source image spot is not affected. In particular, the size of the PBS prism 44 and/or the reflective prism 45 may be reduced as much as desired as long as shading does not occur at the input or output surface of the PBS prism 44 or at the output surface of the reflective prism 45. The quadratic spacer 46 is preferably made of a light-blocking material or is provided with a reflective film so that the quadratic spacer 46 does not transmit light therethrough. If some light passes through the quadratic spacer 46, such light does not contribute to the display of images. Such light may rather cause undesirable color mixing, as it may impinge upon the black matrix of the LCD device or an undesired color of light may be introduced to a pixel.

When employing a color separating optical element with a strip array pattern as that of Example 4, the order of the color separation and the polarization conversion performed by the color separator may be reversed.

In Example 6, the randomly-polarized light from the white light source is converted to linearly-polarized light, so that the linearly-polarized light to be used for displaying an image is not blocked by the polarizing plate of the LCD device, thereby increasing the amount of light which can be used for projecting the image. Therefore, it is possible to obtain an even brighter projection than that obtained in Examples 1 to 5 above. Of course, Example 6 retains the effect of improving the illumination distribution and the advantage that the optical system can be made compact, as those obtained in Examples 1 to 5 above.

The half-wave plate 42 may alternatively be attached to the output side of the PBS prism 40, rather than the reflective prism 41, for obtaining two components of light having the same polarization direction. This also applies to Examples 7 and 8 described below.

EXAMPLE 7

A projection type color image display apparatus according to Example 7 of the present invention will be described below with reference to FIGS. 30 to 32. In Example 7, as in Example 6, a polarization converting optical element is added to the optical system of the projection type color image display apparatus as described above, so as to obtain an even brighter projection.

Figure 30:
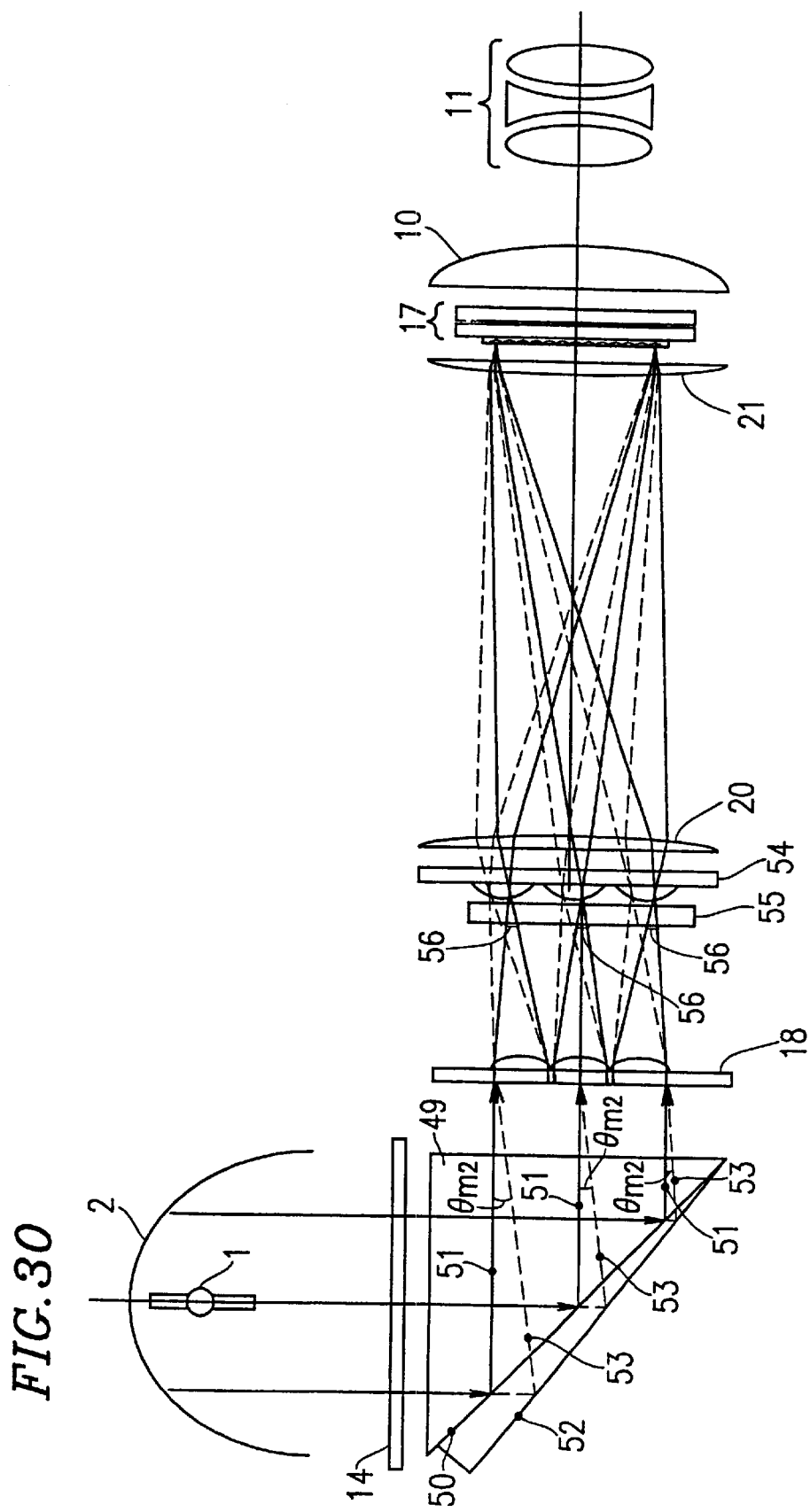
FIG. 30 illustrates a projection type color image display apparatus according to Example 7 of the present invention.

FIG. 30 illustrates a projection type color image display apparatus of Example 7. It is noted that FIG. 30, unlike other figures (e.g., FIG. 1), illustrates the projection type color image display apparatus as viewed from a direction along the horizontal axis of the display screen of the LCD device.

The white light from the light source section, which is randomly-polarized light, is first incident upon a PBS 49, and an S-polarization beam 51 thereof is reflected by the polarization separating reflection surface 50 of the PBS 49, while the remaining P-polarization beam 53 is reflected by a second reflective surface 52 which is slightly angled with respect to the polarization separating reflection surface 50. The S-polarization beam 51 and the P-polarization beam 53 are incident upon the first fly-eye lens array 18 while being superimposed on one another. While the S-polarization beam 51 and the P-polarization beam 53 are both substantially collimated, the principal ray axes thereof differ from each other by about θm2. Therefore, the lenses 18a to 18i of the first fly-eye lens array 18 form each secondary light source image spot of the S-polarization beam 51 and that of the P-polarization beam 53 at different positions, respectively. Herein, the value θm2 is set to about 9° so that the spot of the S-polarization beam 51 and the spot of the P-polarization beam 53 are separated from each other by about 5 mm in the vertical direction on a second fly-eye lens array 54.

Figure 31:
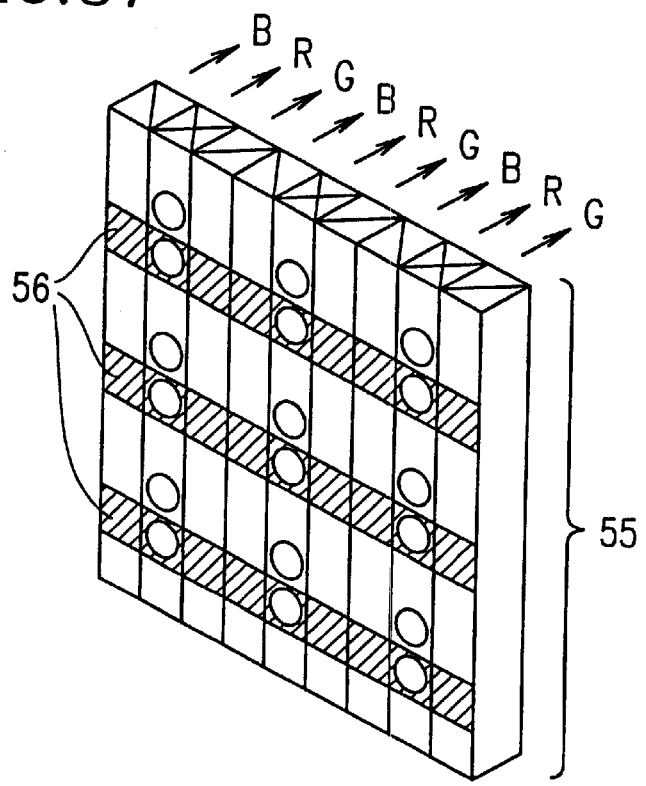
FIG. 31 illustrates how light passes through a color separating optical element shown in FIG. 30.
Figure 32:
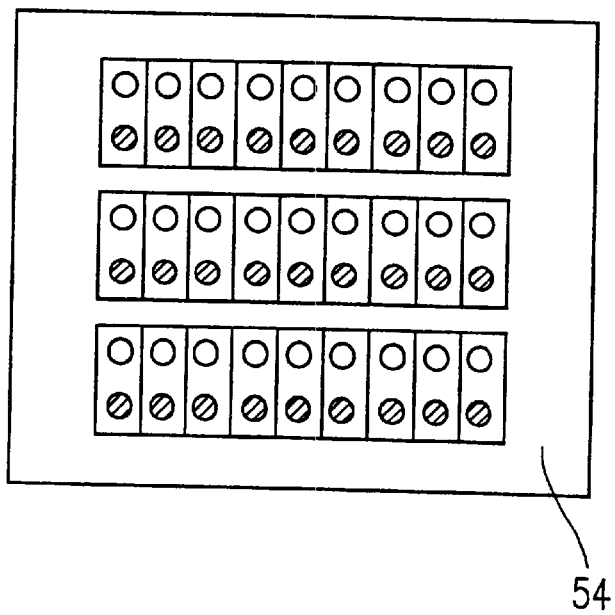
FIG. 32 is a plan view illustrating a second fly-eye lens array provided in the projection type color image display apparatus of FIG. 30, and also illustrating the arrangement of secondary light source image spots formed thereon.

The respective beams are incident upon a color separating optical element 55, as illustrated in FIG. 31, before they are incident upon the second fly-eye lens array 54. A strip of half-wave plate 56 is provided along each area of the color separating optical element 55 through which the S-polarization beam 51 passes, so as to obtain two components of light having the same polarization direction. In FIG. 31, the half-wave plate 56 is provided on the input side of the color separating optical element 55. Alternatively, the half-wave plate 56 may be provided on the output side thereof.

The color separating optical element 55 color-separates the white light into R, G and B beams aligned along a horizontal direction of the display screen. Referring to FIG. 32, the second fly-eye lens array 54 includes 27 lenses and receives 54 secondary light source image spots of different colors incident thereupon. Then, passing through the second fly-eye lens array 54, the first focusing lens 20, the second focusing lens 21, and the microlens array 22, the light beams pass are incident upon the display screen of the LCD device 17 while being superimposed on one another. Each secondary light source image spot is focused on a pixel aperture of the LCD device 17.

Example 7 also realizes the high focusing efficiency by employing polarization conversion, while achieving a bright projection. Example 7 realizes the other effects as described in the preceding examples.

Moreover, by adjusting the value θm2, it is possible to reduce the distance between two adjacent secondary light source image spots formed by adjacent lenses of the first fly-eye lens array 18. Accordingly, it is possible to even more closely arrange the spots on a pixel aperture than with the polarization converting optical element having the strip array pattern as that of Example 6.

Furthermore, it is also possible to arrange the first fly-eye lens array, the second fly-eye lens array and the color separating optical element, in this order. In such a case, the lens shape of the second fly-eye lens array may be adjusted as described in the preceding examples.

For the color separation, the color separator as described in Example 5 may be used instead of the above-described color separating optical element. Moreover, Example 7 of the present invention can easily be used with a LCD device employing a delta arrangement according to the description provided in the preceding examples.

EXAMPLE 8

A basic principle of Examples 1 to 7 is to form a number of secondary light source image spots, which are arranged (including the color arrangement) according to the pixel arrangement of the LCD device to be used, and then to image the spot surfaces by means of microlenses so as to focus light of a predetermined color onto the aperture of each pixel of the LCD device. In some cases, however, there may be some spots which cannot be limited to a predetermined spot size due to the presence of stray light and aberration of a lens. In such cases, some light may impinge upon the black matrix of the LCD device, causing an undesired increase in temperature, whereby the maximum amount of output light from the light source may need to be restricted. Moreover, in a single-plate projection-type color image display apparatus, when a beam spot which is supposed to be exclusively on a target pixel aperture overlaps and illuminates the aperture of the next pixel, particularly the aperture of the laterally adjacent pixel, such a beam spot may cause undesirable color mixing, which would significantly deteriorate the color reproducibility in a projected image, because any pair of laterally adjacent pixels either in a delta arrangement or in a stripe arrangement are of different colors.

According to Example 8, a light-blocking mask (equivalent to a black matrix) is provided near the plane on which secondary light source image spots are formed in each of the preceding examples. More specifically, the light-blocking mask is provided on an object plane which is imaged by each microlens of the microlens array onto each pixel aperture of the LCD device. In this way, light components, which may cause an increase in temperature or undesirable color mixing in the LCD device, can be blocked and prevented from reaching the pixel of the LCD device.

Example 8 of the present invention will be described below with reference to FIGS. 33 to 36. Example 8 can be applied to the optical system of the projection type color image display apparatus according to any of Examples 1 to 7 above.

Figure 33:
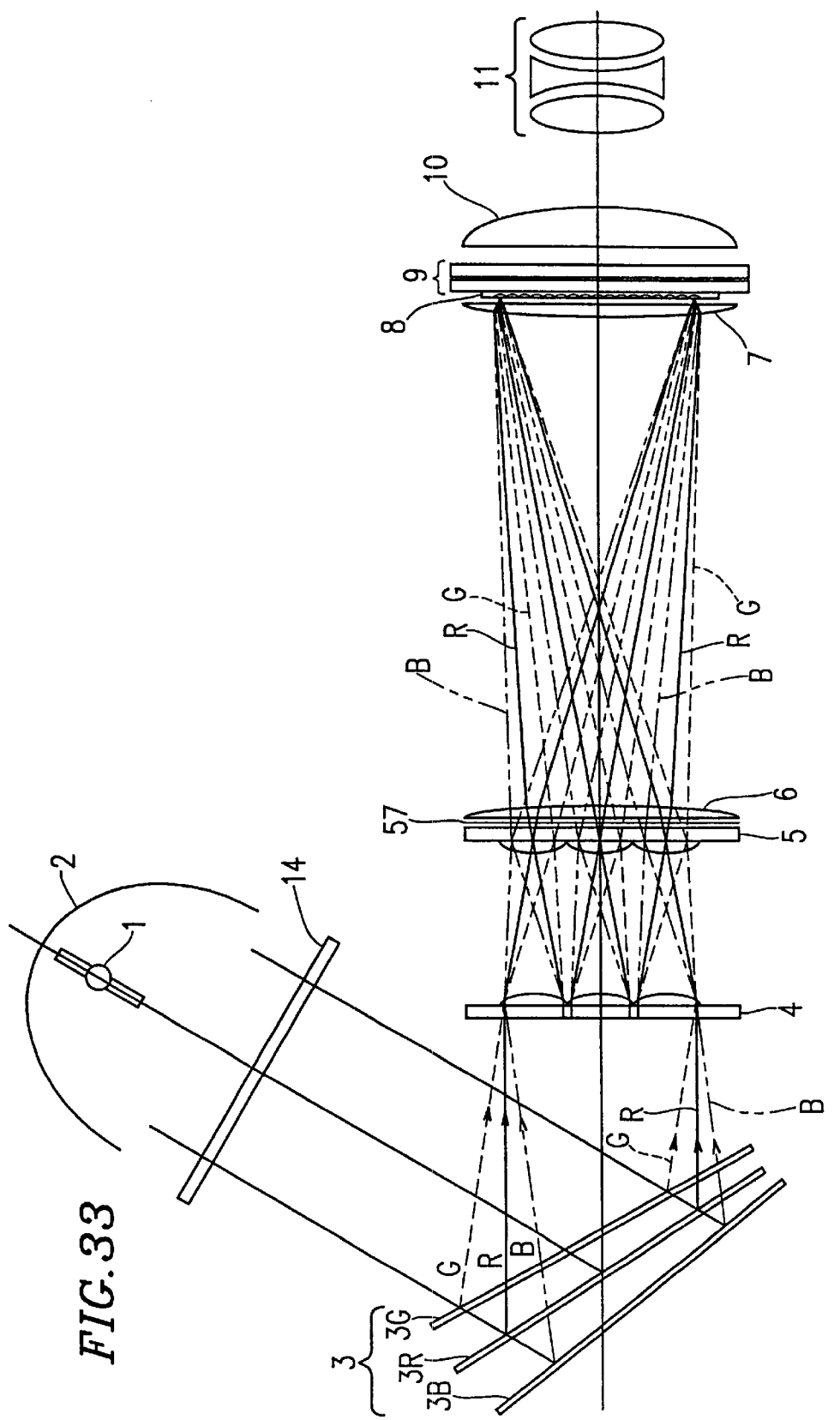
FIG. 33 is a projection type color image display apparatus according to Example 8 of the present invention.

FIG. 33 illustrates a projection type color image display apparatus including a LCD device which employs a delta arrangement as in Example 1, and a light blocking mask 57 of Example 8. The light blocking mask 57 is provided on the output side of the second fly-eye lens array 5 near the position at which a secondary light source image spot is formed. When the optical system is such that the light is already color-separated into R, G and B beams before the light blocking mask, as in Example 1, a mask having openings which are arranged in a pattern similar to the pixel arrangement of the LCD device, while each opening is similar to each pixel aperture in shape, is used. More specifically, the similarity ratio between the pitch of the openings and the pitch of the pixels should be the same as the similarity ratio between the shape of each opening and the shape of each pixel aperture.

When the light is still white light at the position of the light-blocking mask (i.e., where the secondary light source image spots are formed) as in Example 5, the number of openings is reduced.

Figure 34A:
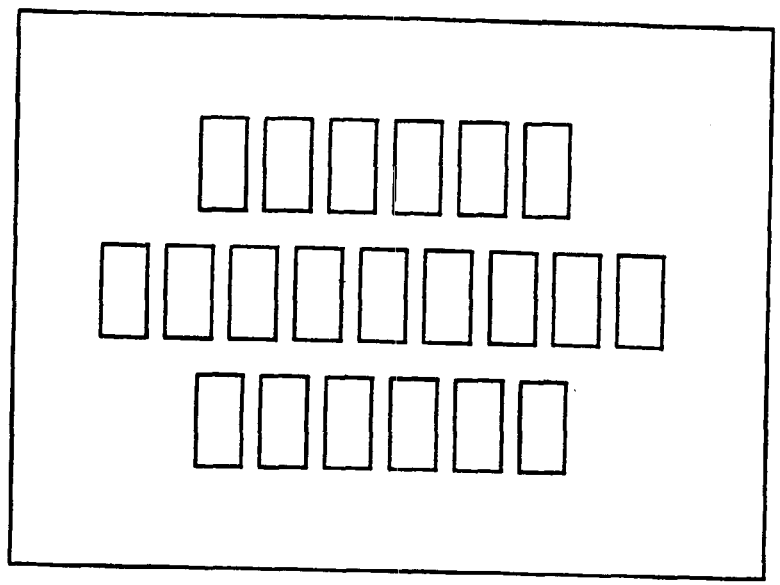
FIGS. 34A and 34B each illustrate a plan view of a light-blocking mask for use in a LCD device employing a delta arrangement.
Figure 34B:
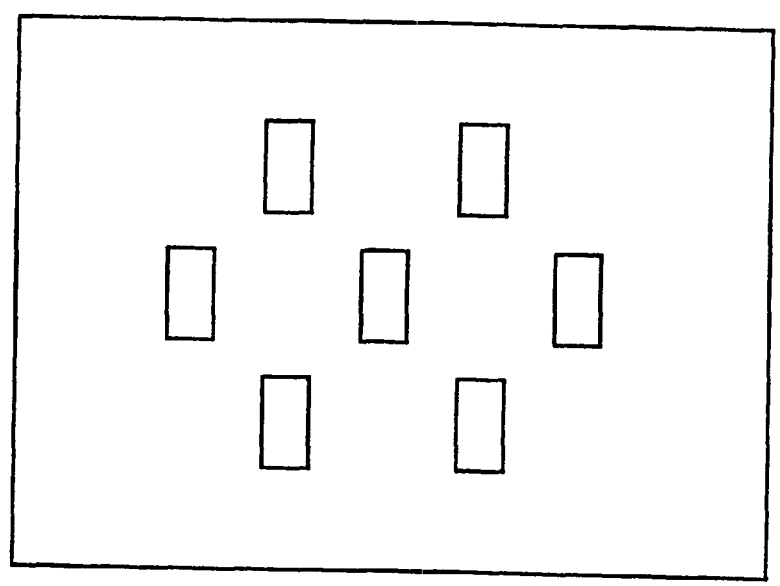
Figure 35A:
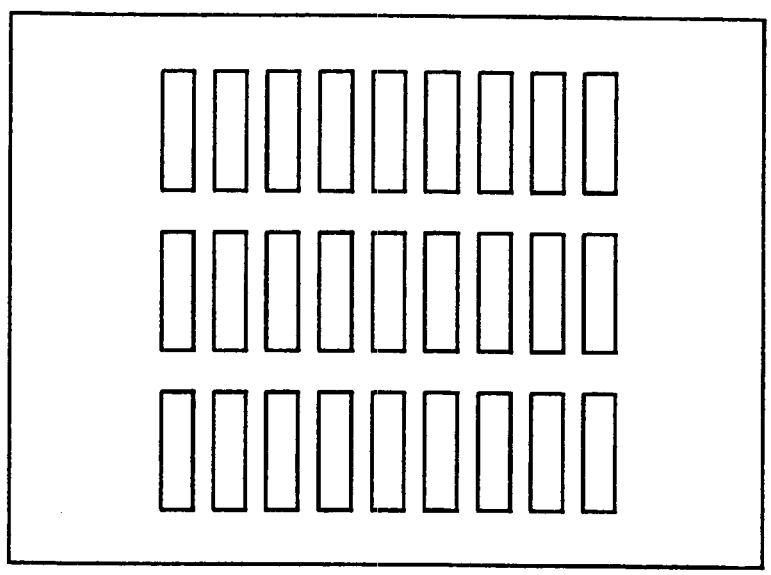
FIGS. 35A and 35B each illustrate a plan view of a light-blocking mask for use in a LCD device employing a stripe arrangement.
Figure 35B:
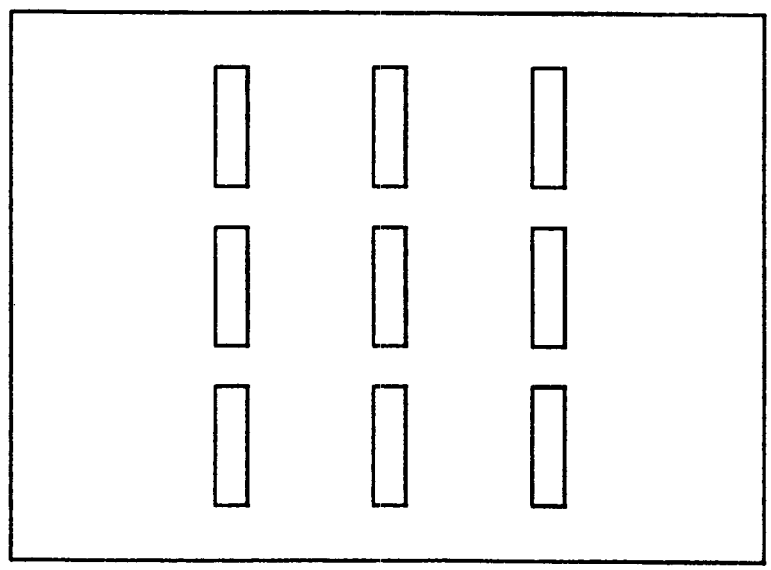

Each of FIGS. 34A and 34B illustrate an exemplary light-blocking mask for use with the LCD device 9 employing a delta arrangement. Each of FIGS. 35A and 35B illustrate an exemplary light-blocking mask for use with the LCD device 17 employing a stripe arrangement. Those shown in FIGS. 34A and 35A are used when the light passes through the light-blocking mask after color separation. Those shown in FIGS. 34B and 35B are used when the light passes through the light-blocking mask before color separation. The light blocking mask 57 of Example 8 is shown in FIG. 34A.

Figure 36A:
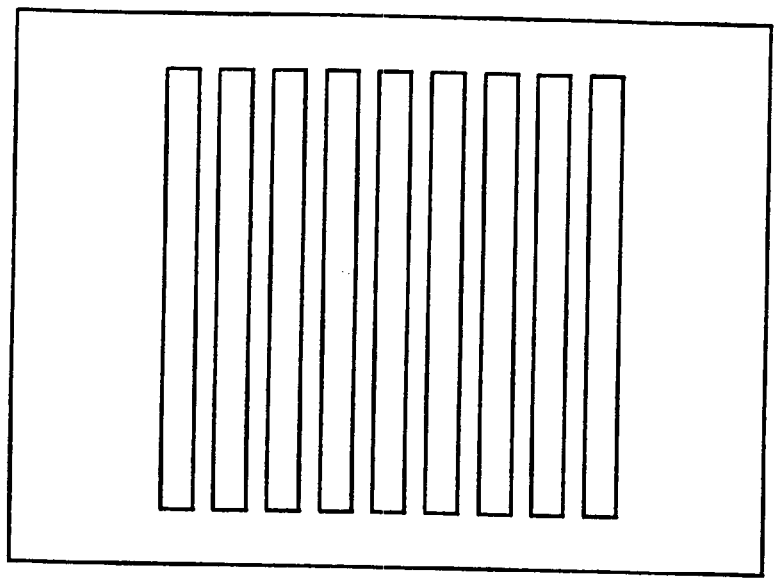
FIGS. 36A and 36B each illustrate a plan view of another light-blocking mask for use in a LCD device employing a stripe arrangement.
Figure 36B:
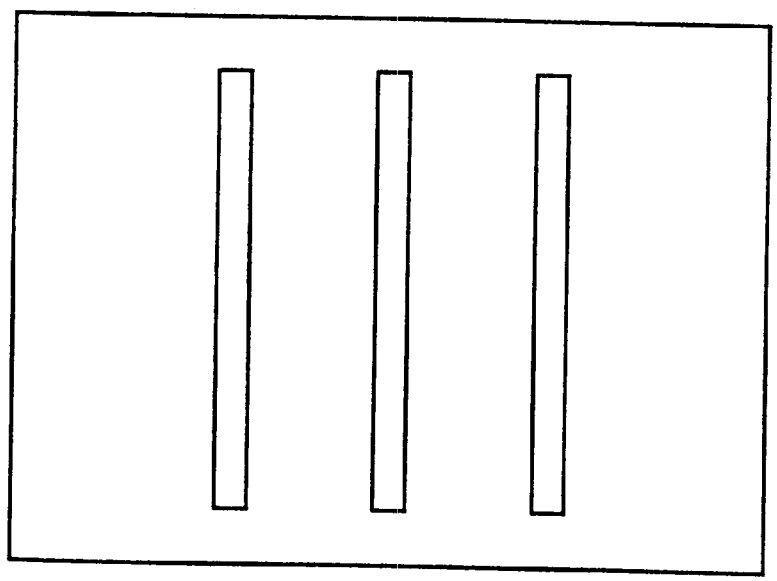
Figure 38:
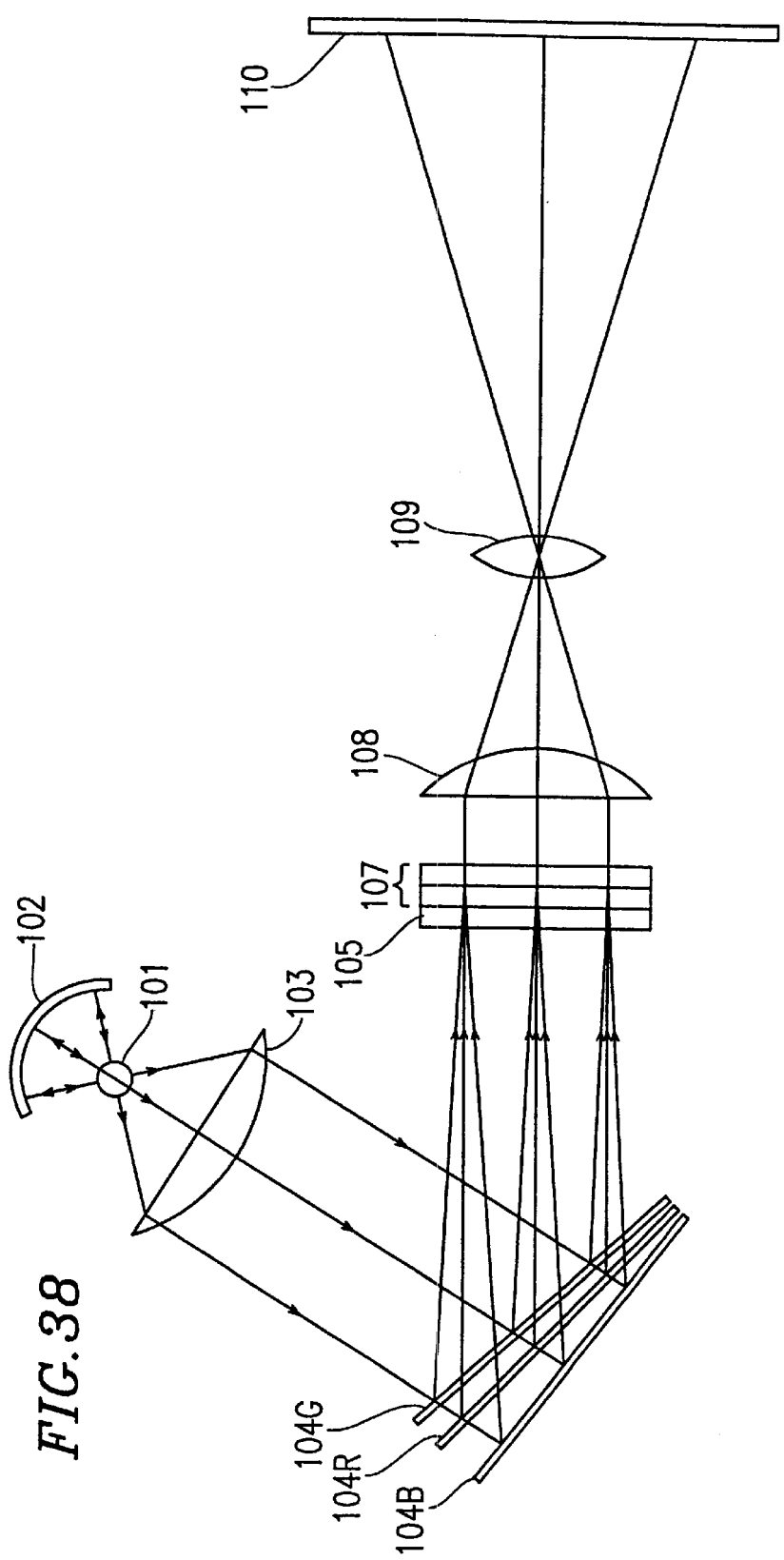
FIG. 38 illustrates a conventional color filter-less single-plate projection-type color image display apparatus.
Figure 39:
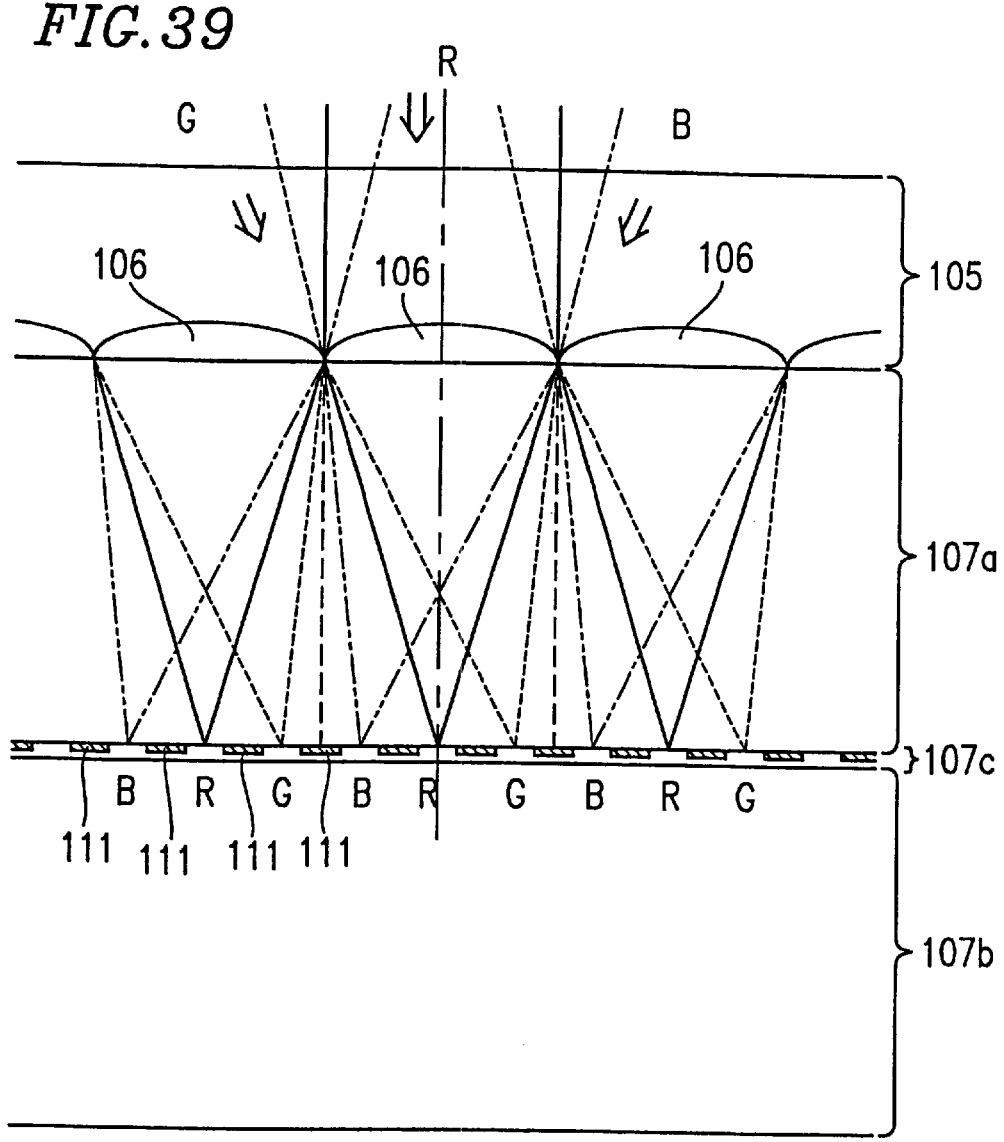
FIG. 39 illustrates a cross-sectional view of a LCD device provided in the conventional color filter-less single-plate projection-type color image display apparatus, also illustrating how light is focused on pixel apertures by a microlens.

When a lenticular lens array is used as a microlens array in the LCD device employing a stripe arrangement, as in Example 2, a light-blocking mask as illustrated in FIGS. 36A and 36B, in which vertically elongated openings are arranged in a stripe pattern, may be used because a lenticular lens does not have focusing capability in the vertical direction. In such a case, the irradiation of a black matrix with light and the increase in temperature can be prevented only partially, but there is provided the effect of preventing undesirable color mixing.

A light-blocking mask as described herein may be used with any of the preceding examples so as to prevent undesirable color mixing and the undesirable increase in temperature.

While the present invention has been described with respect to a LCD device, the present invention can be used with any transmission-type image display device using an array of pixels.

In the above-described examples, light is color-separated into R, G and B beams in the lateral direction while separating the light into P- and S-polarization beams in the vertical direction. This is done merely to comply with the pixel arrangement of a certain type of LCD device. If R, G and B pixels are repeated in the vertical direction, the color separating optical element or the color separator, and the polarization converting optical element may be oriented according to such a pixel arrangement. Moreover, regarding the color arrangement of microlenses with respect to the pixel arrangement, microlenses do not have to be centered about an R pixel, but may be centered about a pixel of any color.

In the above-described examples, the second fly-eye lens array and the first focusing lens are used to superimpose secondary light source image spots on the display screen of the LCD device. However, the first focusing lens may be omitted, in which case the curvature and the decentering of each lens of the second fly-eye lens array may be adjusted so as to provide the same focusing function without using the first focusing lens.

In the above-described examples, the color separation and the polarization conversion are performed in a particular order as described. However, regarding the color separation performed by the dichroic mirror, since P-polarization light and S-polarization light normally have different wavelength characteristics, a more accurate color separation may be realized, thereby improving the color reproducibility, by first performing the polarization conversion to obtain a uniform polarization direction before performing the color separation.

A uniform polarization direction among different light beams passing through a polarization converter may be obtained by using, instead of a half-wave plate as described in the above-described example, a liquid crystal material which optically rotates the polarization axis of light. Moreover, the polarization separation may be done by providing a polarization-selective reflector (e.g., "DBEF" manufactured by 3M) on a reflective surface, instead of using a PBS prism as in the above-described examples.

In the above-described examples, a color separating optical element or a polarization converting optical element are obtained by arranging quadratic prisms each of which is obtained by combining two triangular prisms together. However, the optical elements are not limited to those described above. For example, such optical elements having substantially the same function may be obtained as illustrated in FIGS. 37A, 37B and 37C. Referring to the figures, a color separating optical element (FIGS. 37A and 37B) or a polarization converting optical element (FIG. 37C) may be obtained by combining a number of parallelogram prisms or any other rectangular prisms, which are obtained by joining prisms along their surfaces which are not used as reflective surfaces.

As described above, according to the present invention, the illumination distribution on the image display device, and thus the illumination distribution in the projected image, can be made uniform by appropriately combining the first and second fly-eye lens arrays as described above. Moreover, each of the secondary light source image spots of three colors (R, G and B), which are obtained through a color separator (which is obtained by combining the first and second fly-eye lens arrays), is focused on the aperture of a pixel by the microlens array, thereby obtaining a bright projection. Moreover, according to the present invention it is possible to employ polarization conversion so as to further improve the light efficiency, thereby obtaining an even brighter projection. These effects and advantages can be realized using a compact optical system.

The projection type color image display apparatus of the present invention may be desirably used in a projection type color liquid crystal television system or an information display system.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection type color image display apparatus, comprising:
   a light source section for generating white light beams;
   a first fly-eye lens array comprising a plurality of lenses for forming a plurality of secondary light source image spots of the light source section;
   a second fly-eye lens array comprising at least the same number of lenses as the first fly-eye lens array, provided near a position where the plurality of secondary light source image spots are formed by the first fly-eye lens array;
   a microlens array comprising a plurality of microlenses, wherein the light beams which have passed through the respective lenses of the second fly-eye leans array are superimposed on one another on the microlens array;
   a single image display device comprising a plurality of color pixels arranged in a predetermined arrangement for modulating the light beams from the microlenses;
   a color separator provided in a predetermined position in an optical path from the light source section to the microlens array for color-separating the white beams into R, G and B beams;
   a projection lens for projecting the light beams output from the image display device, wherein:
   the plurality of secondary light source image spots are color-separated and arranged in a pattern which is similar to an arrangement of the plurality of color pixels of the image display device;
   the microlenses form focused spots, which correspond to the color-separated and arranged secondary light source image spots, on one of the color pixels having a corresponding color;
   the color separator is provided on a light source side of the second fly-eye lens array; and
   the second fly-eye lens array comprises a number of lenses, the number being at least three times as great as the number of lenses of the first fly-eye lens array, and forms the color-separated and arranged secondary light source image spots in a pattern similar to an arrangement of the plurality of color pixels of the image display device.

2. A projection type color image display apparatus according to claim 1, wherein:
   the color separator is an array of strip-shaped color separating optical elements which are regularly arranged:
   the color separator is provided on either a light source side or a light output side of the second fly-eye lens array, and color-separates the secondary light source image spots into R, G and B beams which are arranged at a regular interval along a direction in which the R, G and B color pixels of the image display device are arranged.

3. A projection type color image display apparatus according to claim 2, wherein the color separator further comprises a plurality of total reflection mirrors which are provided corresponding to the plurality of color separating optical elements.

4. A projection type color image display apparatus according to claim 2, wherein:
   the color separator comprises:
      a plurality of first dichroic prisms or dichroic mirrors each comprising a dielectric multilayer film which reflects two of colors R, G and B and transmits the other one of colors R, G and B;
      a plurality of second dichroic prisms or dichroic mirrors each of which reflects one of the two colors reflected by the first dichroic prisms or dichroic mirrors in a direction which generally coincides with a direction in which light is transmitted by the first dichroic prisms or dichroic mirrors; and
      a plurality of any of third dichroic prisms, dichroic mirrors, total reflection prisms or total reflection mirrors, each of which reflects light transmitted by the second dichroic prisms or dichroic mirrors in a direction which generally coincides with a direction in which light is transmitted by the first dichroic prisms or dichroic mirrors; and
   the first dichroic prisms or dichroic mirrors, the second dichroic prisms or dichroic mirrors, and the third dichroic prisms, dichroic mirrors, total reflection prisms or total reflection mirrors, are regularly arranged.

5. A projection type color image display apparatus according to claim 2, wherein:
   the color separator comprises:
      a plurality of first cross-dichroic prisms or cross-dichroic mirrors each comprising a dielectric multilayer film which reflects two of colors R, G and B and transmits the other one of colors R, G and B; and
      a plurality of any of second dichroic prisms, dichroic mirrors, total reflection prisms or total reflection mirrors, which respectively reflect the two colors reflected by the first cross-dichroic prisms or dichroic mirrors in a direction which generally coincides with a direction in which light is transmitted by the first cross-dichroic prisms or cross-dichroic mirrors; and
   the first cross-dichroic prisms or dichroic mirrors, and the second dichroic prisms, dichroic mirrors, total reflection prisms or total reflection mirrors, are regularly arranged.

6. A projection type color image display apparatus according to claim 1, wherein:
   the color separator comprises a first color separating surface which reflects one of colors R, G and B while transmitting the other ones of colors R, G and B, a second color separating surface which reflects one of the two colors transmitted by the first color separating surface while transmitting the other one, and a reflective surface which reflects the light transmitted by the second color separating surface; and
   the first color separating surface, the second color separating surface and the reflective surface are generally arranged in parallel to one another.

7. A projection type color image display apparatus according to claim 6, wherein:
   the color separator comprises two or three plates;
   a dielectric multilayer film is formed on at least three sides of the two or three plates.

8. A projection type color image display apparatus according to claim 6, wherein:
   the color separator comprises a triangular prism and one or two plates; and
   a dielectric multilayer film is formed on at least three sides of the triangular prism and the one or two plates.

9. A projection type color image display apparatus, comprising:
   a light source section for generating white light beams;
   a first fly-eye lens array comprising a plurality of lenses for forming a plurality of secondary light source image spots of the light source section;

a second fly-eye lens array comprising at least the same number of lenses as the first fly-eye lens array, provided near a position where the plurality of secondary light source image spots are formed by the first fly-eye lens array;

a microlens array comprising a plurality of microlenses, wherein the light beams which have passed through the respective lenses of the second fly-eye leans array are superimposed on one another on the microlens array;

a single image display device comprising a plurality of color pixels arranged in a predetermined arrangement for modulating the light beams from the microlenses;

a color separator provided in a predetermined position in an optical path from the light source section to the microlens array for color-separating the white beams into R, G and B beams;

a projection lens for projecting the light beams output from the image display device, wherein:

the plurality of secondary light source image spots are color-separated and arranged in a pattern which is similar to an arrangement of the plurality of color pixels of the image display device;

the microlenses form focused spots, which correspond to the color-separated and arranged secondary light source image spots, on one of the color pixels having a corresponding color;

a ratio between a spot size of the secondary light source image spot and a pitch of the color-separated secondary light source image spots, along a direction of color separation performed by the color separator, is substantially equal to or less than a ratio between a size of an aperture of each of the color pixels of the image display device and a pitch of the color pixels along said direction of color separation.

10. A projection type color image display apparatus, comprising:

a light source section for generating white light beams;

a first fly-eye lens array comprising a plurality of lenses for forming a plurality of secondary light source image spots of the light source section;

a second fly-eye lens array comprising at least the same number of lenses as the first fly-eye lens array, provided near a position where the plurality of secondary light source image spots are formed by the first fly-eye lens array;

a microlens array comprising a plurality of microlenses, wherein the light beams which have passed through the respective lenses of the second fly-eye leans array are superimposed on one another on the microlens array;

a single image display device comprising a plurality of color pixels arranged in a predetermined arrangement for modulating the light beams from the microlenses;

a color separator provided in a predetermined position in an optical path from the light source section to the microlens array for color-separating the white beams into R, G and B beams; and a projection lens for projecting the light beams output from the image display device, wherein:

the plurality of secondary light source image spots are color-separated and arranged in a pattern which is similar to an arrangement of the plurality of color pixels of the image display device; and each of the plurality of microlenses forms focused spots, which correspond to the color-separated and arranged secondary light source image spots, on one of the color pixels having a corresponding color, so that the light beams are focused from the plurality of microlenses to said one pixel.

11. A projection type color image display apparatus according to claim 10, wherein the microlenses are arranged at a pitch which is an integer multiple of a pitch at which groups of the R, G and B color pixels of the image display device are arranged.

12. A projection type color image display apparatus according to claim 10, wherein:

the color separator is provided between the light source section and the first fly-eye lens array;

the white light beams color-separated by the color separator are incident upon the first fly-eye lens array while being superimposed on one another; and the first fly-eye lens array forms the color-separated and arranged secondary light source image spots in a pattern similar to an arrangement of the plurality of color pixels of the image display device.

13. A projection type color image display apparatus according to claim 10, wherein:

the apparatus further comprises a polarization converting optical element provided on a light source side or a light output side of the second fly-eye lens array;

the polarization converting optical element comprises:

a polarization beam splitter for separating each of light beams forming the secondary light source image spots into a P-polarization component and an S-polarization component, by reflecting one of the polarization components while transmitting the other of the polarization components, in a direction perpendicular to a direction in which the color separator separates the light beams into three wavelength bands of R, G and B; and a plurality of total reflection prisms or total reflection mirrors, each of which reflects one of the P-polarization component and the S-polarization component which has been reflected by the polarization beam splitter in a direction which generally coincides with a direction in which the other one of the P-polarization component and the S-polarization component has been transmitted by the polarization beam splitter, wherein the polarization beam splitter and the total reflection prisms or total reflection mirrors are regularly and alternately arranged in a strip pattern; and a polarization axis rotator is provided on a light output side of one of the polarization beam splitter and the total reflection prism or total reflection mirror.

14. A projection type color image display apparatus according to claim 13, wherein the polarization converting optical element further comprises a spacer for defining an interval between the polarization beam splitter and the total reflection prism or total reflection mirror which are regularly and alternately arranged in a strip pattern.

15. A projection type color image display apparatus according to claim 10, further comprising a polarization separator provided between the light source section and the first fly-eye lens array, the polarization separator comprising:

a polarization beam splitter for separating the white light beams from the light source section into a P-polarization component and an S-polarization component by reflecting one of the polarization components while transmitting the other of the polarization components: and a reflector for reflecting one of the polarization components which has been transmitted by the polarization beam splitter toward the polarization beam splitter, wherein:

the P-polarization component and the S-polarization component separated by the polarization separator are incident upon the first fly-eye lens array at respectively different angles while being superimposed on one another;

the secondary light source images of the P-polarization component and the S-polarization component formed by the first fly-eye lens array are arranged in a direction perpendicular to a direction in which the color separator color-separates the white light beams; and the apparatus further comprises a polarization axis rotator which is provided along an optical path of either the P-polarization component or the S-polarization component, near a position where the secondary light source image spots of the P-polarization component and the S-polarization component are formed.

16. A projection type color image display apparatus according to claim 10, further comprising a light-blocking mask provided on a light source side or a light output side of the second fly-eye lens array, the light-blocking mask comprising a plurality of openings each having a shape similar to a shape of an aperture of the color pixel of the image display device.

17. A projection type color image display apparatus according to claim 10, wherein:

the color separator is provided on a light output side of the second fly-eye lens array; and the secondary light source image spots are virtually color-separated and arranged in a pattern similar to an arrangement of the plurality of color pixels of the image display device.

18. A projection type color image display apparatus according to claim 17, wherein:

the color separator is an array of strip-shaped color separating optical elements which are regularly arranged;

the color separator is provided on either a light source side or a light output side of the second fly-eye lens array, and color-separates the secondary light source image spots into R, G and B beams which are arranged at a regular interval along a direction in which the R, G and B color pixels of the image display device are arranged.

19. A projection type color image display apparatus according to claim 17, wherein the color separator further comprises a plurality of total reflection mirrors which are provided corresponding to the plurality of color separating optical elements.

20. A projection type color image display apparatus according to claim 17, wherein:

the color separator comprises:

a plurality of first dichroic prisms or dichroic mirrors each comprising a dielectric multilayer film which reflects two of colors R, G and B and transmits the other one of colors R, G and B;

a plurality of second dichroic prisms or dichroic mirrors each of which reflects one of the two colors reflected by the first dichroic prisms or dichroic mirrors in a direction which generally coincides with a direction in which light is transmitted by the first dichroic prisms or dichroic mirrors; and a plurality of any of third dichroic prisms, dichroic mirrors, total reflection prisms or total reflection mirrors, each of which reflects light transmitted by the second dichroic prisms or dichroic mirrors in a direction which generally coincides with a direction in which light is transmitted by the first dichroic prisms or dichroic mirrors; and the first dichroic prisms or dichroic mirrors, the second dichroic prisms or dichroic mirrors, and the third dichroic prisms, dichroic mirrors, total reflection prisms or total reflection mirrors, are regularly arranged.

21. A projection type color image display apparatus according to claim 17, wherein:

the color separator comprises:

a plurality of first cross-dichroic prisms or cross-dichroic mirrors each comprising a dielectric multilayer film which reflects two of colors R, G and B and transmits the other one of colors R, G and B; and a plurality of any of second dichroic prisms, dichroic mirrors, total reflection prisms or total reflection mirrors, which respectively reflect the two colors reflected by the first cross-dichroic prisms or dichroic mirrors in a direction which generally coincides with a direction in which light is transmitted by the first cross-dichroic prisms or cross-dichroic mirrors; and the first cross-dichroic prisms or dichroic mirrors, and the second dichroic prisms, dichroic mirrors, total reflection prisms or total reflection mirrors, are regularly arranged.

22. A projection type color image display apparatus according to claim 17, wherein:

the color separator comprises a first color separating surface which reflects one of colors R, G and B while transmitting the other ones of colors R, G and B, a second color separating surface which reflects one of the two colors transmitted by the first color separating surface while transmitting the other one, and a reflective surface which reflects the light transmitted by the second color separating surface; and the first color separating surface, the second color separating surface and the reflective surface are generally arranged in parallel to one another.

23. A projection type color image display apparatus according to claim 17, wherein:

the color separator comprises two or three plates;

a dielectric multilayer film is formed on at least three sides of the two or three plates.

24. A projection type color image display apparatus according to claim 17, wherein:

the color separator comprises a triangular prism and one or two plates; and a dielectric multilayer film is formed on at least three sides of the triangular prism and the one or two plates.

25. A projection type color image display apparatus, comprising:

a light source section for generating white light beams;

a first fly-eye lens array comprising a plurality of lenses for forming a plurality of secondary light source image spots of the light source section;

a second fly-eye lens array comprising at least the same number of lenses as the first fly-eye lens array, provided near a position where the plurality of secondary light source image spots are formed by the first fly-eye lens array;

a microlens array comprising a plurality of microlenses, wherein the light beams which have passed through the respective lenses of the second fly-eye leans array are superimposed on one another on the microlens array;

a single image display device comprising a plurality of color pixels arranged in a predetermined arrangement for modulating the light beams from the microlenses;

a color separator provided in a predetermined position in an optical path from the light source section to the microlens array for color-separating the white beams into R, G and B beams; and a projection lens for projecting the light beams output from the image display device, wherein:

at the second fly-eye lens array the plurality of secondary light source image spots are color-separated and arranged in a pattern which is similar to an arrangement of the plurality of color pixels of the image display device, and each of a plurality of lenses of the second fly-eye lens array has a plurality of different colored discrete secondary light source image spots from the first fly-eye lens array formed thereon; and each of the plurality of microlenses forms focused spots, which correspond to the color-separated and arranged secondary light source image spots, on one of the color pixels having a corresponding color.

* * * * *